United States Patent
Safranek et al.

(10) Patent No.: US 9,626,321 B2
(45) Date of Patent: Apr. 18, 2017

(54) HIGH PERFORMANCE INTERCONNECT

(71) Applicant: Intel Corporation, Santa Clara, CA (US)

(72) Inventors: Robert J. Safranek, Portland, OR (US); Robert G. Blankenship, Tacoma, WA (US); Venkatraman Iyer, Austin, TX (US); Jeff Willey, Timnath, CO (US); Robert Beers, Hillsboro, OR (US); Darren S. Jue, Sunnyvale, CA (US); Arvind A. Kumar, Palo Alto, CA (US); Debendra Das Sharma, Saratoga, CA (US); Jeffrey C. Swanson, Sunnyvale, CA (US); Bahaa Fahim, San Jose, CA (US); Vedaraman Geetha, Fremont, CA (US); Aaron T. Spink, San Francisco, CA (US); Fulvio Spagna, San Jose, CA (US); Rahul R. Shah, San Francisco, CA (US); Sitaraman V. Iyer, Santa Clara, CA (US); William Harry Nale, Livermore, CA (US); Abhishek Das, Portland, OR (US); Simon P. Johnson, Beaverton, OR (US); Yuvraj S. Dhillon, Hillsboro, OR (US); Yen-Cheng Liu, Portland, OR (US); Raj K. Ramanujan, Federal Way, WA (US); Robert A. Maddox, Columbia, SC (US); Herbert H. Hum, Portland, OR (US); Ashish Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 14/060,191

(22) Filed: Oct. 22, 2013

(65) Prior Publication Data

US 2014/0112339 A1    Apr. 24, 2014

Related U.S. Application Data

(60) Provisional application No. 61/717,091, filed on Oct. 22, 2013.

(51) Int. Cl.
*G06F 13/40* (2006.01)
*G06F 12/0831* (2016.01)
(Continued)

(52) U.S. Cl.
CPC ............ *G06F 13/4022* (2013.01); *G06F 8/71* (2013.01); *G06F 8/77* (2013.01); *G06F 9/30145* (2013.01);
(Continued)

(58) Field of Classification Search
CPC .... G06F 12/0831; G06F 13/4286; G06F 8/71; G06F 8/77; G06F 13/4221;
(Continued)

(56) References Cited

U.S. PATENT DOCUMENTS 5,898,826 A * 4/1999 Pierce .................... H04L 45/28 714/4.2
6,961,347 B1 * 11/2005 Bunton et al. ............... 370/465
(Continued)

FOREIGN PATENT DOCUMENTS

WO    WO 2013085501 A1 *  6/2013  ............ G06F 13/14

OTHER PUBLICATIONS

PCI Express Base Specification Revision 3.0, Nov. 10, 2010.*

*Primary Examiner* — Ian N Moore
*Assistant Examiner* — Latresa McCallum
(74) *Attorney, Agent, or Firm* — Patent Capital Group

(57) ABSTRACT

A physical layer (PHY) is coupled to a serial, differential link that is to include a number of lanes. The PHY includes a transmitter and a receiver to be coupled to each lane of the number of lanes. The transmitter coupled to each lane is configured to embed a clock with data to be transmitted over the lane, and the PHY periodically issues a blocking link state (BLS) request to cause an agent to enter a BLS to hold off link layer flit transmission for a duration. The PHY utilizes the serial, differential link during the duration for a PHY associated task selected from a group including an in-band reset, an entry into low power state, and an entry into partial width state

1 Claim, 41 Drawing Sheets

(51) Int. Cl.
| | | |
|---|---|---|
| *G06F 13/42* | (2006.01) | |
| *G06F 9/30* | (2006.01) | |
| *G06F 12/0806* | (2016.01) | |
| *H04L 12/933* | (2013.01) | |
| *G06F 9/46* | (2006.01) | |
| *G06F 12/0813* | (2016.01) | |
| *G06F 12/0815* | (2016.01) | |
| *H04L 12/741* | (2013.01) | |
| *G06F 9/44* | (2006.01) | |

(52) U.S. Cl.
CPC .......... *G06F 9/466* (2013.01); *G06F 12/0806* (2013.01); *G06F 12/0813* (2013.01); *G06F 12/0815* (2013.01); *G06F 12/0831* (2013.01); *G06F 12/0833* (2013.01); *G06F 13/4221* (2013.01); *G06F 13/4286* (2013.01); *H04L 49/15* (2013.01); *G06F 8/73* (2013.01); *G06F 2212/1016* (2013.01); *G06F 2212/2542* (2013.01); *G06F 2212/622* (2013.01); *H04L 45/74* (2013.01)

(58) Field of Classification Search
CPC ............. G06F 12/0806; G06F 12/0833; G06F 2212/622; G06F 9/30145; H04L 45/74; H04L 49/15
See application file for complete search history.

(56) References Cited

U.S. PATENT DOCUMENTS

| | | | | |
|---|---|---|---|---|
| 7,010,607 | B1* | 3/2006 | Bunton ........................ | 709/228 |
| 2004/0132442 | A1* | 7/2004 | Zimmermann ....... | H04L 1/0003 455/423 |
| 2004/0156317 | A1* | 8/2004 | Lund ...................... | H04L 25/14 370/235 |
| 2006/0041696 | A1* | 2/2006 | Cherukuri et al. .......... | 710/100 |
| 2010/0027473 | A1* | 2/2010 | Ghosh ................ | H04L 27/2613 370/328 |
| 2010/0080229 | A1 | 4/2010 | Scandurra et al. | |
| 2010/0232809 | A1* | 9/2010 | Cai ........................ | H04J 14/02 398/202 |
| 2010/0330927 | A1* | 12/2010 | Cherukuri ............. | G06F 1/3287 455/68 |
| 2011/0134905 | A1* | 6/2011 | Wang ................ | H04L 25/03866 370/345 |
| 2011/0208954 | A1* | 8/2011 | Barrett et al. .................... | 713/2 |
| 2012/0079156 | A1* | 3/2012 | Safranek ............. | G06F 12/0835 710/305 |
| 2013/0051391 | A1* | 2/2013 | Jayasimha ............. | H04L 45/60 370/392 |

\* cited by examiner

FIG. 15

|    | 7  | 6  | 5  | 4  | 3  | 2  | 1  | 0 |
|----|----|----|----|----|----|----|----|---|
| UI |    |    |    |    |    |    |    |   |
| 0,1,2,3 | 47 | 41 | 35 | 29 | 23 | 17 | 11 | 5 |
| 4,5,6,7 | 46 | 40 | 34 | 28 | 22 | 16 | 10 | 4 |
| 8,9,10,11 | 45 | 39 | 33 | 27 | 21 | 15 | 9 | 3 |
| 12,13,14,15 | 44 | 38 | 32 | 26 | 20 | 14 | 8 | 2 |
| 16,17,18,19 | 43 | 37 | 31 | 25 | 19 | 13 | 7 | 1 |
| 20,21,22,23 | 42 | 36 | 30 | 24 | 18 | 12 | 6 | 0 |

FIG. 16

|      | L7  | L6  | L5  | L4  | L3 | L2 | L1 | L0 |
|------|-----|-----|-----|-----|----|----|----|----|
| UI0  | 191 | 167 | 143 | 119 | 95 | 71 | 47 | 23 |
| UI1  | 190 | 166 | 142 | 118 | 94 | 70 | 46 | 22 |
| UI2  | 189 | 165 | 141 | 117 | 93 | 69 | 45 | 21 |
| UI3  | 188 | 164 | 140 | 116 | 92 | 68 | 44 | 20 |
| UI4  | 187 | 163 | 139 | 115 | 91 | 67 | 43 | 19 |
| UI5  | 186 | 162 | 138 | 114 | 90 | 66 | 42 | 18 |
| UI6  | 185 | 161 | 137 | 113 | 89 | 65 | 41 | 17 |
| UI7  | 184 | 160 | 136 | 112 | 88 | 64 | 40 | 16 |
| UI8  | 183 | 159 | 135 | 111 | 87 | 63 | 39 | 15 |
| UI9  | 182 | 158 | 134 | 110 | 86 | 62 | 38 | 14 |
| UI10 | 181 | 157 | 133 | 109 | 85 | 61 | 37 | 13 |
| UI11 | 180 | 156 | 132 | 108 | 84 | 60 | 36 | 12 |
| UI12 | 179 | 155 | 131 | 107 | 83 | 59 | 35 | 11 |
| UI13 | 178 | 154 | 130 | 106 | 82 | 58 | 34 | 10 |
| UI14 | 177 | 153 | 129 | 105 | 81 | 57 | 33 | 9  |
| UI15 | 176 | 152 | 128 | 104 | 80 | 56 | 32 | 8  |
| UI16 | 175 | 151 | 127 | 103 | 79 | 55 | 31 | 7  |
| UI17 | 174 | 150 | 126 | 102 | 78 | 54 | 30 | 6  |
| UI18 | 173 | 149 | 125 | 101 | 77 | 53 | 29 | 5  |
| UI19 | 172 | 148 | 124 | 100 | 76 | 52 | 28 | 4  |
| UI20 | 171 | 147 | 123 | 99  | 75 | 51 | 27 | 3  |
| UI21 | 170 | 146 | 122 | 98  | 74 | 50 | 26 | 2  |
| UI22 | 169 | 145 | 121 | 97  | 73 | 49 | 25 | 1  |
| UI23 | 168 | 144 | 120 | 96  | 72 | 48 | 24 | 0  |

*Fig. 18*

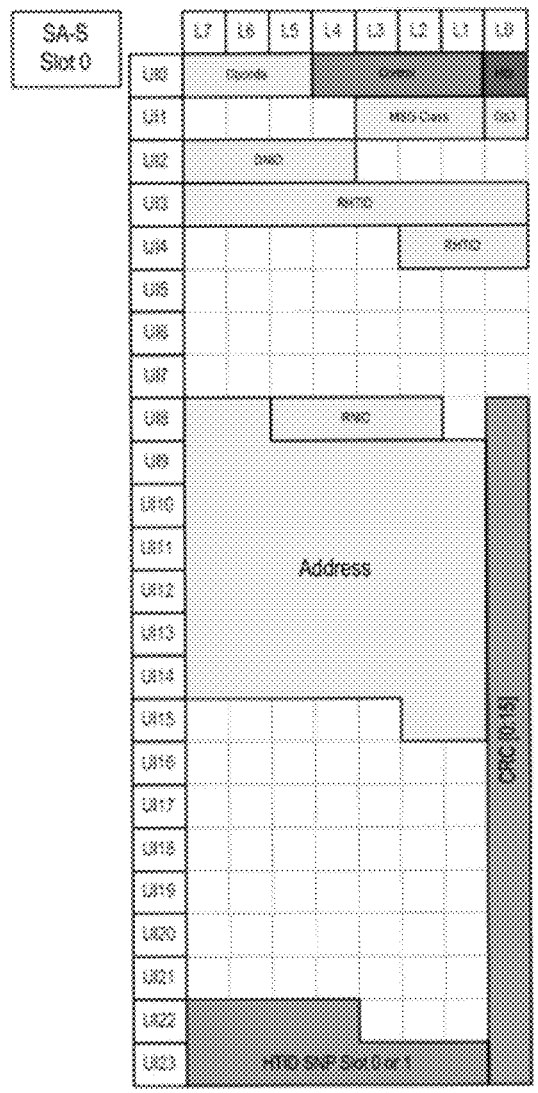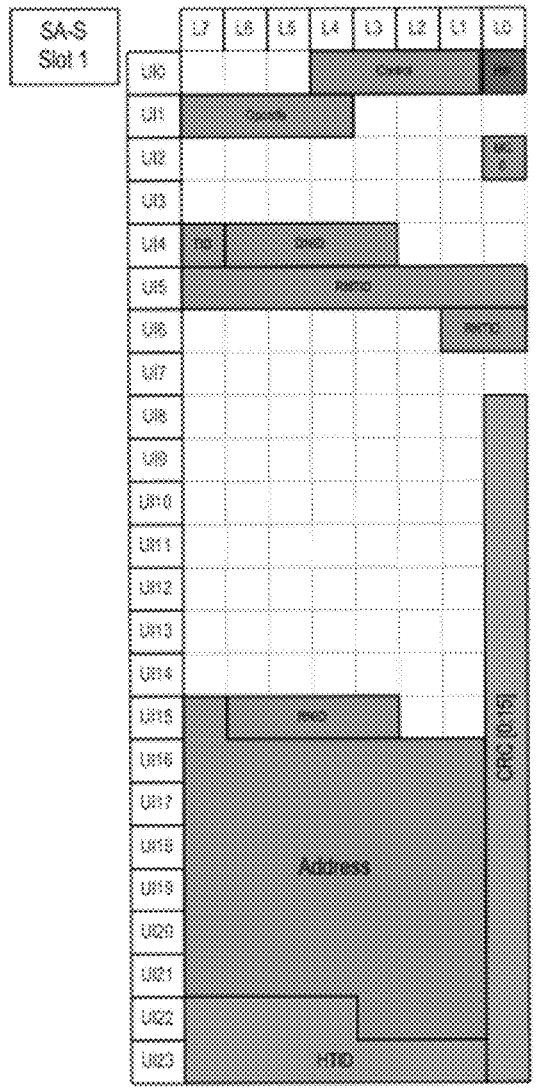
Fig. 19

| Current States | | | | Next State | | |
|---|---|---|---|---|---|---|
| ReqTrk | | Dir | ReqTrk | Msg to ReqNID | | ReqTrk |
| State | Cmd | State | Snoop | Cmd | Data | State |
| Busy | RdMigr, RdData | Invalid, Exclusive, Unknown | | Data_E | Memory Data | DataSent |
| | | | | Data_E_CmpO | | CmpSent |
| | | | | Data_F | | DataSent |
| | | | | Data_F_CmpO | | CmpSent |
| | | | | Data_SI | | DataSent |
| | | | | Data_SI_CmpO | | CmpSent |
| | | Shared | Includes all UsesF Peer Owners | Data_F | | DataSent |
| | | | | Data_F_CmpO | | CmpSent |
| | | | | Data_SI | | DataSent |
| | | | | Data_SI_CmpO | | CmpSent |
| | RdCode | Invalid, Exclusive, Unknown | | Data_F | | DataSent |
| | | | | Data_F_CmpO | | CmpSent |
| | | | | Data_SI | | DataSent |
| | | | | Data_SI_CmpO | | CmpSent |
| | | Shared | Includes all UsesF Peer Owners | Data_F | | DataSent |
| | | | | Data_F_CmpO | | CmpSent |
| | | | | Data_SI | | DataSent |
| | | | | Data_SI_CmpO | | CmpSent |
| | RdInvOwn, RdInv | | | Data_E | | DataSent |
| | | | | Data_E_CmpO | | CmpSent |
| | RdCur | | | Data_SI | | DataSent |
| | | | | Data_SI_CmpO | | CmpSent |
| | InvIto* | | | CmpO | | CmpSent |
| WbBuffered | RdMigr, RdInvOwn | | | Data_M | Stored Data | DataSent |
| | | | | Data_M_CmpO | | CmpSent |

Fig. 33

| Current States | | | | | Next State | |
|---|---|---|---|---|---|---|
| Cmd | CacheLine | | | | | |
| | State | Mask | CacheLine State | | Msg to HNID | Msg to RNID |
| SnpMigr, FwdMigr | M | Full | S | | RspFwdSWb | Data_F |
| | | | | | RspSWb | |
| | | | I | | RspFwdI | Data_M |
| | | | | | RspFwdIWb | Data_E |
| | | | | | RspIWb | |
| | | Empty | | | RspI | |
| | E | Full | S | | RspFwdS | Data_F |
| | | | | | RspS | |
| | | | I | | RspFwdI | Data_E |
| | | | | | RspI | |
| | | Empty | | | | |
| | F | | S | | RspFwdS | Data_F |
| | | | | | RspS | |
| | | | I | | RspI | |
| | S | | | | RspS | |
| | I | | | | RspI | |

Fig. 34

| Action A | | | | | | |
|---|---|---|---|---|---|---|
| Current States | | | | Next State | | |
| Command | Condition 1 | CacheLine | Condition 2 | CacheLine | Msg to HNID | Msg to RNID |
| Addr | Boolean | State | Boolean | State | | |
| Cmd1 | TRUE | State 1 | TRUE | State 2 | Message 1 | Message A |
|  |  |  | FALSE |  | Message 2 | Message B |
|  | FALSE | State 2 |  | State 3 | Message 2 | Message A |
|  |  |  |  |  | Message 4 |  |
| Cmd2 | TRUE | State 1 | TRUE | State 2 | Message 3 | Message C |
|  |  |  | FALSE |  | Message 4 | Message B |
|  | FALSE | State 2 |  | State 3 | Message 1 | Message D |
|  |  |  |  |  | Message 2 | Message E |
|  |  |  |  |  | Message 3 |  |

Fig. 35

Action A — 3500

| Command | Current States | | | Next State | | |
|---|---|---|---|---|---|---|
| Addr | Condition 1 Boolean | Condition 2 Boolean | CacheLine State | CacheLine State | Msg to HNID | Msg to RNID |
| Cmd1 | TRUE | TRUE | State 1 | State 2 | Message 1 | Message A |
|  |  | FALSE |  |  | Message 2 | Message A |
|  | FALSE |  | State 2 | State 3 | Message 3 | Message B |
|  |  |  |  |  | Message 4 | Message A |
| Cmd2 | TRUE | TRUE | State 1 | Use Sub-action B |  | Message C |
|  |  | FALSE |  |  |  |  |
|  | FALSE |  | State 2 |  | Message B | Message D |
|  |  |  |  |  |  | Message E |

Sub-action B — 3600

| Condition 1 Boolean | Current States | | Next State | |
|---|---|---|---|---|
|  | CacheLine State | Condition 2 Boolean | CacheLine State | Msg to HNID |
| TRUE | State 1 | TRUE | State 4 | Message 1 |
|  |  | FALSE | State 3 | Message 2 |
|  | State 2 | TRUE | State 2 | Message 3 |
|  |  | FALSE |  | Message 2 |
|  | State 3 |  | State 3 | Message 4 |
| FALSE | State 4 |  | State 2 | Message 1 |
|  | State 1 | TRUE | State 3 | Message 2 |
|  |  | FALSE | State 2 |  |
|  | State 2 | TRUE | State 3 | Message 3 |
|  |  | FALSE | State 2 |  |
|  | State 3 |  |  |  |
|  | State 4 | TRUE | State 4 | Message 4 |

Action C — 3610

| Command | Current States | | | Next State | | |
|---|---|---|---|---|---|---|
| Addr | Condition 1 Boolean | Condition 2 Boolean | CacheLine State | CacheLine State | Msg to HNID | Msg to RNID |
| Cmd1 | TRUE |  | State 1 | State 2 | Message 1 | Message A |
|  |  |  | State 2 |  | Message 2 |  |
| Cmd2 | FALSE |  | State 1 | Use Sub-action B |  | Message B |
|  |  |  |  |  |  | Message C |
|  |  |  |  |  |  | Message A |
| Cmd3 | TRUE |  | State 2 |  |  | Message B |
|  |  |  |  |  |  | Message C |
|  |  |  | State 1 |  |  | Message D |

HIGH PERFORMANCE INTERCONNECT

This application claims benefit to U.S. Provisional Patent Application Ser. No. 61/717,091, filed Oct. 22, 2012 and incorporated by reference herein in its entirety.

FIELD

The present disclosure relates in general to the field of computer development, and more specifically, to software development involving coordination of mutually-dependent constrained systems.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 15 illustrates a representation of an example flit sent over an example twenty-lane data link.

FIG. 16 illustrates a representation of an example flit sent over an example eight-lane data link.

FIG. 18 illustrates a representation of an example flit sent over an example eight-lane data link.

FIG. 19 illustrates a representation of use of an example floating payload field of an example multi-slot flit.

FIG. 23 illustrates a representation of an example slot message for returning credits and acknowledgements.

FIGS. 33-35 illustrate representations of example protocol state tables.

FIG. 36 illustrates a representation of an example nesting of protocol state tables.

Like reference numbers and designations in the various drawings indicate like elements.

DETAILED DESCRIPTION

Figure 1:
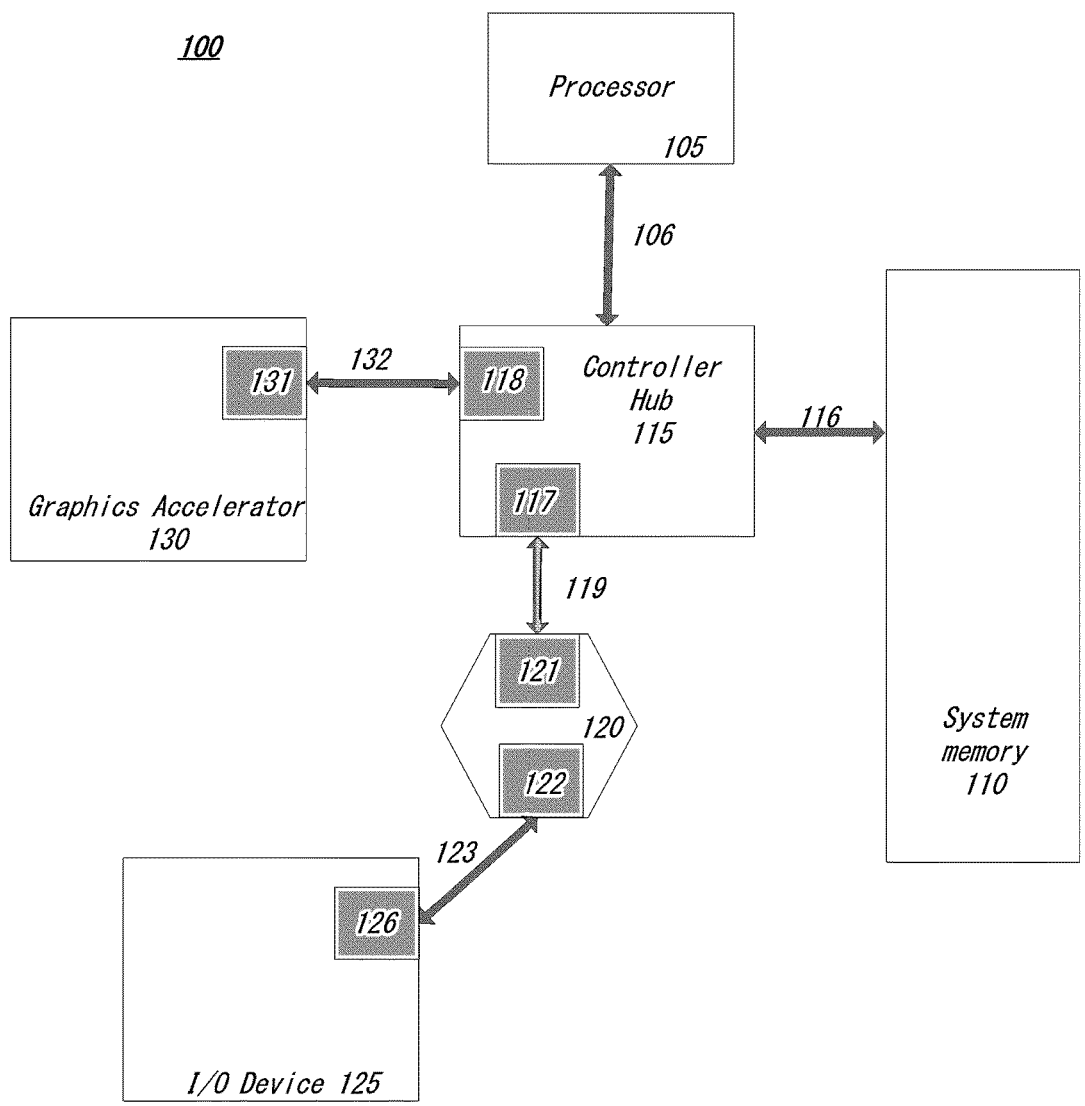
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect (HPI) architecture, aspects of the invention described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
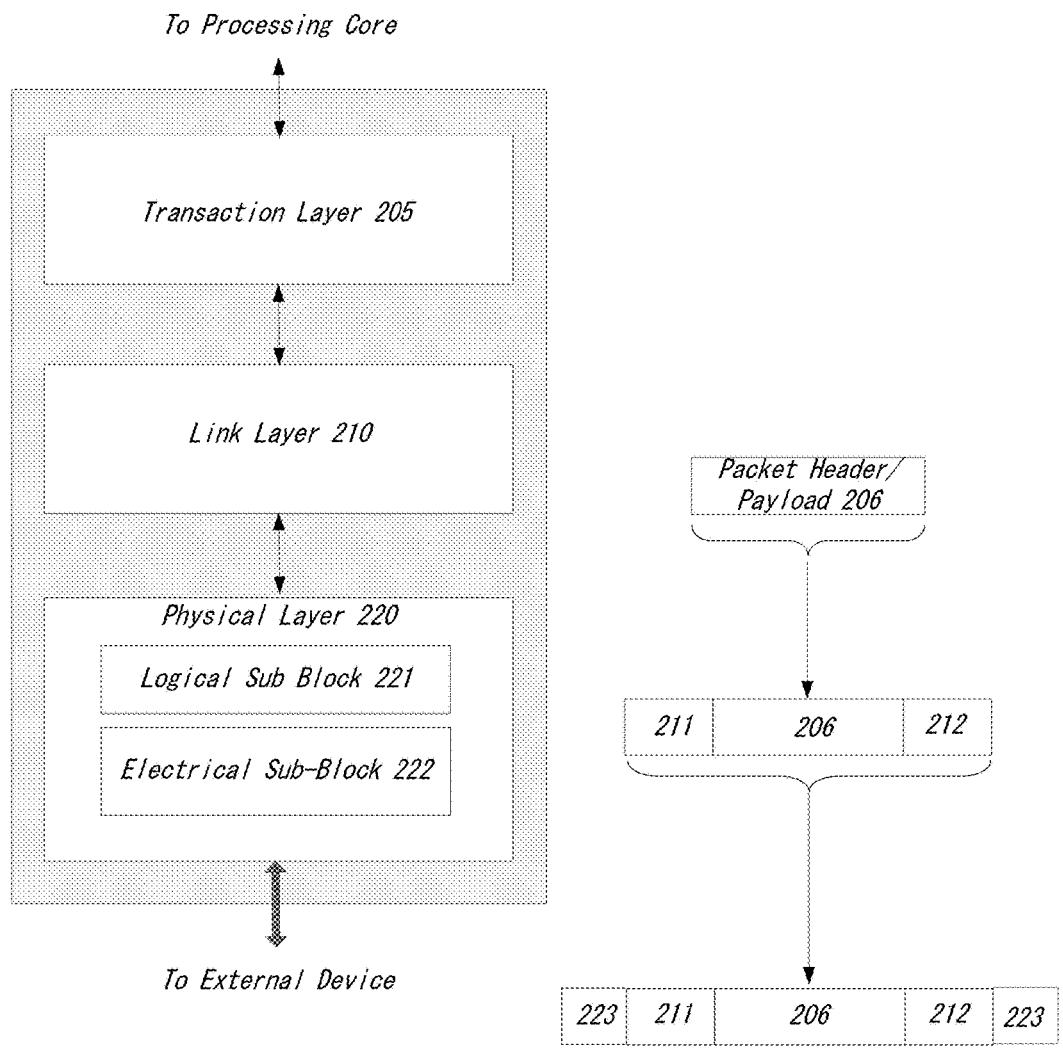
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figure 3:
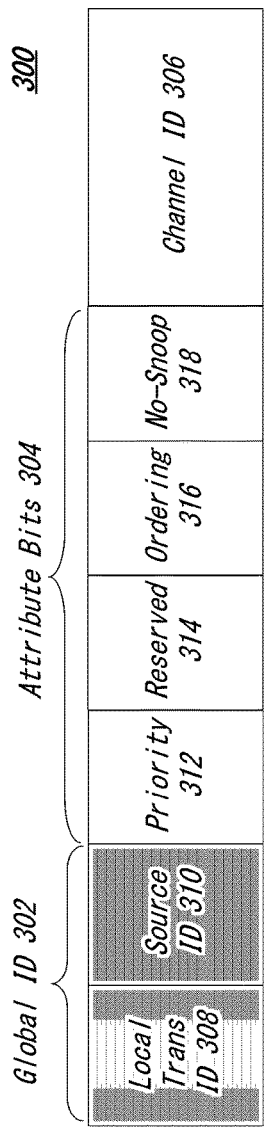
FIG. 3 illustrates an embodiment of a transaction descriptor.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/ interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 4:
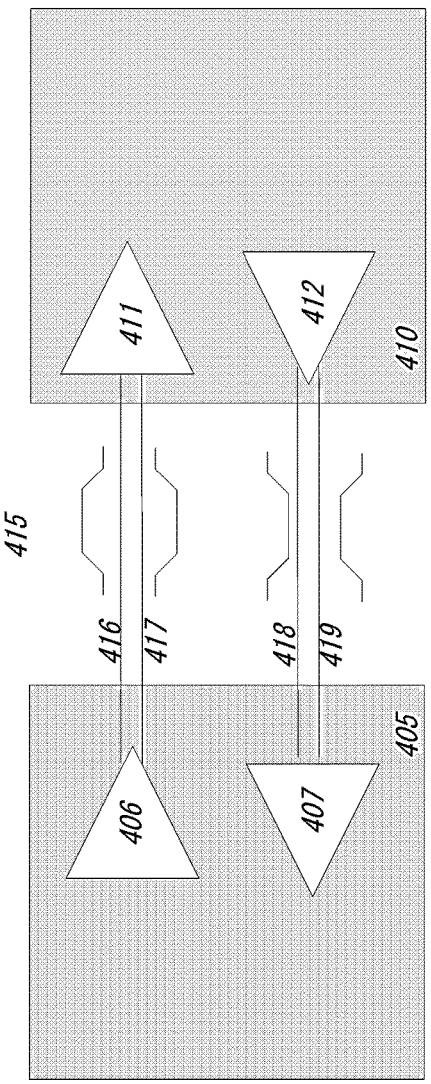
FIG. 4 illustrates an embodiment of a serial point-to-point link.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

In one embodiment, a new High Performance Interconnect (HPI) is provided. HPI can include a next-generation cache-coherent, link-based interconnect. As one example, HPI may be utilized in high performance computing platforms, such as workstations or servers, including in systems where PCIe or another interconnect protocol is typically used to connect processors, accelerators, I/O devices, and the like. However, HPI is not so limited. Instead, HPI may be utilized in any of the systems or platforms described herein. Furthermore, the individual ideas developed may be applied to other interconnects and platforms, such as PCIe, MIPI, QPI, etc.

Figure 5:
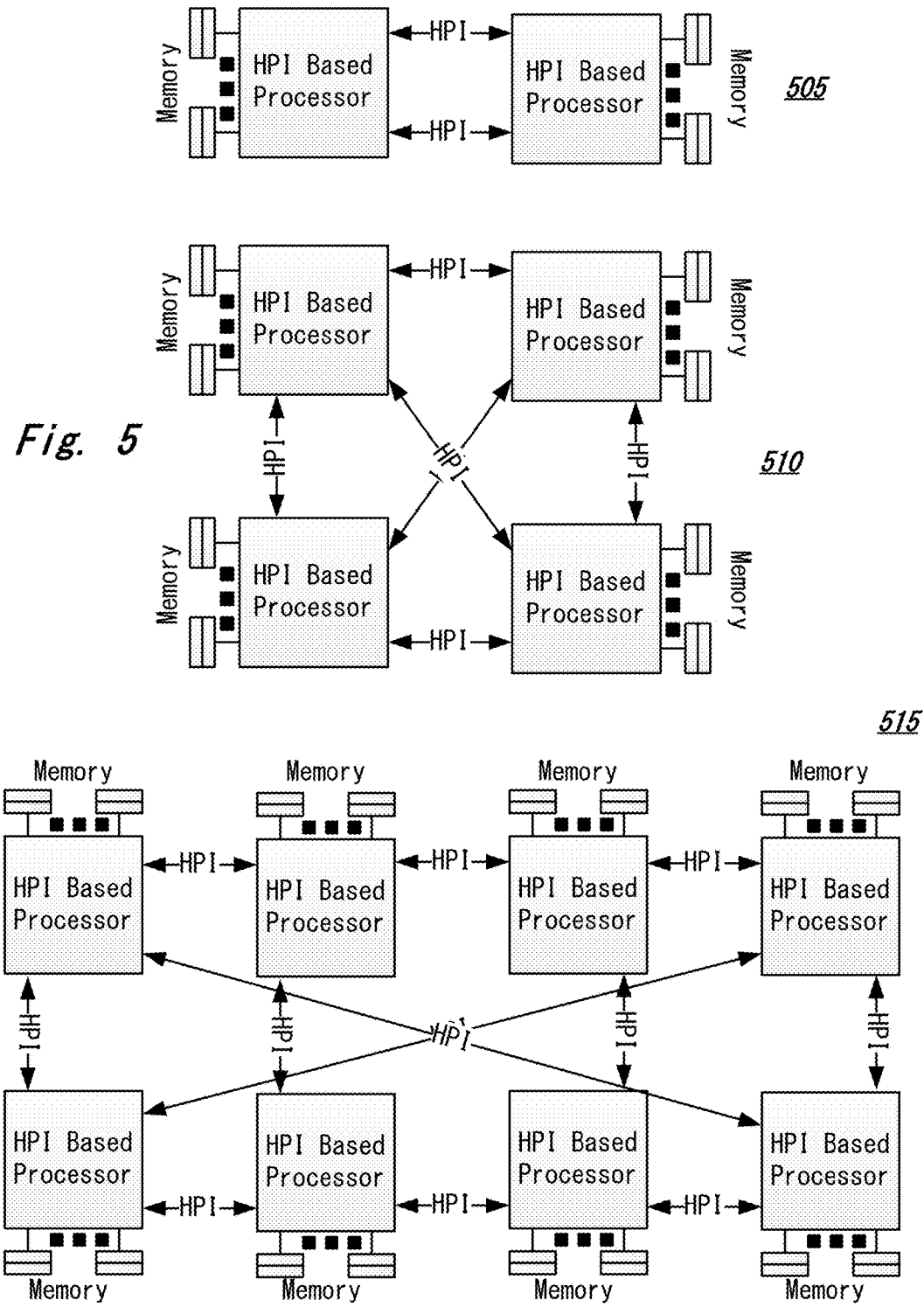
FIG. 5 illustrates embodiments of potential High Performance Interconnect (HPI) system configurations.

To support multiple devices, in one example implementation, HPI can include an Instruction Set Architecture (ISA) agnostic (i.e. HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e. HPI to PCIe). Moreover, the HPI links may be utilized by many HPI based devices, such as processors, in various ways (e.g. stars, rings, meshes, etc.). FIG. 5 illustrates example implementations of multiple potential multi-socket configurations. A two-socket configuration 505, as depicted, can include two HPI links; however, in other implementations, one HPI link may be utilized. For larger topologies, any configuration may be utilized as long as an identifier (ID) is assignable and there is some form of virtual path, among other additional or substitute features.

As shown, in one example, a four socket configuration 510 has an HPI link from each processor to another. But in the eight socket implementation shown in configuration 515, not every socket is directly connected to each other through an HPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The HPI architecture includes a definition of a layered protocol architecture, including in some examples, protocol layers (coherent, non-coherent, and, optionally, other memory based protocols), a routing layer, a link layer, and a physical layer. Furthermore, HPI can further include enhancements related to power managers (such as power control units (PCUs)), design for test and debug (DFT), fault handling, registers, security, among other examples. FIG. 5 illustrates an embodiment of an example HPI layered protocol stack. In some implementations, at least some of the layers illustrated in FIG. 5 may be optional. Each layer deals with its own level of granularity or quantum of information (the protocol layer 605a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, HPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

Figure 6:
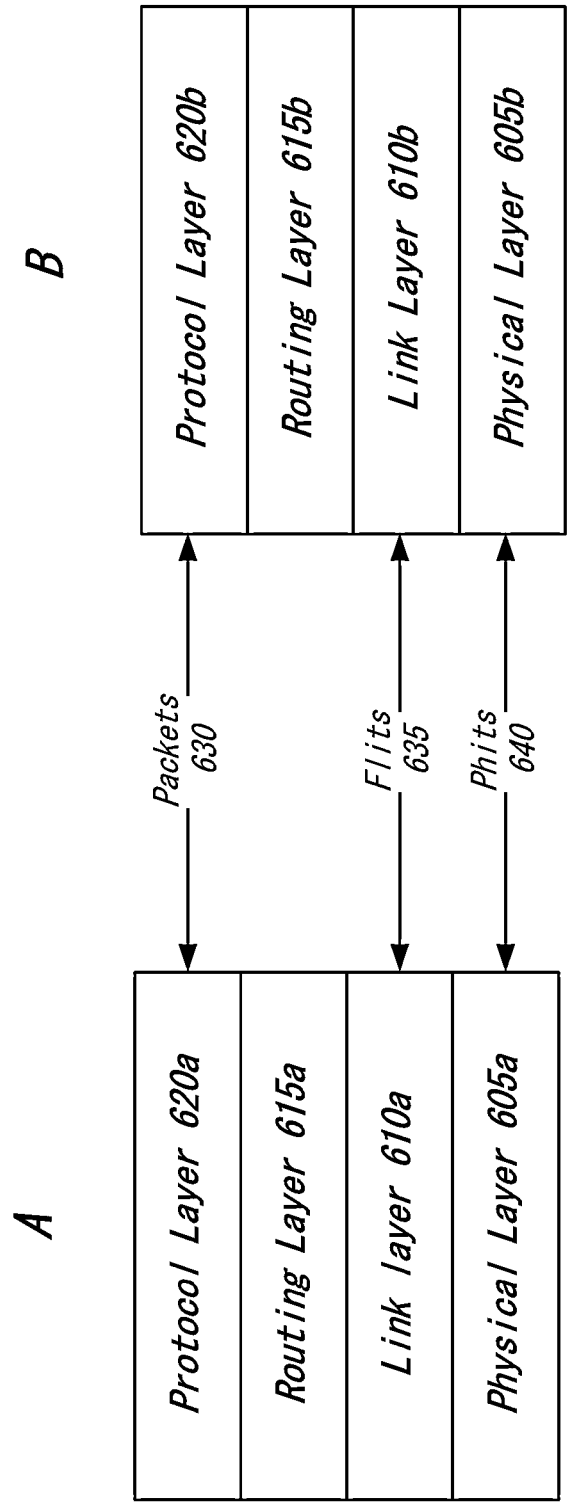
FIG. 6 illustrates an embodiment of a layered protocol stack associated with HPI.

The Physical layer 605a,b (or PHY) of HPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, HPI can include a Coherence Protocol layer 620a,b to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing the HPI Coherence Protocol. First, the protocol can maintain data consistency, as an example, on a per-address basis, among data in agents' caches and between those data and the data in memory. Informally, data consistency may refer to each valid line of data in an agent's cache representing a most up-to-date value of the data and data transmitted in a coherence protocol packet can represent the most up-to-date value of the data at the time it was sent. When no valid copy of the data exists in caches or in transmission, the protocol may ensure the most up-to-date value of the data resides in memory. Second, the protocol can provide well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

In some implementations, HPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

Physical Layer

A link can be established between two agents on either side of an interconnect. An agent sending data can be a local agent and the agent receiving the data can be a remote agent. State machines can be employed by both agents to manage various aspects of the link. In one embodiment, the Physical layer datapath can transmit flits from the link layer to the electrical front-end. The control path, in one implementation, includes a state machine (also referred to as a link training state machine or the similar). The state machine's actions and exits from states may depend on internal signals, timers, external signals or other information. In fact, some of the states, such as a few initialization states, may have timers to provide a timeout value to exit a state. Note that detect, in some embodiments, refers to detecting an event on both legs of a lane; but not necessarily simultaneously. However, in other embodiments, detect refers to detection of an event by an agent of reference. Debounce, as one example, refers to sustained assertion of a signal. In one embodiment, HPI supports operation in the event of non-function lanes. Here, lanes may be dropped at specific states.

States defined in the state machine can include reset states, initialization states, and operational states, among other categories and subcategories. In one example, some initialization states can have a secondary timer which is used to exit the state on a timeout (essentially an abort due to failure to make progress in the state). An abort may include updating of registers, such as status register. Some states can also have primary timer(s) which are used to time the primary functions in the state. Other states can be defined such that internal or external signals (such as handshake protocols) drive transition from the state to another state, among other examples.

A state machine may also support debug through single step, freeze on initialization abort and use of testers. Here, state exits can be postponed/held until the debug software is ready. In some instance, the exit can be postponed/held until the secondary timeout. Actions and exits, in one embodiment, can be based on exchange of training sequences. In one embodiment, the link state machine is to run in the local agent clock domain and transition from one state to the next is to coincide with a transmitter training sequence boundary. Status registers may be utilized to reflect the current state.

Figure 7:
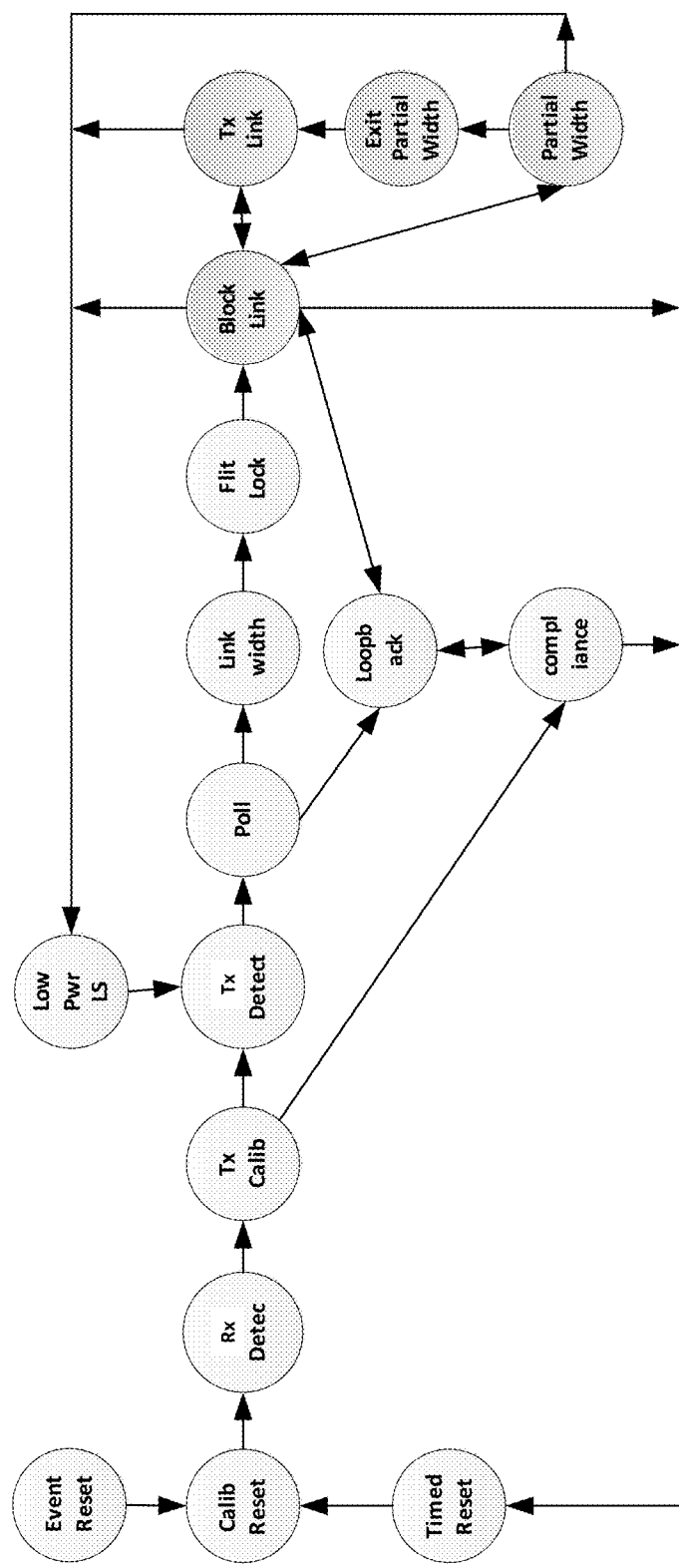
FIG. 7 illustrates a representation of an example state machine.

FIG. 7 illustrates a representation of at least a portion of a state machine used by agents in one example implementation of HPI. It should be appreciated that the states included in the state table of FIG. 7 include a non-exhaustive listing of possible states. For instance, some transitions are omitted to simplify the diagram. Also, some states may be combined, split, or omitted, while others might be added. Such states can include:

Event reset state: entered on a warm or cold reset event. Restores default values. Initialize counters (e.g., sync counters). May exit to another state, such as another reset state.

Timed reset state: timed state for in-band reset. May drive a predefined electrical ordered set (EOS) so remote receivers are capable of detecting the EOS and entering the timed reset as well. Receiver has lanes holding electrical settings. May exit to an agent to calibrate reset state.

Calibrate reset state: calibration without signaling on the lane (e.g. receiver calibration state) or turning drivers off. May be a predetermined amount of time in the state based on a timer. May set an operational speed. May act as a wait state when a port is not enabled. May include minimum residency time. Receiver conditioning or staggering off may occur based on design. May exit to a receiver detect state after a timeout and/or completion of calibration.

Receiver detect state: detect presence of a receiver on lane(s). May look for receiver termination (e.g. receiver pulldown insertion). May exit to calibrate reset state upon a specified value being set or when another specified value is not set. May exit to transmitter calibrate state if a receiver is detected or a timeout is reached.

Transmitter calibrate state: for transmitter calibrations. May be a timed state allocated for transmitter calibrations. May include signaling on a lane. May continuously drive an EOS, such as an electric idle exit ordered set (or EIEIOS). May exit to compliance state when done calibrating or on expiration of a timer. May exit to transmitter detect state if a counter has expired or a secondary timeout has occurred.

Transmitter detect state: qualifies valid signaling. May be a handshake state where an agent completes actions and exits to a next state based on remote agent signaling. Receiver may qualify valid signaling from transmitter. Receiver, in one embodiment, looks for a wake detect, and if debounced on one or more lanes looks for it on the other lanes. Transmitter drives a detect signal. May exit to a polling state in response to debounce being completed for all lanes and/or a timeout or if debounce on all lanes is not complete and there is a timeout. Here, one or more monitor lanes may be kept awake to debounce a wake signal. And if debounced then the other lanes are potentially debounced. This can enable power savings in low power states.

Polling state: receiver adapts, initializes drift buffer and locks on bits/bytes (e.g. identifies symbol boundaries). Lanes may be deskewed. A remote agent may cause an exit to a next state (e.g. a Link Width State) in response to an acknowledge message. Polling can additionally include a training sequence lock by locking to an EOS and a training sequence header. Lane to lane skew at remote transmitter may be capped at a first length for top speed and a second length for slow speed. Deskew may be performed in a slow mode as well as an operational mode. Receiver may have a specific maximum to deskew lane-to-lane skew, such as 8, 16, or 32 intervals of skew. Receiver actions may include latency fixing. Receiver actions, in one embodiment, can be completed on successful deskew of a valid lane map. A successful handshake can be achieved, in one example, when a number of consecutive training sequence headers are received with acknowledgements and a number of training sequences with an acknowledge are transmitted after the receiver has completed its actions.

Link width state: agent communicates with the final lane map to remote transmitter. Receiver receives the information and decodes. Receiver may record a configured lane map in a structure after checkpoint of a previous lane map value in a second structure. Receiver may also respond with an acknowledge ("ACK"). May initiate an in-band reset. As one example, first state to initiate in-band reset. In one embodiment, exit to a next state, such as flit configuration state, is performed in response to the ACK. Further, prior to entering low power state, a reset signal may also be generated if the frequency of a wake detect signal occurrence drops below a specified value (e.g. 1 every number of unit intervals (UIs), such as 4K UI). Receiver may hold current and previous lane maps. Transmitter may use different groups of lanes based on training sequences having different values. Lane map may not modify some status registers in some embodiments.

Flitlock configuration state: entered by a transmitter but the state is considered exited (i.e. secondary timeout moot) when both transmitter and receiver have exited to a blocking link state or other link state. Transmitter exit to a link state, in one embodiment, includes start of a data sequence (SDS) and training sequence (TS) boundary after receiving a planetary alignment signal. Here, receiver exit may be based on receiving an SDS from a remote transmitter. This state may be a bridge from agent to link state. Receiver identifies SDS. Receiver may exit to blocking link state (BLS) (or a control window) if SDS received after a descrambler is initialized. If a timeout occurs, exit may be to reset state. Transmitter drives lanes with a configuration signal. Transmitter exit may be to reset, BLS, or other states based on conditions or timeouts.

Transmitting Link State: a link state. Flits are sent to a remote agent. May be entered from a blocking link state and return to a blocking link state on an event, such as a timeout. Transmitter transmits flits. Receiver receives flits. May also exit to a low power link state. In some implementations, transmitting link state (TLS) can be referred to as the L0 state.

Blocking Link State: a link state. Transmitter and receiver are operating in a unified manner. May be a timed state during which the link layer flits are held off while the Physical layer information is communicated to the remote agent. May exit to a low power link state (or other link state based on the design). A blocking link state (BLS), in one embodiment, periodically occurs. The period is referred to as a BLS interval and may be timed, as well as may differ between slow speed and operational speed. Note that the link layer may be periodically blocked from sending flits so that a Physical layer control sequence of a length may be sent, such as during a transmitting link state or a partial width transmitting link state. In some implementations, blocking link state (BLS) can be referred to as a L0 control, or L0c, state.

Figure 9:
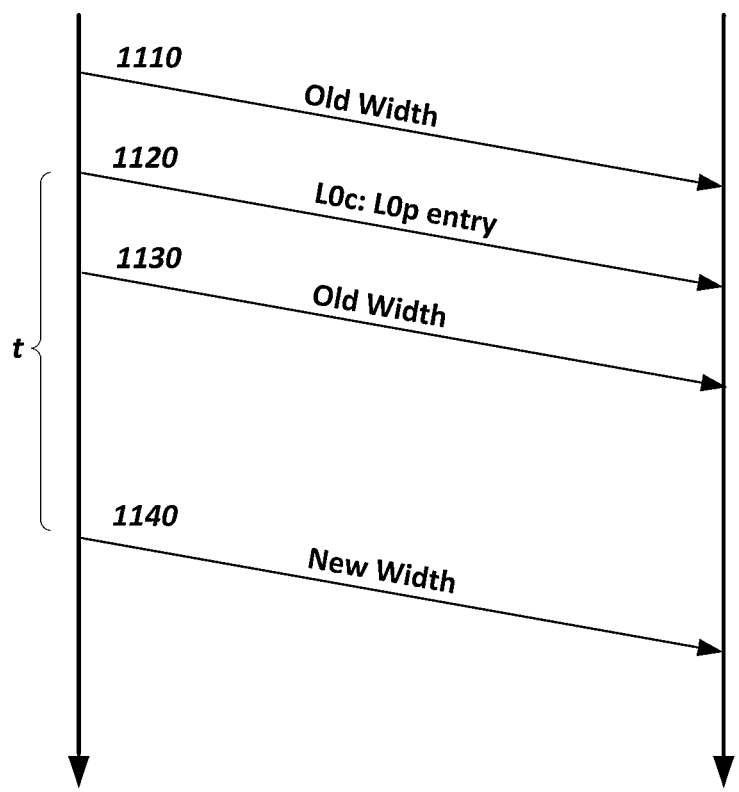
FIG. 9 illustrates a flow diagram of an example transition to a partial width state.

Partial Width Transmitting Link State: Link state. May save power by entering a partial width state. In one embodiment asymmetric partial width refers to each direction of a two direction link having different widths, which may be supported in some designs. An example of an initiator, such as a transmitter, sending a partial width indication to enter partial width transmitting link state is shown in the example of FIG. 9. Here, a partial width indication is sent while transmitting on a link with a first width to transition the link to transmit at a second, new width. A mismatch may result in a reset. Note that speeds may not be altered but width may be. Therefore, flits are potentially sent at different widths. May be similar to a transmitting link state logically; yet, since there is a smaller width, it may take longer to transmit flits. May exit to other link states, such as a low power link state based on certain received and sent messages or an exit of the partial width transmitting link state or a link blocking state based on other events. In one embodiment, a transmitter port may turn idle lanes off in a staggered manner to provide better signal integrity (i.e. noise mitigation) as shown in the timing diagram. Here, non-retry-able flits, such as Null flits, may be utilized during periods where the link width is changing. A corresponding receiver may drop these null flits and turn idle lanes off in a staggered manner, as well as record the current and previous lane maps in one or more structures. Note status and associated status register may remain unaltered. In some implementations, partial width transmitting link state can be referred to as a partial L0, or L0p, state.

Exit Partial Width Transmitting Link State: exit the partial width state. May or may not use a blocking link state in some implementations. The transmitter initiates exit, in one embodiment, by sending partial width exit patterns on the idle lanes to train and deskew them. As one example, an exit pattern start with EIEOS, which is detected and debounced to signal that the lane is ready to start the entry to a full transmitting link state, and may end with SDS or Fast Training Sequence (FTS) on idle lanes. Any failure during the exit sequence (receiver actions, such as deskew not completed prior to timeout) stops flit transfers to the link layer and asserts a reset, which is handled by resetting the link on the next blocking link state occurrence. The SDS may also initialize the scrambler/descrambler on the lanes to appropriate values.

Low Power Link State: is a lower power state. In one embodiment, it is lower power than the partial width link state, since signaling in this embodiment is stopped on all lanes and in both directions. Transmitters may use a blocking link state for requesting a low power link state. Here, receiver may decode the request and respond with an ACK or a NAK; otherwise reset may be triggered. In some implementations, low power link state can be referred to as a L1 state.

In some implementations, state transitions can be facilitated to allow states to be bypassed, for instance, when state actions of the states, such as certain calibrations and configurations, have already been completed. Previous state results and configurations of a link can be stored and reused in subsequent initializations and configurations of a link.

Rather than repeating such configurations and state actions, corresponding states can be bypassed. Traditional systems implementing state bypasses, however, often implement complex designs and expensive validation escapes. Rather than using a traditional bypass, in one example, HPI can utilize short timers in certain states, such as where the state actions do not need to be repeated. This can potentially allow for more uniform and synchronized state machine transitions among other potential advantages.

In one example, a software-based controller (e.g., through an external control point for the Physical layer) can enable a short timer for one or more particular states. For instance, for a state for which actions have already been performed and stored, the state can be short-timed to facilitate a quick exit from the state to a next state. If, however, the previous state action fails or cannot be applied within the short timer duration, a state exit can be performed. Further, the controller can disable the short timer, for instance, when the state actions should be performed anew. A long, or default, timer can be set for each respective state. If configuration actions at the state cannot be completed within the long timer, a state exit can occur. The long timer can be set to a reasonable duration so as to allow completion of the state actions. The short timer, in contrast, may be considerably shorter making it, in some cases, impossible to perform the state actions without reference back to previously-performed state actions, among other examples.

In some instances, during initialization (or re-initialization) of a link, as agents progress through a state machine toward an operational link state, one or more failures or state exits can occur that cause the state to reset (e.g., to a reset or other state). In effect, the initialization of the link can loop through one or more states without completing the initialization and entering a link state. In one example, a count can be maintained for the number of unproductive loops in state transitions within the initialization of a link. For instance, each time an initialization returns to a reset state without reaching a link state a counter can be incremented. The counter can be reset for the link once the link successfully enters a link state. Such counters can be maintained by agents on both sides of the link. Further, a threshold can be set, for instance, by a software-based controller utilizing one or more external control points. When the count of unproductive loops meets (or exceeds) the defined threshold initialization of the link can be suspended (e.g., set and held at or before the reset state). In some implementations, in order to recommence initialization and release the initialization from the suspended state, a software-based controller can trigger a restart or re-initialization of the link. In some instances, the software-based tools can analyze the nature of the suspended initialize and perform diagnostics, set register values, and perform other operations so as to guard against further looping of the initialization. Indeed, in some implementations, a controller can set a higher counter threshold or even override the counter, among other examples, in connection with restarting a suspended link initialization.

In some implementations of HPI, supersequences can be defined, each supersequence corresponding to a respective state or entry/exit to/from the respective state. A supersequence can include a repeating sequence of data sets and symbols. The sequences can repeat, in some instances, until completion of a state or state transition, or communication of a corresponding event, among other examples. In some instances, the repeating sequence of a supersequence can repeat according to a defined frequency, such as a defined number of unit intervals (UIs). A unit interval (UI) can correspond to the interval of time for transmitting a single bit on a lane of a link or system. In some implementations, the repeating sequence can begin with an electrically ordered set (EOS). Accordingly, an instance of the EOS can be expected to repeat in accordance with the predefined frequency. Such ordered sets can be implemented as defined 16 Byte codes that may be represented in hexadecimal format, among other examples. In one example, the EOS of a supersequence can be an EIEIOS. In one example, an EIEOS can resemble a low frequency clock signal (e.g., a predefined number of repeating FF00 or FFF000 hexadecimal symbols, etc.). A predefined set of data can follow the EOS, such as a predefined number of training sequences or other data. Such supersequences can be utilized in state transitions including link state transitions as well as initialization, among other examples.

In some implementations of an interconnect, such as in QPI, terminations of a serial data link can be brought on and off, such as when a link is reset or initialized. This approach can introduce complexity and time into the initialization of a link. In some implementations of HPI, terminations of the link can be maintained including during a reset or re-initialization of the link. Further, HPI can permit hot-plugging of devices. When another device is introduced, either through hot-plugging or otherwise, the voltage characteristics of the lane on which the new remote agent is added will change. The local agent can sense these changes in the lane voltage to detect the presence of the remote agent and prompt initialization of the link. State machine states and timers can be defined in the state machine to coordinate the detection, configuration, and initialization of a link without terminations.

In one implementation, HPI can support re-initialization on an in-band reset without changing the termination values through the screening of a lane by the receiving agent for incoming signaling. The signaling can be used to identify good lanes. As an example, the lane can be screened for any one of a set of pre-defined signals that are to be sent by a transmitter device to facilitate discovery and configuration of the link. In one example, an supersequence can be defined corresponding to one or more initialization or re-initialization tasks. The pre-defined sequence can include an EIEOS followed by additional sequence data. In some instances, as each device on either side of a lane becomes active, the devices can begin sending a supersequence corresponding to a particular initialization state, etc. In one embodiment, two types of pin resets can be supported; power-on (or "cold") reset and warm reset. A reset initiated by software or originating (in the Physical or another layer) on one agent may be communicated in-band to the other agent. However, due to usage of an embedded clock, an in-band reset may be handled by communication to another agent using an ordered set, such as a specific electrical ordered set or EIOS.

The ordered set can be sent during initialization and a PHY control sequence (or "blocking link state") can be sent after initialization. The block link state can block the link layer from sending flits. As another example, link layer traffic may be blocked to send a few NULL flits which may be discarded at the receiver.

As introduced above, initialization, in one embodiment, can be done initially at slow speed followed by initialization at fast speed. Initialization at slow speed uses the default values for the registers and timers. Software then uses the slow speed link to setup the registers, timers and electrical parameters and clears the calibration semaphores to pave the way for fast speed initialization. As one example, initialization can consist of such states or tasks as Reset, Detect, Polling, and Configuration, among potentially others.

In one example, a link layer blocking control sequence (i.e. a blocking link state (BLS) or L0c state) can include a timed state during which the link layer flits are held off while the PHY information is communicated to the remote agent. Here, the transmitter and receiver may start a block control sequence timer. And upon expiration of the timers, the transmitter and receiver can exit the blocking state and may take other actions, such as exit to reset, exit to a different link state (or other state), including states that allow for the sending of flits across the link.

In one embodiment, link training can be provided and include the sending of one or more of scrambled training sequences, ordered sets, and control sequences, such as in connection with a defined supersequence. A training sequence symbol may include one or more of a header, reserved portions, a target latency, a pair number, a physical lane map code reference lanes or a group of lanes, and an initialization state. In one embodiment, the header can be sent with a ACK or NAK, among other examples. As an example, training sequences may be sent as part of supersequences and may be scrambled.

In one embodiment, ordered sets and control sequences are not scrambled or staggered and are transmitted identically, simultaneously and completely on all lanes. A valid reception of an ordered set may include checking of at least a portion of the ordered set (or entire ordered set for partial ordered sets). Ordered sets may include an electrically ordered set (EOS), such as an Electrical Idle Ordered Set (EIOS) or an EIEOS. A supersequence may include a start of a data sequence (SDS) or a Fast Training Sequence (FTS). Such sets and control supersequences can be predefined and may have any pattern or hexadecimal representation, as well as any length. For example, ordered sets and supersequences may be a length of 8 bytes, 16, bytes, or 32 bytes, etc. FTS, as an example, can additionally be utilized for fast bit lock during exit of a partial width transmitting link state. Note that the FTS definition may be per lane and may utilize a rotated version of the FTS.

Supersequences, in one embodiment, can include the insertion of an EOS, such as an EIEOS, in a training sequence stream. When signaling starts, lanes, in one implementation, power-on in a staggered manner. This may result, however, in initial supersequences being seen truncated at the receiver on some lanes. Supersequences can be repeated however over short intervals (e.g., approximately one-thousand unit intervals (or ~1KUI)). The training supersequences may additionally be used for one or more of deskew, configuration and for communicating initialization target, lane map, etc. The EIEOS can be used for one or more of transitioning a lane from inactive to active state, screening for good lanes, identifying symbol and TS boundaries, among other examples.

Figure 8:
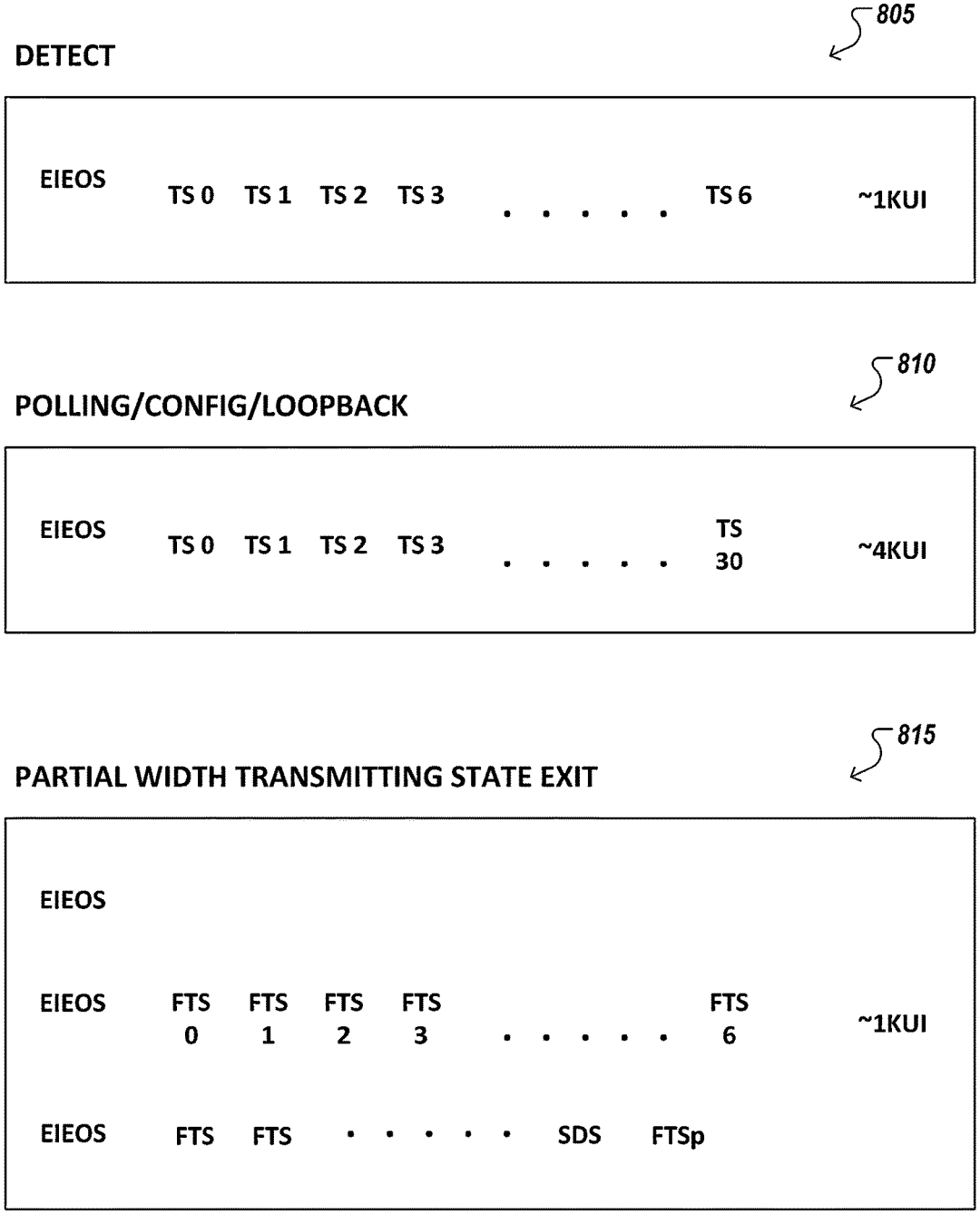
FIG. 8 illustrates example control supersequences.

Turning to FIG. 8, representations of example supersequences are shown. For instance, an exemplary Detect supersequence 805 can be defined. The Detect supersequence 805 can include a repeating sequence of a single EIEOS (or other EOS) followed by a predefined number of instances of a particular training sequence (TS). In one example, the EIEOS can be transmitted, immediately followed by seven repeated instances of TS. When the last of the seven TSes is sent the EIEOS can be sent again followed by seven additional instances of TS, and so on. This sequence can be repeated according to a particular predefined frequency. In the example of FIG. 8, the EIEOS can reappear on the lanes approximately once every one thousand UIs (~1KUI) followed by the remainder of the Detect supersequence 805. A receiver can monitor lanes for the presence of a repeating Detect supersequence 805 and upon validating the supersequence 705 can conclude that a remote agent is present, has been added (e.g., hot plugged) on the lanes, has awoke, or is reinitializing, etc.

In another example, another supersequence 810 can be defined to indicate a polling, configuration, or loopback condition or state. As with the example Detect supersequence 805, lanes of a link can be monitored by a receiver for such a Poll/Config/Loop supersequence 810 to identify a polling state, configuration state, or loopback state or condition. In one example, a Poll/Config/Loop supersequence 810 can begin with an EIEOS followed by a predefined number of repeated instances of a TS. For instance, in one example the EIEOS can be followed by thirty-one (31) instances of TS with the EIEOS repeating approximately every four thousand UI (e.g., ~4KUI).

Further, in another example, a partial width transmitting state (PWTS) exit supersequence 815 can be defined. In one example, a PWTS exit supersequence can include an initial EIEOS to repeat to pre-condition lanes in advance of the sending of the first full sequence in the supersequence. For instance, the sequence to be repeated in supersequence 815 can begin with an EIEOS (to repeat approximately once every 1KUI). Further, fast training sequences (FTS) can be utilized in lieu of other training sequences (TS), the FTS configured to assist in quicker bit lock, byte lock, and deskewing. In some implementations, an FTS can be unscrambled to further assist in bringing idle lanes back to active as quickly and non-disruptively as possible. As with other supersequences preceding an entry into a link transmitting state, the supersequence 815 can be interrupted and ended through the sending of a start of data sequence (SDS). Further, a partial FTS (FTSp) can be sent to assist in synchronizing the new lanes to the active lanes, such as by allowing bits to be subtracted (or added) to the FTSp, among other examples.

Supersequences, such as Detect supersequence 705 and Poll/Config/Loop supersequence 710, etc. can potentially be sent substantially throughout the initialization or re-initialization of a link. A receiver, upon receiving and detecting a particular supersequence can, in some instances, respond by echoing the same supersequence to the transmitter over the lanes. The receiving and validation of a particular supersequence by transmitter and receiver can serve as a handshake to acknowledge a state or condition communicated through the supersequence. For instance, such a handshake (e.g., utilizing a Detect supersequence 705) can be used to identify reinitialization of a link. In another example, such a handshake can be utilized to indicate the end of an electrical reset or low power state, resulting in corresponding lanes being brought back up, among other examples. The end of the electrical reset can be identified, for instance, from a handshake between transmitter and receiver each transmitting a Detect supersequence 705.

In another example, lanes can be monitored for supersequences and use the supersequences in connection with the screening of lanes for detect, wake, state exits and entries, among other events. The predefined and predictable nature and form of supersequences can be further used to perform such initialization tasks as bit lock, byte lock, debouncing, descrambling, deskewing, adaptation, latency fixing, negotiated delays, and other potential uses. Indeed, lanes can be substantially continuously monitored for such events to quicken the ability of the system to react to and process such conditions.

Figure 10:
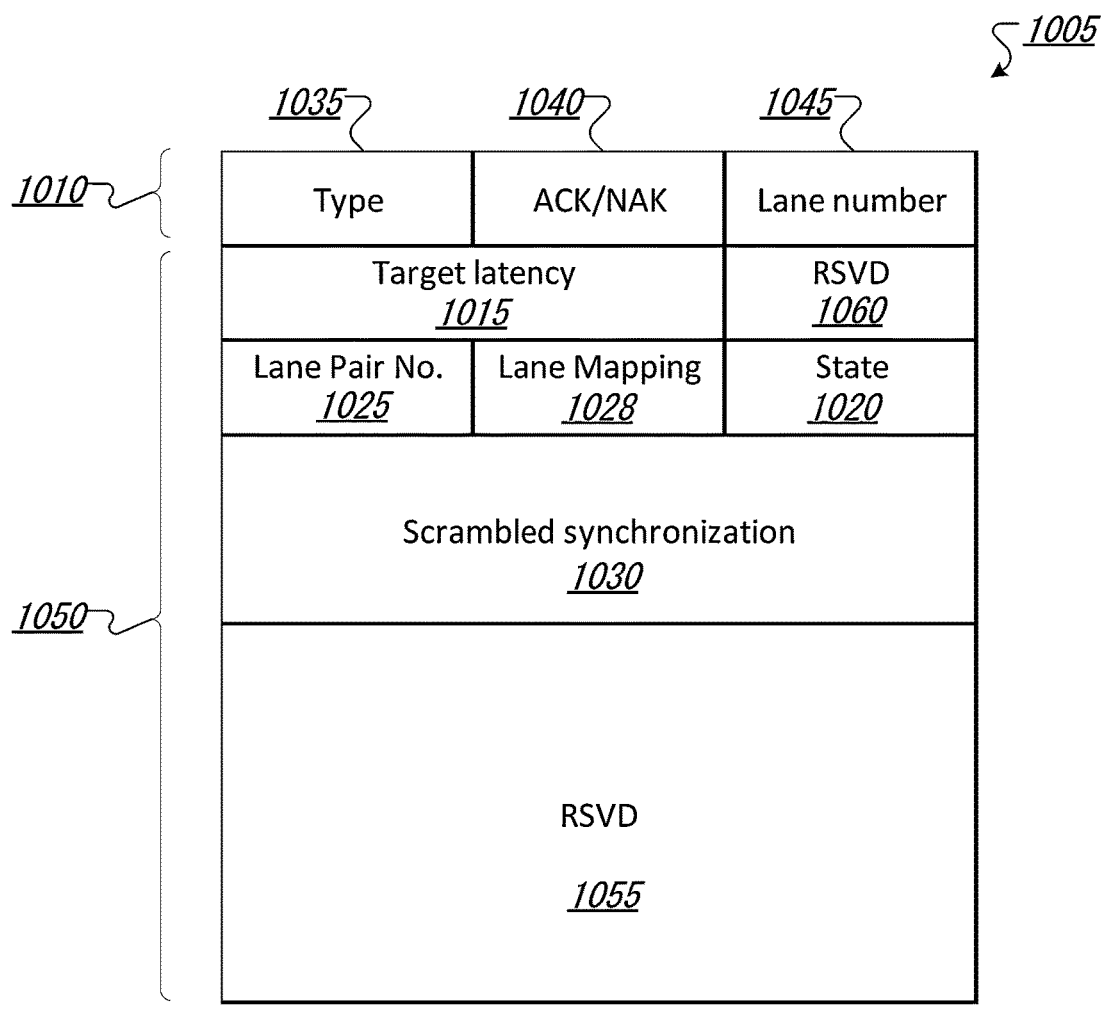
FIG. 10 illustrates an example training sequence.

FIG. 10 represents an example training sequence (TS) in accordance with one example. In FIG. 10, a training sequence 1005 can include a header 1010 and various fields that can be used to communicate information in connection with initialization of a link. For instance, in one example, fields for target latency 1015, state 1020, lane pair number 1025, lane mapping 1028 among other fields can be included. For instance, a scrambler synchronization field 1030 can additionally be provided to assist, among other functions, in synchronizing linear feedback shift registers (LFSR) at a device to allow descrambling of TS fields. Other reserved fields (e.g., 1055, 1060) can also be included in a training sequence (e.g., 1005).

A TS header 1010 can include additional fields that can be used to communicate training sequence type (e.g., from which initialization state can be determined or inferred) 1035, ACK/NAK fields 1040 (e.g., for use in handshaking), lane number fields 1045, and other fields, including reserved fields. In some implementations, portions of a TS can be scrambled, for instance, by a random or pseudo-random binary sequence (PRBS). In one examples, the TS header 1010 can be preserved as cleartext while the remainder (or body (e.g., 1050)) of the TS is scrambled, for instance, by XORing those portions of the TS with a PRBS, among other examples.

In one implementation, a TS can be sixteen (16) bytes in length and the TS header can occupy the first byte (i.e., byte 0) of the TS. The TS payload can be scrambled and occupy the remaining fifteen bytes. In one example implementation, a TS tail or suffix can include the last few bytes of the TS. For instance, in one example, a scrambling synchronization field 1030 can occupy at least three bytes of the TS, for instance bytes 6-8 of the TS. The tail bits of the TS (e.g., bytes 9-15), in this particular implementation, can be maintained as reserved bits (e.g., 1055). Bits in bytes 6-15 can all be set to 0.

In some implementations, HPI can supports use of a TS header (e.g., 1010) can be utilized instead of or in addition to a TS payload for key initialization parameters. In some implementations, TS payload may be used to exchange initialization parameters like ACKs and lane numbers. DC levels for communicating lane polarity may also be used. However, in some implementations, HPI can implement DC-balanced codes in the TS header (e.g., 1010) for key parameters. For instance, in instances where a TS header is unscrambled, available TS header codes can be defined so that the number of "1"s substantially equal the number "0"s appearing in the TS header fields (e.g., 1035, 1040, 1045). DC balance can be realized throughout the remainder of the TS (e.g., the TS payload) by scrambling bits of the TS payload by XORing the bits against a random or pseudo-random binary sequence.

In one example implementation, a PRBS sequence can be utilized with at least 23 bits (PRBS23). The PRBS can be generated according to a particular selected polynomial. In one example, the PRBS can be generated by a similar bit size, self-seeded storage element, such as a linear feedback shift register (LFSR). The LFSR can be a 23-bit Fibonacci LFSR capable of generating a PRBS sequence of over 8 Mb in length. The PRBS can repeat following the end of the sequence. In some implementations, the entirety of the PRBS23 sequence can be used in the scrambling of training sequences included in supersequences used, for instance, in initialization of the link in HPI.

While the full length of a PRBS sequence can be used, in some implementations, HPI can support allowing the use of varying lengths of the available PRBS sequence (e.g., the use of only a portion of the PRBS23 sequence). In some examples, a controller of a device can specify that only a portion of the full length of a PRBS sequence be utilized. This can be desirable, for instance, in testing applications where repeatability of bit sequences is desired, among potentially other applications. A software-based controller can specifying varying lengths of the PRBS to be applied. For instance, BIOS of a device can specify the PRBS length to be applied on the link. In some implementations, use of the full length of the PRBS sequence can be the default setting, for instance, so as to maximize the benefits of the lengthy PRBS sequence.

Lane traffic in a transmitting link state (TLS) and training sequences can be scrambled with a PRBS of a particular minimum length (e.g., 23 bits). The starting seed applied to a stream can be varied between the lanes to enhance the electrical benefits of the PRBS on the link. In one example implementations, the PRBS can be generated by a 23 bit Fibonacci LFSR implementing a 6-tap generator polynomial, such as, $(x^{23}+X^{21}+x^{16}+x^{8}+x^{5}+X^{2}+1)$.

The starting (on scrambler/descrambler initialization) seed values for lane number modulo 8 may be any value, for instance, 8 hexadecimal values where each one is associated with 2 or 3 of the lanes in a link. Use of such seeds can result in rotating (or staggering) of the PRBS between the lanes. The number of LFSRs can be reduced by using the property that even lane PRBS can be derived from an XOR of PRBS of odd lanes. The EIEOS and header of the training sequences are not scrambled. The entry point of a supersequence on each lane can be initiated (e.g., where the transmitter starts driving) at a different point on each lane. This can enable the lanes to be turned on in a staggered manner in order to reduce noise in the power delivery system. Indeed, each lane can have its own instance of an LFSR. The staggering times can vary by the number of lanes being turned on and may be implementation dependent during initialization. These can be specified in the timing diagrams and timer profiles for partial transmitting width state exit. Further, fast training sequences (FTS) (also discussed below) can also be rotated by lane.

In some instances, scrambling can reduce power supply noise at transmitter and provide a richer frequency spectrum at receiver. The scrambler can be initialized by the first EIEOS transmitted. The descrambler can be synchronized to the scrambler, for instance, through self-seeding. For instance, the received 23 bit pattern can be embedded in a field of the TS as a seed. In one example, the 23 bit seed can be identified from the scrambling of the bits of the scrambling synchronization field (e.g., 1050). The receiver can utilize the seed value to identify the specific location of the PRBS used to scramble the received TS. For instance, a receiver can identify the seed and load the seed into its own LFSR to synchronize to the PRBS used by the transmitter. In some instances, a receiver may read multiple scrambling synchronization field or multiple TSes in a supersequence in order to seed its own LFSR. Upon detecting and synching to the PRBS of the transmitter however, a receiver can descramble the remainder of the TSes as well as all subsequent TS sent in supersequences during initialization of the link, among other examples.

Supersequences can be used to facilitate bit lock and synchronization on a lane. As discussed above, at least a portion of the supersequences can be scrambled. Returning to the discussion of FIG. 8, a detect supersequence can be used by a receiver to detect, or lock, the bit and byte edges of the received bit stream and identify which bytes are being sent in the supersequence. For instance, the EIEOS and TS header can be left unscrambled to assist the receiver in more quickly locking to the supersequence. Additionally, the supersequence can be defined to allow the EIEOS (and beginning of the supersequence) to repeat at a relatively short frequency (e.g., to more quickly allow the receiver another chance to detect the EIEOS in the event that the first EIEOS was not accurately detected). For instance, in one example, a supersequence can be defined to repeat every 1KUI or shorter. Such supersequences can further allow more randomized transitions during initialization, as well as simplifying TS lock, latency fixing, and other actions.

Additionally, leaving the EIEOS and TS header unscrambled can allow byte lock to occur and permit the receiver to be able to identify the location of subsequent bytes and symbols (including scrambled TS symbols). For instance, the edge of the unscrambled TS header can be identified and thereby also the start of scrambling synchronization field (e.g., 1050) (e.g., by simply counting the number of bytes from the edge of the TS header to the symbol). Upon detecting the PRBS seed in the scrambling synchronization field, the receiver will know the following PRBS pattern values and will also be able to predict the values of subsequent scrambling synchronization field (e.g., 1050) values. Accordingly, the receiver, upon locking to the PRBS can further utilize the scrambling synchronization field (e.g., 1050) values to facilitate other configuration tasks such as adaptation, deskew, and other tasks.

On multi-lane links, symbols can be sent simultaneously on all lanes by a transmitter, however, link-to-link skew can manifest with some symbols not arriving at the receiver at the same time. Sources of skew can include, for instance, chip differential drivers and receivers, printed wiring board impedance variations, lane wire length mismatches, among other examples. In one embodiment, HPI provides advanced logic to deskew lanes. As an example, the TS boundary after TS lock can be used to deskew the lanes. For instance, TS lock can be used to detect skew (e.g., that a TS is arriving on one lane later than another TS on another one of the link's lanes). An EIEOS can also be used to detect skew. In addition, using the predictability of a synched PRBS pattern, some implementations of HPI may deskew by comparing lane PRBS patterns in the LFSR during specific points in the payload. Further, in some instances, scrambling of training sequences can be re-initialized and deskew can be performed by doing a table lookup of PRBS values during the re-seeding of the training sequence, among other examples. Deskew can be useful in testchips, for instance, which may lack ability to detect TS or state machines to manage the deskew, among other examples.

Upon detecting skew, HPI logic (e.g., provided through a software-supported controller) can identify the skew on each lane relative to other lanes in a link and adjust the lanes to attempt to eliminate the skew. For instance, "faster" lanes can be artificially slowed based on the delay detected in a lane-to-lane skew to accommodate the symbols of the "slower" lanes arriving substantially simultaneously with the delayer "faster" lanes, among other examples.

In the case of adaptation, electrical characteristics of a lane can be adjusted between a transmitter and receiver based, for instance, on sample data transmitted between the transmitter and receiver. For instance, receiver adaptation can include the transmitter sending a data pattern to the receiver with logic at the receiver adjusting electrical characteristics at the receiver to adapt the lane for the link. Transmitter adaptation can involve the transmitter sending sample data to the receiver and the receiver sending feedback to the transmitter that can be used by the transmitter to make adjustments at the transmitter to adapt the lane. The receiver can continue to send feedback to the transmitter based on the adjustments made at the transmitter.

In one example, adaptation sample data can be embodied through scrambled TS data. As one example, a fixed UI pattern may be utilized to scramble with a bypass to an adaptation state. But by scrambling TS with PRBS23, receiver adaptation may be performed without the bypass. In addition, offset and other errors may be reduced during clock recovery and sampling. The randomness provided through the a long PRBS sequence (e.g., PRBS23) can prove an effective sample stream for adaptation. Further, in some implementations, a lane can be set to operate in slow mode to assist the logic in analyzing and adapting to sample data received on the lane. Upon approving the characteristics of the lane through adaptation, the adapted characteristics can be set and applied to the initialization of the link.

Once the link has been successfully calibrated and configured, initialization can end and transition to the transmitting link state (TLS) in which flits begin to be transmitted. In some implementations of HPI, transitions to TLS can be based on planetary alignment on the system. For instance, a planetary alignment signal can indicate an opportunity to transition to TLS. Rather than transitioning at an edge of a supersequence, EIEOS, or TLS, some implementations of HPI can utilize a start of data sequence (SDS) symbol sent in accordance with the planetary alignment to end initialization and transition to TLS. In one example, an SDS can be sent anywhere in an initialization bit stream. Accordingly, a receiver can continuously scan received bits for the SDS to hasten ending of the initialization in accordance with a planetary alignment.

In one example, an example EIEOS can emulate a low frequency clock signal, such as a repeating FF00 signal. An example SDS can include a repeating F0 signal in some implementations. Accordingly, in such instances, detecting an SDS sent in the middle of an EIEOS can be relatively simple to identify, as the risk of aliasing within the EIEOS can be minimal. Scrambling of TS payloads, however, and the resulting randomness of the TS data can introduce the risk of aliasing of some forms of an SDS. In some implementations, a PRBS can be generated that will never alias an SDS over any particular span of a number of bits. Further, a tail or suffix can be provided on a TS, such as using the last bytes of the TS to cause the PRBS to be XOR 0 values in the suffix and effectively present the PRBS in cleartext at the end of the TS. If the suffix is sufficiently long, the PRBS values reflected in the scrambled suffix can make it virtually impossible for an SDS to be aliased in the scrambled payload of a TS. For instance, in one example, the SDS can be defined as ten consecutive bytes of the value F0 (i.e., 1111000011110000 . . . ). Further, a suffix of seven reserved bytes can be provided in a TS immediately following three bytes of a scrambling synchronization field (e.g., 1050), as shown for instance in the example of FIG. 10. As a result, the length of the zeroed TS suffix (e.g., ten total bytes) can correspond to the SDS value (e.g., ten bytes of F0) chosen which has been selected as not appear within a selected scrambling PRBS (e.g., PRBS23), among other examples. For instance, based on the polynomial utilized in an implementation of PRBS23 (or another PRBS) no ten byte sequence in PRBS23 will ever equal the selected SDS value, among other examples.

In some implementations, on exit from a Configuration state to TLS, the transmit and receive LFSRs can be re-initialized by the SDS exchanged between transmitter and receiver. For instance, in eight starting PRBS seeds can be applied to lanes 0 . . . 7, 12 . . . 19, and 8 . . . 11 (e.g., first four only) respectively. Further, lane reversal of a link and polarity inversion of a lane can also be determined, for instance, by comparing the unscrambled first byte of the TS (e.g., the TS header) after the EIEOS to a set of possible values, among other examples.

In the case of debouncing, transients can be introduced on lanes as a result of a variety of conditions. For instance, the addition or powering-on of a device can introduce transients onto the lane. Additionally, voltage irregularities can be presented on a lane because of poor lane quality or electrical failure. In some cases "bouncing" on a lane can produce false positives, such as a false EIEOS. However, in some implementations, while supersequences can be begin with an EIEOS, defined supersequences can further include additional sequences of data as well as a defined frequency at which the EIEOS will be repeated. As a result, even where a false EIEOS appears on a lane, a logic analyzer at the receiver can determine that the EIEOS is a false positive by validating data that succeeds the false EIEOS. For instance, if expected TS or other data does not follow the EIEOS or the EIEOS does not repeat within a particular one of the predefined frequencies of one of the predefined supersequences, the receiver logic analyzer can fail validation of the received EIEOS. As bouncing can occur at start up as a device is added to a line, false negatives can also result. For instance, upon being added to a set of lanes, a device can begin sending a Detect supersequence 705 to alert the other side of the link of its presence and begin initialization of the link. However, transients introduced on the lanes may corrupt the initial EIEOS, TS instances, and other data of the supersequence. However, a logic analyzer on the receiving device can continue to monitor the lanes and identify the next EIEOS sent by the new device in the repeating Detect supersequence 705, among other examples.

In one example, a transmitting device can attempt to enter a particular state. For instance, the transmitting device can attempt to activate the link and enter an initialization state.

In another example, the transmitting device can attempt to exit a low power state, such as an L1 state, among other examples. In some instances of an L1 state, the L1 state can serve as a power savings, idle, or standby state. Indeed, in some examples, main power supplies may remain active in the L1 state. In exiting an L1 state, a first device can send a supersequence associated with transitioning from the L1 state to a particular other state, such as an L0 transmitting link state (TLS). The supersequence, as in other examples, can be a repeating sequence of an EOS followed by a predetermined number of TSes such that the EOS is repeated at a particular predefined frequency. In one examples, a Detect supersequence can be used to exit the L1 or other low power state. A receiving device can receive and validate the data, identifying the supersequence, and the receiving device can complete the handshake with the transmitting device by sending the supersequence back to the transmitting device.

With both the transmitting and receiving devices receiving the same supersequence, each device can further perform additional initialization tasks utilizing the supersequences. For instance, each device can perform debouncing, bit lock, byte lock, descrambling, and deskewing utilizing the supersequences. Additional initialization information can be communicated through the headers and payloads of the TSes included in the supersequences. When the link is initialized, a start data send (SDS) sequence can be sent, in some cases, interrupting the supersequence (e.g., sent in the middle of a TS or EIEOS) and the respective devices on either side of the link can prepare for the synchronized entry into TLS. In TLS, or an "L0" state, supersequences can be ended and flits can be transmitted utilizing the Link layer of the protocol stack.

Figure 11:
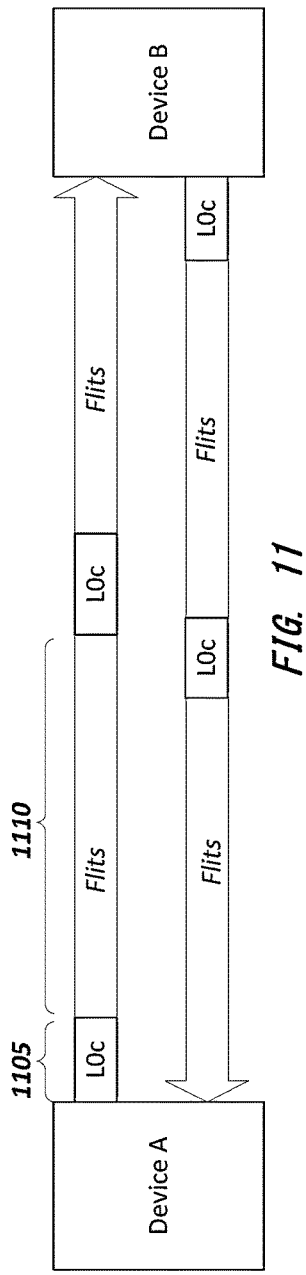
FIG. 11 illustrates a representation of an example control window embedded in a data stream.

While in TLS, the Physical layer may still be provided limited opportunities to perform control tasks. For instance, bit errors and other errors may be identified on one or more lanes during an L0 state. In one implementation, a control state L0c can be provided. The L0c state can be provided as a periodic window within the TLS to allow Physical layer control messages to be sent between streams of flits sent through the Link layer. For instance, as represented in the example illustrated in FIG. 11, an L0 state can be subdivided into L0c intervals. Each L0c interval can begin with a L0c state or window (e.g., 1105) in which Physical layer control codes and other data can be sent. The remainder (e.g., 1110) of the L0c interval can be dedicated to the sending of flits. The length of the L0c interval and L0c state in each interval can be programmatically defined, for instance by BIOS of one or more devices or another software-based controller, among other examples. The L0c state can be exponentially shorter than the remainder of an L0c interval. For instance, in one example, the L0c can be 8UI while the remainder of the L0c interval is on the order of 4 KUI, among other examples. This can allow windows in which relatively short, predefined messages can be sent without substantially disrupting or wasting link data bandwidth.

Figure 12:
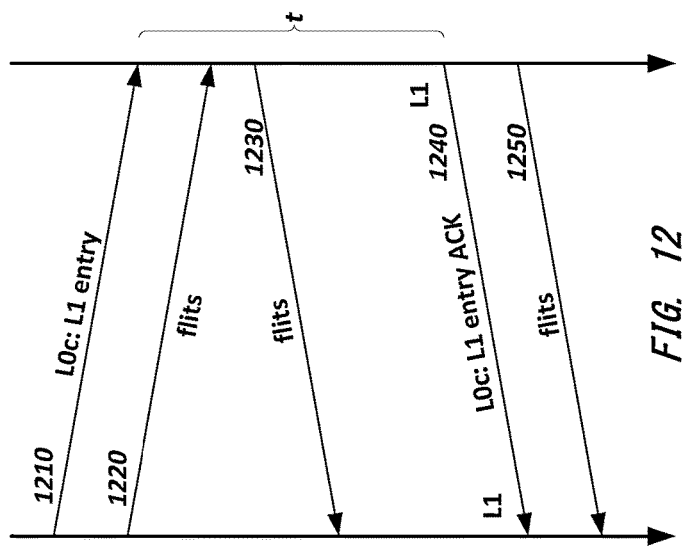
FIG. 12 illustrates a flow diagram of an example handshake.

L0c state message can communicate a variety of conditions at the Physical layer level. In one example, one device can initiate a reset of the link or a lane, for instance, based on bit errors or other errors in excess of a particular threshold amount. Such errors can also be communicated in L0c windows (such as preceding L0c windows). The L0c state can also be leveraged to realize other in-band signaling, such as signaling for use in aiding or triggering transitions between other link states. In one example, L0c messages can be utilized to transition a link from an active L0 state to a standby or low power state, such as an L1 state. As shown in the simplified flow diagram of FIG. 12, a particular L0c state can be used to communicate a L1 entry request (e.g., 1210). Further flits (e.g., 1220, 1230) can be sent while the device (or agent on the device) waits for an acknowledgement of the request 1210. The other device on the link can send the acknowledgement (e.g., 1240). In some examples, the acknowledgement can also be sent in a L0c window. In some instances, the acknowledgement can be sent in the next L0c window following receipt/sending of the L1 request 1210. Timers can be employed to synchronize the L0c intervals at each device and the requesting device can identify the acknowledgement 1240 as an acknowledgement of the request 1210 (e.g., rather than an independent L1 entry request) based on an identification that the acknowledgement 1240 was sent at the next L0c window, among other examples. In some instances, an acknowledgement can be communicated through an L0c code distinct from that used in the L1 entry request 1210. In other instances, the acknowledgement 1240 can include the echoing of the L1 entry request code used in request 1210, among other examples. Further, in alternative examples, a non-acknowledge signal or NAK can be communicated in the L0c window.

In addition (or as an alternate) to handshaking using L0c codes, supersequences, such as Detect supersequence, can be sent in connection with resetting and re-initializing the link. Further handshaking can occur between the devices as the supersequences sent by a first device and echoed by the second, receiving device. Supersequences can be used, as described above, to assist in the reinitialization of the link including debouncing, bit lock, byte lock, descrambling, and deskewing the lanes of the link. Further, the devices can utilize the timer (e.g., embodying the L0c interval) to synchronize entry of the devices and the link into the requested L1 state. For instance, receipt of the acknowledgement 1240 can indicate to the devices that they are to mutually enter (or begin entering) the L1 state at the end of the L0c interval corresponding to the L0c window in which the acknowledgement was sent, among other examples. For instance, data sent in an L0c window included in or otherwise associated with the acknowledgement 1240 can indicate the time at which the devices are to enter the L1 state, among other potential examples. Additional flits (e.g., 1250), in some instances, can be sent while the devices await the timeout corresponding to the transition into the L1 state.

In some implementations of HPI, links can be established upon any number of two or more lanes. Further, a link can be initialized at a first number of lanes and later transition to a partial width state such that only a portion of the number of lanes is used. The partial width state can be designated as a lower power state, such as a L0p state. In one example, an L0c state can be used to transition from a L0 state where the first number of lanes is active to an L0p state where a lesser number of lanes are to be active. For instance, as shown in the example of FIG. 9, an link can be active at a first width 910. In some instances, the first width can be the full width (e.g., at L0). In other instances, the link can transition from a first L0p state utilizing a first number of lanes to another L0p using a different number (or set) of lanes, among other examples. During a L0c window of the lanes in the first width, a L0p entry code 920 can be transmitted. The L0p entry request 920 can identify what new width should be applied. In some instances, the new link width can be predetermined and identified simply from the receipt of the L0p request 920. Additionally, the particular lanes to be dropped in the partial width state can also be specified or otherwise identified or preconfigured in connection with the L0p request 920, among other examples.

Continuing with the example of FIG. 9, flits or other data can continue to be sent across the full width of lanes while the link awaits transition into the L0p state. For instance, a duration t can be specified by synchronized timers at the devices connected through the link to synchronize entry into the L0p state. In one example, the duration t can correspond to a remainder of a L0c interval corresponding to the request 920. At the end of the interval a portion of the lanes will remain active while another portion of the lanes are put into an inactive or idle state. The link will then operate at the new width (e.g., 940), at least until an L0 p exit request or other link width transition request is received, among other examples.

HPI can utilize one or more power control units (PCU) to assist in timing transitions between an L0 state and lower power states, such as L0p and L1. Further, HPI can support master-slave, master-master and other architectures. For instance, a PCU may be present on or otherwise associated with only one of the devices connected on a link and the device having the PCU can be considered the master. Master-master configurations can be realized, for instance, when both devices have an associated PCU which can prompt a link state transition. Some implementations can specify a minimum stay for a particular low power state, such as L0p or L1, for example, to attempt minimize transitions between states and attempt to maximize power savings within an entered low power state, among other examples.

Exiting from a partial width low power state can be adapted to take place efficiently and quickly so as to minimize the impact and interruption of the active lanes. In some implementations, L0c windows and codes can also be used to trigger an exit from an L0p or other state to reactive idle lanes. Turning, for instance, to the examples of FIG. 13, a simplified flow diagram is shown illustrating an example exit from an L0p state. In the particular example of FIG. 13, flit data (e.g., 1305) can be sent when an L0c window 1310 is encountered in which a L0 entry (or L0p exit) request is included. Additional flits 1315 can be sent prior to the point at which the L0p exit is to occur. As in other examples, an L0c code 1310 can include identification of or implicitly identify a time at which a state transition is to begin/end as well as particular events of the state transition. Flits (e.g., 1315) can continue to be sent to maximize data transfer while the devices anticipate to enter the state transition.

In one example, an EIEOS 1320 (or other data such another EOS) can be sent on the inactive lanes to begin conditioning the lanes. In some instances, such inactive lanes (e.g., lanes "n+1 " through "z") may have been inactive for some time and waking the lanes can introduce electrical transients and other instability. Accordingly, the EIEOS 1320, as well as partial width supersequences sent in connection with the exit from the L0p state can be used to debounce the lanes as they awake. Further, in some instances, transients on the waking lanes (e.g., lanes "n+1 " through "z") can potentially affect the active lanes (e.g., lanes "0 " through "n"). To prevent against irregularities stemming from the re-awakening of the idle lanes negatively impacting the active lanes, the active lanes can be synchronized to send null flits (e.g., at 1325) at or immediately prior to the initial signals (e.g., 1320) being sent over the waking lanes.

In some implementations, re-initialization of the idle lanes can be timed to begin, such as at the conclusion of a corresponding L0c interval. In other instances, an alternative time can be employed to start re-initialization early. In such instances, a transmitter of the L0p exit request can cause the idle lanes to be pre-conditioned, for instance, through the sending of one or more single EIEOSes. The sending of such conditioning signals can be coordinated with the active lanes so that null flits are sent momentarily on the active lanes to coincide with the initial sending of the EIEOS and protect the active lanes from interfering transients at the start-up of the idle lanes, among other examples. For instance, Link layer buffers can be alternatively or additionally used to protect against bit loss resulting from such transients in reawaking idle lanes, among other techniques.

Further, in some implementations, following the sending of an initial EIEOS (or supersequence) a partial width state exit supersequence (e.g., 1330) can be sent. At least a portion of the supersequence can be repeated on the active lanes (e.g., at 1325). Further, the device receiving supersequence 1325 can echo the supersequence to handshake and acknowledge the state transition, among other examples. The sending of the supersequence (e.g., 1330) can be further used to perform bit lock, byte lock, debouncing, descrambling, and deskew. For instance, the reactivated lanes can be deskewed against the active lanes. In some instances, the initial configurations determined for the idle lanes in the original initialization of the link can be accessed and applied, although, in other instances, the idle character of the lanes can result in changes to the skew and other lane characteristics resulting in the effective re-initialization of the idle lanes.

Returning briefly to FIG. 8, one example is represented of sequences that can be sent in connection with a partial width transmitting state exit (e.g., a transition from a L0p state to an L0 state). As lanes are to remain active before and after such a transition, a premium can be placed on accelerating the state transition so as to provide minimal disruption to the active lanes. In one example, a partial supersequence can be sent (e.g., as in 1320 of FIG. 13) without the subsequent training sequences to expedite debouncing. For instance, transients can be attempted to be resolved within the first EIEOS without waiting another 1KUI for a second complete EIEOS to be sent to begin bit lock, byte lock, deskew, and other tasks. Further the full partial width transmitting state exit supersequence can include a repeating sequence of an EOS (e.g., EIEOS) followed by a predefined number of training sequences. In the example of FIG. 8, an EIEOS can be sent followed by a series of training sequence (e.g., seven consecutive training sequences). In one implementation, rather than sending a full training sequence (such as a "TS" used in supersequences 805, 810) an abbreviated "fast training sequence" (or FTS) can be sent. The symbols of the FTS can be optimized to assist with the quick bit and byte lock and deskewing of the reactivated lanes, among other features. In one example, the FTS can be less than 150UI in length (e.g., 128UI). Further, FTSes can be left unscrambled so as to further assist in quick recovery of the idle lanes.

As shown in the third row of element 815, a partial width transmitting state exit supersequence can also be interrupted by an SDS once a controller has determined that the reactivated lanes have been effectively initialized. In one example, a partial FTS (or FTSp) can follow the SDS to assist with synchronizing the reactivated lane with the active lanes (e.g., once bit lock, byte lock, and deskewing have been completed). For instance, the bit length of the FTSp can be set to correspond to a clean flit boundary for the final width between the reactivated lanes and the active lanes. To facilitate fast synchronization of the lane, bits can be added or subtracted from a lane at the receiver prior or during the FTSp to account for the skew. Alternatively, or in addition, bits can also be added or subtracted to the lane at the receiver prior or during the SDS to facilitate deskewing of a newly activated lane, among other examples.

Figure 13:
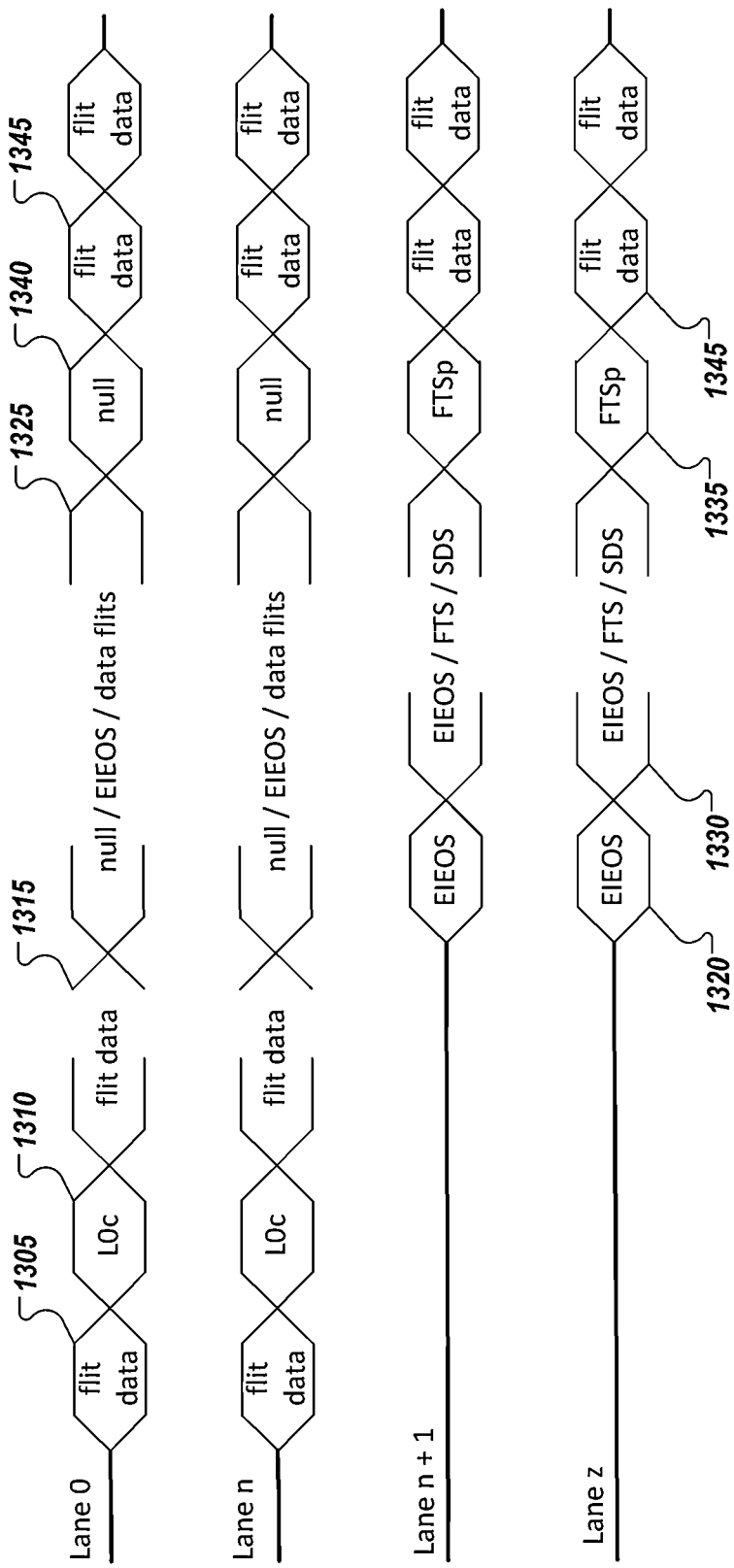
FIG. 13 illustrates an example transition from a partial width state.

Returning to the discussion of FIG. 13, transmission of data flits can be resumed on active lanes (e.g., lanes 0 through n) (e.g., at 1325) while initialization of the waking lanes completes in some examples. For instance, once debouncing has been resolved, link layer transmissions can resume. In some instances, flit transmission can be momentarily interrupted (e.g., at 1340) in connection with the final reactivation and synchronization of the previously idle lanes (e.g., lanes n+1 through z) (e.g., in connection with the sending of an FTSp 1335). With the lanes restored, flit data 1345 can then resume on all lanes.

In some implementations, an HPI link is capable of operating at multiple speeds facilitated by the embedded clock. For instance, a slow mode can be defined. In some instances, the slow mode can be used to assist in facilitating initialization of a link. Calibration of the link can involve software-based controllers providing logic for setting various calibrated characteristics of the link including which lanes the link is to use, the configuration of the lanes, the operational speed of the link, synchronization of the lanes and agents, deskew, target latency, among other potential characteristics. Such software-based tools can make use of external control points to add data to Physical layer registers to control various aspects of the Physical layer facilities and logic.

Operational speed of a link can be considerably faster than the effective operation speed of software-based controllers utilized in initialization of the link. A slow mode can be used to allow use of such software-based controllers, such as during initialization or re-initialization of the link among other instances. Slow mode can be applied on lanes connecting a receiver and transmitter, for instance, when a link is turned on, initialized, reset, etc. to assist in facilitating calibration of the link.

In one embodiment, the clock can be embedded in the data so there are no separate clock lanes. The flits sent over the lanes can be scrambled to facilitate clock recovery. The receiver clock recovery unit, as one example, can deliver sampling clocks to a receiver (i.e. the receiver recovers clock from the data and uses it to sample the incoming data). Receivers in some implementations continuously adapt to an incoming bit stream. By embedding the clock, pinout can be potentially reduced. However, embedding the clock in the in-band data can alter the manner in which in-band reset is approached. In one embodiment, a blocking link state (BLS) can be utilized after initialization. Also, electrical ordered set supersequences may be utilized during initialization to facilitate the reset (e.g., as described above), among other considerations. The embedded clock can be common between the devices on a link and the common operational clock can be set during calibration and configuration of the link. For instance, HPI links can reference a common clock with drift buffers. Such implementation can realize lower latency than elastic buffers used in non-common reference clocks, among other potential advantages. Further, the reference clock distribution segments may be matched to within specified limits.

As noted above, an HPI link can be capable of operating at multiple speeds including a "slow mode" for default power-up, initialization, etc. The operational (or "fast") speed or mode of each device can be statically set by BIOS. The common clock on the link can be configured based on the respective operational speeds of each device on either side of the link. For instance, the link speed can be based on the slower of the two device operations speeds, among other examples. Any operational speed change may be accompanied by a warm or cold reset.

In some examples, on power-on, the link initializes to Slow Mode with transfer rate of, for example, 100 MT/s. Software then sets up the two sides for operational speed of the link and begins the initialization. In other instances, a sideband mechanism can be utilized to set up a link including the common clock on the link, for instance, in the absence or unavailability of a slow mode.

A slow mode initialization phase, in one embodiment, can use the same encoding, scrambling, training sequences (TS), states, etc. as operational speed but with potentially fewer features (e.g., no electrical parameter setup, no adaptation, etc.). Slow mode operation phase can also potentially use the same encoding, scrambling etc. (although other implementations may not) but may have fewer states and features compared to operational speed (e.g., no low power states).

Further, slow mode can be implemented using the native phase lock loop (PLL) clock frequency of the device. For instance, HPI can support an emulated slow mode without changing PLL clock frequency. While some designs may use separate PLLs for slow and fast speed, in some implementations of HPI emulated slow mode can be achieved by allowing the PLL clock to runs at the same fast operational speed during slow mode. For instance, a transmitter can emulate a slower clock signal by repeating bits multiple times so as to emulate a slow high clock signal and then a slow low clock signal. The receiver can then oversample the received signal to locate edges emulated by the repeating bits and identify the bit. In such implementations, ports sharing a PLL may coexist at slow and fast speeds.

A common slow mode speed can be initialized between two devices. For instance, the two devices on a link may have different fast operational speeds. A common slow mode speed can be configured, for instance, during a discovery phase or state on the link. In one example, an emulation multiple can be set as an integer (or non-integer) ratio of fast speed to slow speed, and the different fast speeds can be down-converted to work with the same slow speed. For instance, two device agents which support at least one common frequency may be hot attached irrespective of the speed at which the host port is running. Software discovery may then use the slow mode link to identify and setup the most optimal link operational speeds. Where the multiple is an integer ratio of fast speed to slow speed, different fast speeds may work with the same slow speed, which may be used during the discovery phase (e.g., of hot attach).

In some implementations of HPI, adaptation of lanes on a link can be supported. The Physical layer can support both receiver adaptation and transmitter, or sender, adaptation. With receiver adaptation, the transmitter on a lane can send sample data to the receiver which the receiver logic can process to identify shortcomings in the electrical characteristics of the lane and quality of the signal. The receiver can then make adjustments to the calibration of the lane to optimize the lane based on the analysis of the received sample data. In the case of transmitter adaptation, the receiver can again receive sample data and develop metrics describing the quality of the lane but in this case communicate the metrics to the transmitter (e.g., using a backchannel, such as a software, hardware, embedded, sideband or other channel) to allow the transmitter to make adjustments to the lane based on the feedback. Receiver adaptation can be initiated at the start of the Polling state using the Polling supersequence sent from the remote transmitter. Similarly, transmitter adaptation can be done by repeating the following for each transmitter parameters. Both agents can enter Loopback Pattern state as masters and transmit specified pattern. Both receivers can measure the metric (e.g. BER) for that particular transmitter setting at a remote agent. Both agents can go to Loopback Marker state and then Reset and use backchannels (slow mode TLS or sideband) to exchange metrics. Based on these metrics, the next transmitter setting can be identified. Eventually the optimal transmitter setting can be identified and saved for subsequent use.

In adaptation, a transmitter of an agent can transmit to a remote receiver a random, or pseudo random pattern. In some instances, scrambled supersequences can be used as the pattern. Logic at the receiver can determine characteristics of one or more lanes of the link and generate metric data describing such characteristics. In the case of receiver adaptation, the receiver can attempt to determine optimal configurations for a lane based on the metrics and apply these configurations at the receiver. In the case of transmitter adaptation, the receiver can communicate metrics to the transmitter for use by the transmitter agent to configure and adapt the lane based on the metric. In either instance, in some implementations, hardware or software can be utilized to assess different transmitter settings in algorithmic order to determine the optimal settings.

Receiver adaptation can be initiated at the start of the Polling state using the Polling supersequence sent from the remote transmitter. Similarly, transmitter adaptation can be done by repeating the following for each transmitter param-eters. Both agents can enter Loopback Pattern state as masters and transmit specified pattern. Further, both receivers can measure the metric (e.g. BER) for that particular transmitter setting at a remote agent. Both agents can go to Loopback Marker state and then Reset and use backchannels (slow mode TLS or sideband) to exchange metrics. Based on these metrics, the next transmitter setting can be identified. Eventually the optimal transmitter setting can be identified and saved for subsequent use.

In some implementations, a timer can be used during adaptation. At the conclusion of a predefined timer value, adaptation can be ended, under the assumption that the time value was sufficiently long to permit the transmitter and receiver to have concluded adaptation tasks and successfully adapt the lane. In other implementations, an alternate approach can be utilized to improve the efficiency of adaptation of a link. For instance, in one example, a handshake can be employed to tailor the time spent in adaptation to the time actually used to complete adaptation. In one example, a receiver at a first agent responsible for generating metrics from a sample sent by the transmitter, can send a signal notifying the transmitter that the receiver approves the configuration of the link (or lane(s)) whether adaptation was performed by the receiver or transmitter. Upon receiving the signal, the transmitter can complete the handshake by sending an acknowledgement signal. In some instances, the acknowledgement can indicate similar approval of the link configuration at the transmitter agent, among other examples.

Metric information and other feedback can be communicated from a receiver agent to a transmitter agent in connection with adaptation of a link through a variety of mechanisms. The transmitter, in the case of transmitter adaptation, can identify changes that can be made to one or more attributes of the lane so as to improve the characteristics of the lane. The transmitter can make these changes and send additional sample data on the lanes reflecting these changes. The receiver can then provide additional metric data or feedback, in some instances, to report the quality of the changes. In one example, a receiver can provide metric information through a backchannel. In one example, such a backchannel can be implemented as a software-based backchannel by sending the link (or one or more lanes) into slow mode allowing software tools to analyze the quality of a sample received from the transmitter. The software tool can cause metric information or a configuration recommendation to be communicated to the transmitter agent. This can be accomplished through an in-band communication, software-to-software message, or other means. In another example, a side band channel can be used (when available on the device(s)) as the backchannel. In still another example, a hardware-based channel can be used as the backchannel, such as by reserving one lane between two agents for transmission of the sample and reserving a second lane (at least during an adaptation event) for transmission of the feedback metric data. In still a further example, an embedded channel can be utilized that leverages a control or BLS window for the sending of feedback metric data. The control window can be set to slow mode (e.g., to enable analysis by software), in some examples, while the control interval communicates the sample at operation speed, among other potential examples.

In some instances, adaptation can include the sending of a PRBS (or a PRBS scrambled portion of a supersequence) by the transmitter to the receiver in a Master-Master loopback state. Both agents on a lane can lock to the PRBS and use the sequence as an reference sequence for adaptation.

One or both agents can receive the reference sequence and determine whether the reference sequence was reproduced properly at the agent's receiver. One or both agents can then respectively assess the quality of the lane based on a comparison of the received sequence with the expected reference sequence. For instance, a bit error rate can be determined for the lane based on the comparison. Additionally, logic at the transmitter (or at the receiver) can deliberately inject jitter, noise, or other characteristics to the signal prior to sending during the loopback to test the quality of the lane (e.g., whether the signal can still be understood at the receiver despite the noise), among other features. The results of such assessments, including a determined bit error rate, can be included in metric data used to adapt the link.

Self tests can be performed through functionality provided in some implementations of HPI (e.g., Interconnect Built-In Self Test (IBIST)). Supersequences can be utilized in such self tests. For instance, a transmitter or master can send a pattern including all or a portion of a supersequence, a PRBS sequence, or other sequence. The length and repeatability of such sequences can be controlled in some instances, allowing the full length of a particular sequence to be applied in some instances, while applying only a partial (and repeating) portion of the sequence in other instances. In some examples, a PRBS23 or sequence scrambled using PRBS23 can be utilized in self tests of a link. Additionally, start end points of a sequence can be particularly selected and used in self tests and other functions. Further, multiple non-correlated data sequences can be made available through some implementations of HPI allowing different data sequences to be applied on adjacent lanes. In one example, multiple non-correlated versions of a PRBS can be provided, such as four or more sequences, among other examples As noted above, loopback can be used in a variety of tasks, including testing, adaptation, initialization, etc. Synchronization of two agents in loopback can be difficult in some instances. For instance, an agent of a receiver may be originating data, such as particular training sequences, supersequences, etc. Further, upon entering loopback, the receiver may splice data it has originated with the data it is to loopback, such as training sequences that it is to loopback. In one example, a transmitter or master in loopback can include logic to transition from a lock on TS originated by the receiver agent to lock on looped-back TS. Such TS locking can present the threat of aliasing and other issues. In one example, a TS, such as the payload of a TS can be formatted to assist in remediating the risk of aliasing or otherwise confusing previous TSes with newly looped-back TSes. For instance, in one example, a TS can be provided with a suffix of zeroed data that can include bytes used for descrambling as well as other dual-use reserved bytes. Such zeroed bytes can be additionally used to reduce or eliminate (statistically) the risk that the newly looped-back TS will be missed among data spliced by the receiver and originating from the receiver, among other examples. In loopback, a master can check the integrity of its patterns and relock after loopback, for instance, through the use of a NAK-ACK handshake with NAK TS with unchanged payload and handshake (ACK) used for in-band parameter payload. Further, master-master loopback can also be supported, with TS format being used in TS lock at each side of a master-master loopback.

In some implementations of HPI, design for test features can be provided. In one embodiment, HPI includes hooks to enable post-design test, debug, and validation. An exemplary, non-exhaustive list of such features is included below.

Note that the following features are provided by way of example, as some may be omitted, and others may be added, etc.:

Single Step: Single step includes a debug feature where software may step agents through the initialization states to a link state, such as TLS. A storage element, register, or signal (that is software accessible) may enable this mode. In this mode the agent may set a semaphore on entering a state and perform the state actions. But when an exit condition is reached (including secondary timeouts), the sempahore can cause a next state transition to not be taken. Here, the actual transition may occur at the direction of a software-based controller, such as by clearing the semaphore. This potentially allows software to examine the Physical layer during progress to a transmitting state or Loopback. Note that this may be extended to substates by setting a substate sempahore on entry to a substate, among other examples. The agent may remain in a current state as long as a semaphore, such as a bit in a register, is set. Transition out of every state may be delayed until the hold bit is cleared by an outside agent. State rules defined exit criteria can otherwise be maintained except in cases involving time-outs, etc. The secondary timers may be disabled (e.g., ignored). Here, the clearing of the hold bit can be considered a replacement stimulus emulating the secondary timer time-out for single stepping operation, among other examples. Further, single stepping with the assistance of software can be performed in a manner that supports integrity of the forward progress.

Freeze on Initialization Abort: This is a debug feature where the agent does not immediately take the transition to a reset state on an initialization abort, delaying or suspending the transition so that software-based tools can identify causes for the abort. For instance, software-based tools can be used to probe reasons for an abort while supporting integrity of the regress and reinitialization. One or more fields of a register holding one or more bits, such as a control register, may control this action. This feature complements single step by giving software control to state exits due to failure (as single step does in case of normal progress). In one embodiment, by default, a Physical layer state machine may retry by immediately transitioning to a reset state after any initialization abort. However, the state machine may be frozen (that is, remain in the same state) at the point of failure, not transition to a reset state by setting initialization abort freeze bit in a register. As an example, when in freeze on initialization abort mode, when an initialization abort occurs, the state machine freezes by setting state machine hold bit, such as the semaphore described above, in a register. Software, in one embodiment, can access registers to read the stopped state and other frozen resources and use the frozen state to debug the state machine. Clearing the hold bit in this frozen state may result in the state machine exiting to Reset. In-band reset, in one embodiment, does not release the hold.

Automated Test Equipment (ATE): Automated Test Equipment (ATE) may be used to characterize (e.g., margin) the link in the various states including TLS. In this case the ATE can act as an agent and use a predetermined set of transmit patterns to get the device under test (DUT) into TLS. In ATE mode, an ATE mode field to hold one or more bits in a register can be set. The DUT does the same state actions but when an exit condition is reached, the next state transition is not taken and the actual transition occurs when the secondary timeout occurs. Thus, this mode is similar to single step except that transitions occur on pre-programmed timeouts instead of software intervention. For instance, ATE mode can manage a programmable timer based progression thru the states. Longer timers set during the mode can allow handshakes in states to complete while still exiting at time specified by software managing or otherwise used in the ATE mode.

In some instances, high volume manufacturing (HVM) tests may be performed by connecting the transmitter of a DUT port to its own receiver and getting this link pair to TLS where signature patterns for each initialization mode (except loopback or compliance slave) are sent and checked to pass or fail the DUT. This can be accomplished without a special mode, but latency fixing may be performed for checking signature at the correct cycle.

IBIST (Interconnect Built in self test): IBIST uses compliance and loopback states to test the interconnect with built in pattern generators and checkers.

Compliance: An agent may be made a Compliance master or slave for validation purposes. The agent enters Compliance from the transmitter calibrate state (TCS). The slave loops back incoming data from the master after re-timing it to its local clock (without undo of any polarity inversion or lane reversal). The master sends a compliance pattern and receives it looped back from the slave. The master may be sent to Loopback Pattern to try out more specialized patterns. The master may also be used without a slave so that its transmitter can be characterized. Typical use of Compliance is to characterize operation of the analog front end on some subset of lanes when loopback is not functional. Compliance state may be utilized for jitter or noise investigation, debug, exploring a link, etc. The Compliance state can drive a supersequence with a transmitter from the master. Receiver looks for a wake on a monitor lane, debounces the wake, drops bad lanes, adapts, and bit locks, etc. The slave transmitter can drive the compliance pattern until its receiver actions are complete. Then loop-back is re-timed and non-deskewed. Slave receiver does similar monitor and debounce, etc. actions. Exit may be to a reset state, such as a timed reset, or to a loopback pattern state to start the test, among other examples.

Loopback: An agent may be made into a Loopback master for detailed validation of a subset of lanes. After successful polling, the master enters Loopback with a subset of lanes and the other agent also enters Loopback but as the slave. Loopback Master may communicate its intent to enter loopback using a loopback master bit in a polling training sequence (TS). An agent which is not loopback master and receives this bit in TS polling may become a loopback slave. At the end of Polling, both connected ports enter a Loopback Marker state (LMS). From there, the master takes the slave to a Loopback Pattern State, where it sends patterns and checks them after they are looped back by the slave. The loopback slave loops back deskewed data (unlike compliance slave). The state machine may stay in Loopback indefinitely performing one test after the other. This enables cascading tests without losing bit lock. Tx adaptation may also use the loopback pattern generation and checking capabilities. During TX adaptation, both agents act as masters, but TX sends pattern and Rx checks for bit errors in one scenario.

Figure 14:
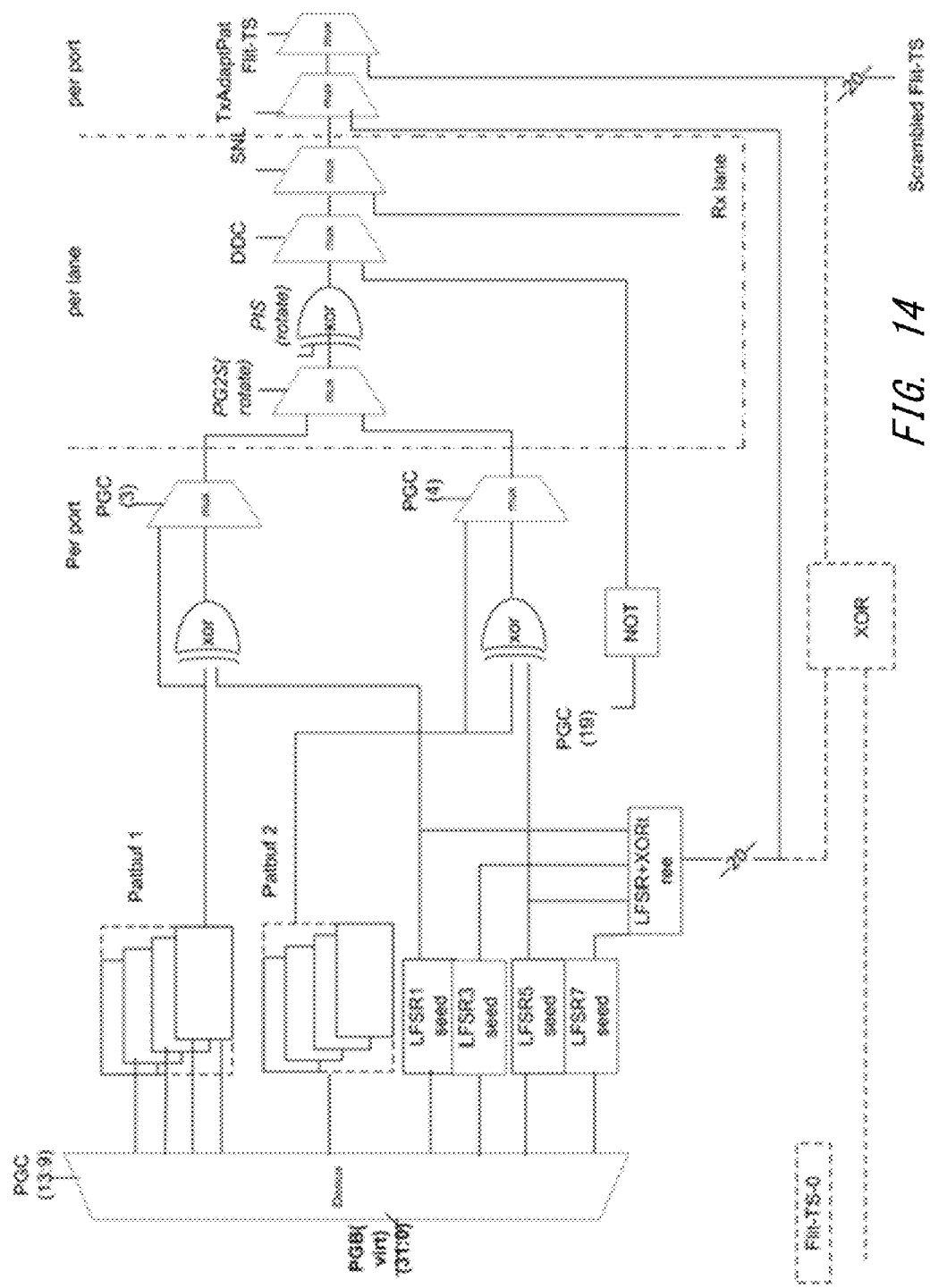
FIG. 14 illustrates a schematic diagram of an example pattern generator.

Pattern Generation: Pattern generators may be activated in Compliance and Loopback states. In one embodiment, a pattern generator, such as the example pattern generator illustrated in the simplified block diagram of FIG. 14, can includes one or more pattern buffers, each having a specified size (e.g. 128 bits) and a plurality of 23-bit (or other length) LFSR seed buffers accessed through a structure, such as a register. The words of pattern generators may be indirectly addressed through pattern buffer selection.

In one example implementation, the content of a pattern buffer is sent in each of the enabled lanes serially starting with least significant bit first. Each lane may select any buffer utilizing a register mechanism. All the lanes selecting the same pattern buffer transmit the same data in a UI. Each pattern buffer may also be independently scrambled by a 23 bit pseudo random generator, which is enabled using bits in a register, such as a pattern control register. The transmission in any lane may be inverted individually using a Pattern Invert Selection Register, for instance. An auto inversion feature may be enabled to generate cross talk pattern using auto inversion enable bit of a Pattern Generator Control Register, among other examples. For transmitter adaptation using loopback, the staggered PRBS23 pattern can be selected. This pattern may also be used to scramble the flits in low power state. The number of patterns sent may be more than the loop count in pattern generator control register, as a loop count refers to the total number of 128 bit patterns received. The master may send an integral number of 128 UI patterns. The pattern generator content can be transmitted continuously until at least one of three exit conditions occurs: (i) if the loop count status is equal to the Exponential Loop count; (ii) Stop On Error is set in the register and an error on any Lane has occurred; or (iii) Stop Test is set in the register. By default, transmitter lanes that have not been detected as indicated by lane dropped in a Transmitter Data Lane Dropped Status Register and dropped receiver lanes as indicated by receiver lane dropped in the Receiver Data Lane Dropped Status Register do not transmit or compare any patterns. If the Include Dropped Lanes bit is set in the Pattern Generator Control Register, dropped lanes also drive and check patterns in Loopback Pattern State. Disabled lanes may not participate in testing. Further, slave transmitter lane content can be controlled via the Slave Loopback Path Select Register to either loopback the content from the Rx lane or to select the pattern generator. In some instances, there may be no alignment requirement between the looped back data and the slave generated pattern, among other features, structures, and examples.

Pattern Check and Error Counting: Pattern checking can be enabled in a Loopback Pattern. Each receiver lane can compare the received data against transmitted data in a corresponding transmitter lane. The slave side checking can be achieved by programming the same exact pattern generation values in both the Loopback Master and Slave. Start of checking and pattern buffer scrambling can be marked by the end of SDS. Each lane can choose to compare or not depending on a register value. The number of patterns checked can be controlled by a loop count. Every count indicates 128 bits of pattern buffer data. The loop counter can have 5 bits of exponent count to enable testing for long time. Loop count value of zero corresponds to infinite count, in which case, a test can only be terminated by setting the Stop Test bit, in some implementations. In order to accommodate electrical parameter application that is synchronized upon entry to Loopback Pattern, the checking can be masked for a time specified by time value in the Pattern Checker Control Register. Checking can be made selective on any one bit in an interval using selective error check start and selective error check interval in the Pattern Checker Control Register.

During transmitter adaptation in loopback, both agents can act as masters but transmitter sends the pattern and the receiver checks for bit errors. Another difference is that Start Test can be set prior to entering loopback and a structure can be used to delay the actual start of test in Loopback marker (sending SDS). In Loopback Pattern when loop count expires, ending the transmitter adaptation test, the agent can return to the Loopback marker, wait for timeout and then exit to Reset for backchannel operation. When a series of transmitter parameters are being tried, the agent may go back to Loopback Pattern instead of Reset till the last parameter has been tried, among other examples.

Error counting can be performed collectively by per lane and global counters. Error counters can be accessible through the Lane Error Counter Register. The lane being observed and selected toward global counter can be indicated by the Receiver Error Counter Lane Select field in the Pattern Checker Control Register. The least significant 8 bits of the error counter can be available for every lane. The most significant 23 bits of the Lane Error Counter Register can only be available for the selected lane indicated by Receiver Error Counter Lane Select at the time when the state machine enters Loopback Pattern. The Lane Error Counter Register does not stick at the maximum value but instead rolls over to all 0's which is indicated by setting the overflow flag (e.g., bit 31 of Lane Error Counter Register) on a per lane basis. Per lane counters in non-selected lanes freeze on maximum error count can mark an overflow. Initial masking, selective error checking, and Loopcount Stall can also apply to error counters. Software may manually clear the Lane Error Counter Register by writing all 1's to bits 31:0, among other examples.

Lane Reversal: If lane reversal or polarity inversion is detected at a receiver in Polling, pattern checking (and loopback, if slave) may be done after undoing the reversal and polarity inversion of lanes.

Agent Loopback Marker State: Loopback marker is an agent state but unlike other agent states master and slave actions and exits may be different. Loopback slave may undo any polarity inversion and/or lane reversal but may not descramble or rescramble looped back bits. Acknowledgment exchange may not apply to slave since it is looping back. Since slave may deskew before looping back on symbol boundary, master may not be forced to re-bytelock or re-deskew but the master may re-lock training sequence to avoid locking to some alias. Means to do this may include re-seeding of LFSR, comparing TS and/or EIEOS or some combination of these. The end of the SDS marks the end of loopback setup and the start of pattern generation, checking and counting.

Agent Loopback Pattern State (or Block Link State): In this state, instead of control patterns, a master transmitter can send a IBIST pattern and its receiver can check for errors in received pattern. For transmitter adaptation both agents can be masters. For a predetermined period, the transmitter can sends a pattern and a remote receiver can compare this pattern and determine a figure of merit or metric for the received pattern which is recorded in a storage element, such as a register. The comparison method and metric may be design dependent (e.g., BER with jitter injection). At the end of the period, both agents can exit to Reset for the backchannel to examine the metric and set up the next iteration of transmitter adaptation.

Lane Enable/Disable: Lanes can be disabled at the transmitter, receiver, or both to cause the link to operate at lower width. It maybe the responsibility of a software-based controller or tool to disable correct lanes if they are reversed.

As noted above, both timers and controls (e.g., control signals, handshakes, etc.) can be used to facilitate transitions within a state machine defined on agents within an HPI environment. For instance, timers can be used in some state transitions while signaling can be used in other state transitions. Further, mechanisms can be provided for facilitating state transitions. For instance, as introduced above, an ATE mode or other testing mode can be provided in some implementations that can override some state transition mechanisms, for instance, to assist in management and observation of a test of the system. For example, in one example testing mode, all state transitions can be set, by a test or test administrator, according to a respective timer. Logic can also be provided to assist in configuring states that would ordinarily transition on a control signal to transition based on a defined timer, among other examples. Such other examples can include, for instance, software-controller state transitions such as single stepping (e.g., through freeze on initialization abort), and other examples.

As introduced above, a BLS or L0c window can be utilized to communicate various control codes, signals, and other data, including within test, initialization, and error checking applications. A predefined set of BLS codes can be defined that can be communicated within the brief window of UIs provided through BLS. However, transients, transmission line irregularities, and other factors can result in bit errors that can potentially cause the control codes to be corrupted or misinterpreted. Logic can be provided on agents on a link to perform some degree of error detection and correction to account for more minor errors in interpreting and processing control codes. If the logic is still unable to make sense of definitively resolve a control code error, a mismatch can result. In some implementations of HPI, features can be provided to respond to the potential catastrophic side effects of a mismatch. For instance, in one embodiment, upon detection of a mismatch, a link can be suspended, including the sending of potentially corrupted flits, adaptation, and other communications. The link can then be automatically transitioned into a reset mode at the end of the next BLS (or L0c) interval, among other examples.

As both devices on a link can run off the same reference clock (e.g., ref clk), elasticity buffers can be omitted (any elastic buffers may be bypassed or used as drift buffers with lowest possible latency). However, phase adjustment or drift buffers can be utilized on each lane to transfer the respective receiver bit stream from the remote clock domain to the local clock domain. The latency of the drift buffers may be sufficient to handle sum of drift from all sources in electrical specification (e.g., voltage, temperature, the residual SSC introduced by reference clock routing mismatches, and so on) but as small as possible to reduce transport delay. If the drift buffer is too shallow, drift errors can result and manifest as series of CRC errors. Consequently, in some implementations, a drift alarm can be provided which can initiate a Physical layer reset before an actual drift error occurs, among other examples.

Some implementations of HPI may support the two sides running at a same nominal reference clock frequency but with a ppm difference. In this case frequency adjustment (or elasticity) buffers may be needed and can be readjusted during an extended BLS window or during special sequences which would occur periodically, among other examples.

Some systems and devices utilizing HPI can be deterministic such that their transactions and interactions with other systems, including communications over an HPI link, are synchronized with particular events on the system or device. Such synchronization can take place according to a planetary alignment point or signal corresponding to the deterministic events. For instance, a planetary alignment signal can be used to synchronize state transitions, including entry into a link transmitting state, with other events on the device.

In some instances, sync counters can be employed to maintain alignment with a planetary alignment of a device. For instance, each agent can include a local sync counter which is initialized by a planetary aligned signal (i.e., common and simultaneous (except for fixed skew) to all agents/layers which are in sync). This sync counter can count alignment points correctly even in powered down or low-power states (e.g., L1 state) and can be used to time the initialization process (after reset or L1 exit), including the boundaries (i.e., beginning or end) of an EIEOS (or other EOS) included in a supersequence utilized during initialization. Such supersequences can be fixed in size and greater than max possible latency on a link. EIEOS-TS boundaries in a supersequence can thus be used as a proxy for a remote sync counter value.

Further, HPI can support master-slave models where a deterministic master device or system can drive timing of interaction with another device according to its own planetary alignment moments. Further, in some examples, master-master determinism can be supported. Master-master or master slave determinism can ensures that two or more link-pairs can be in lock-step at the Link layer and above. In master-master determinism, each direction's exit from initialization can be controlled by respective transmitter. In the case of master-slave determinism, a master agent can controls the determinism of the link pair (i.e., in both directions) by making a slave transmitter initialization exit wait for its receiver to exit initialization, for instance, among other potential examples and implementations.

In some implementations, a synchronization (or "sync") counter can be utilized in connection with maintaining determinism within an HPI environment. For instance, a sync counter may be implemented to count a defined amount, such as 256 or 512 UI. This sync counter may be reset by an asynchronous event and may count continuously (with rollover) from then (potentially even during a low power link state). Pin-based resets (e.g., power on reset, warm reset) may be synchronizing events that reset a sync counter, among other example. In one embodiment, these events can occur at two sides with skew less (and, in many cases, much less) than the sync counter value. During initialization, the start of the transmitted exit ordered set (e.g., EIEOS) preceding a training sequence of a training supersequence may be aligned with the reset value of the sync counter (e.g., sync counter rollover). Such sync counters can be maintained at each agent on a link so as to preserve determinism through maintaining constant latency of flit transmissions over a particular link.

Control sequences and codes, among other signals, can be synchronized with a planetary alignment signal. For instance, EIEOS sequences, BLS or L0c windows (and included codes), SDSes, etc. can be configured to be synchronized to a planetary alignment. Further, synchronization counters can be reset according to an external signal, such as a planetary alignment signal from a device so as to itself be synchronized with the planetary alignment, among other examples.

Sync counters of both agents on a link can be synchronized. Resetting, initializing, or re-initialization of a link can include a reset of the sync counters to realign the sync counters with each other and/or an external control signal (e.g., a planetary alignment signal). In some implementations, sync counters may only be reset through an entry into a reset state. In some instances, determinism can be maintained, such as in a return to an L0 state, without a reset of the sync counter. Instead, other signals already tuned to a planetary alignment, or other deterministic event can be used as a proxy for a reset. In some implementations, an EIEOS can be used in a deterministic state entry. In some instances, the boundary of the EIEOS and an initial TS of a supersequence can be used to identify a synchronization moment and synchronize sync counters of one of the agents on a link. The end of an EIEOS can be used, for instance, to avoid the potential of transients corrupting the start boundary of the EIEOS, among other examples.

Latency fixing can also be provided in some implementations of HPI. Latency can include not only the latency introduced by the transmission line used for communication of flits, but also the latency resulting from processing by the agent on the other side the link. Latency of a lane can be determined during initialization of the link. Further, changes in the latency can also be determined. From the determined latency, latency fixing can be initiated to compensate for such changes and return the latency expected for the lane to a constant, expected value. Maintaining consistent latency on a lane can be critical to maintaining determinism in some systems.

Latency can be fixed at a receiver link layer to a programmed value in some implementations using a latency buffer in conjunction with determinism and enabled by starting a detect (e.g., by sending a Detect supersequence) on a sync counter rollover. Accordingly, in one example, a transmitted EIEOS (or other EOS) in Polling and configuration can occur on a sync counter rollover. In other words, the EIEOS can be precisely aligned with the sync counter, such that a synchronized EIEOS (or other EOS) can serve as a proxy, in some instances, for the sync counter value itself, at least in connection with certain latency fixing activities. For instance, a receiver can add enough latency to a received EIEOS so that it meets the dictated target latency at the Physical layer-Link layer interface. As an example, if the target latency is 96 UI and the receiver EIEOS after deskew is at sync count 80 UI, 16 UI of latency can be added. In essence, given the synchronization of an EIEOS, latency of a lane can be determined based on the delay between when the EIEOS was known to be sent (e.g., at a particular sync counter value) and when the EIEOS was received. Further, latency can be fixed utilizing the EIEOS (e.g., by adding latency to the transmission of an EIEOS to maintain a target latency, etc.).

Latency fixing can be used within the context of determinism to permit an external entity (such as an entity providing a planetary alignment signal) to synchronize the physical state of two agents across the link in two directions. Such a feature can be used, for example, in debugging problems in the field and for supporting lock-step behavior. Accordingly, such implementations can include external control of one or more signals that may cause the Physical layer to transition to a transmitting link state (TLS) on two agents. Agents possessing determinism capabilities can exit initialization on a TS boundary, which is also potentially the clean flit boundary when or after the signal is asserted. Master-slave determinism may allow a master to synchronize the Physical layer state of master and slave agents across the link in both directions. If enabled, the slave transmitter exit from initialization can depend on (e.g., follow or be coordinated with) its receiver exit from initialization (in addition to other considerations based on determinism). Agents which have Determinism capability may additionally possess functionality for entering a BLS or L0c window on a clean flit, among other examples.

Determinism may also be referred to as automated test equipment (ATE) when used to synchronize test patterns on ATE with a device under test (DUT) controlling physical and link layer state by fixing latency at the receiver link layer to a programmed value using a latency buffer.

In some implementations, determinism in HPI can include facilitating the ability of one agent to determine and apply a delay based on a deterministic signal. A master can send an indication of a target latency to a remote agent. The remote agent can determine actual latency on a lane and apply a delay to adjust the latency to meet the target latency (e.g., identified in a TS). Adjusting the delay or latency can assist in facilitating the eventual synchronized entry into a link transmitting state at a planetary alignment point. A delay value can be communicated by a master to a slave, for instance, in a TS payload of a supersequence. The delay can specify a particular number UIs determined for the delay. The slave can delay entry into a state based on the determined delay. Such delays can be used, for instance, to facilitate testing, to stagger L0c intervals on lanes of a link, among other examples.

As noted above, a state exit can be take place according to a planetary alignment point. For instance, an SDS can be sent to interrupt a state supersequence can to drive transition from the state to another state. The sending of the SDS can be timed to coincide with a planetary alignment point and, in some cases, in response to a planetary alignment signal. In other instances, the sending of an SDS can be synchronized with a planetary alignment point based on a sync counter value or other signal synchronized to the planetary alignment. An SDS can be sent at any point in a supersequence, in some cases, interrupting a particular TS or EIEOS, etc. of the supersequence. This can ensure that the state transitions with little delay while retaining alignment with a planetary alignment point, among other examples.

In some implementations, HPI may support flits with a width that is, in some cases, not a multiple of the nominal lane width (e.g. using a flit width of 192 bits and 20 lanes as a purely illustrative example). Indeed, in implementations permitting partial width transmitting states, the number of lanes over which flits are transmitted can fluctuate, even during the life of the link. For example, in some instances, the flit width may be a multiple of the number of active lanes at one instant but not be a multiple of the number of active lanes at another instant (e.g., as the link changes state and lane width). In instances where the number of lanes is not a multiple of a current lane width (e.g., the example of a flit width of 192 bits on 20 lanes), in some embodiments, consecutive flits can be configured to be transmitted to overlap on lanes to thereby preserve bandwidth (e.g., transmitting five consecutive 192 bit flits overlapped on the 20 lanes).

Figure 15:
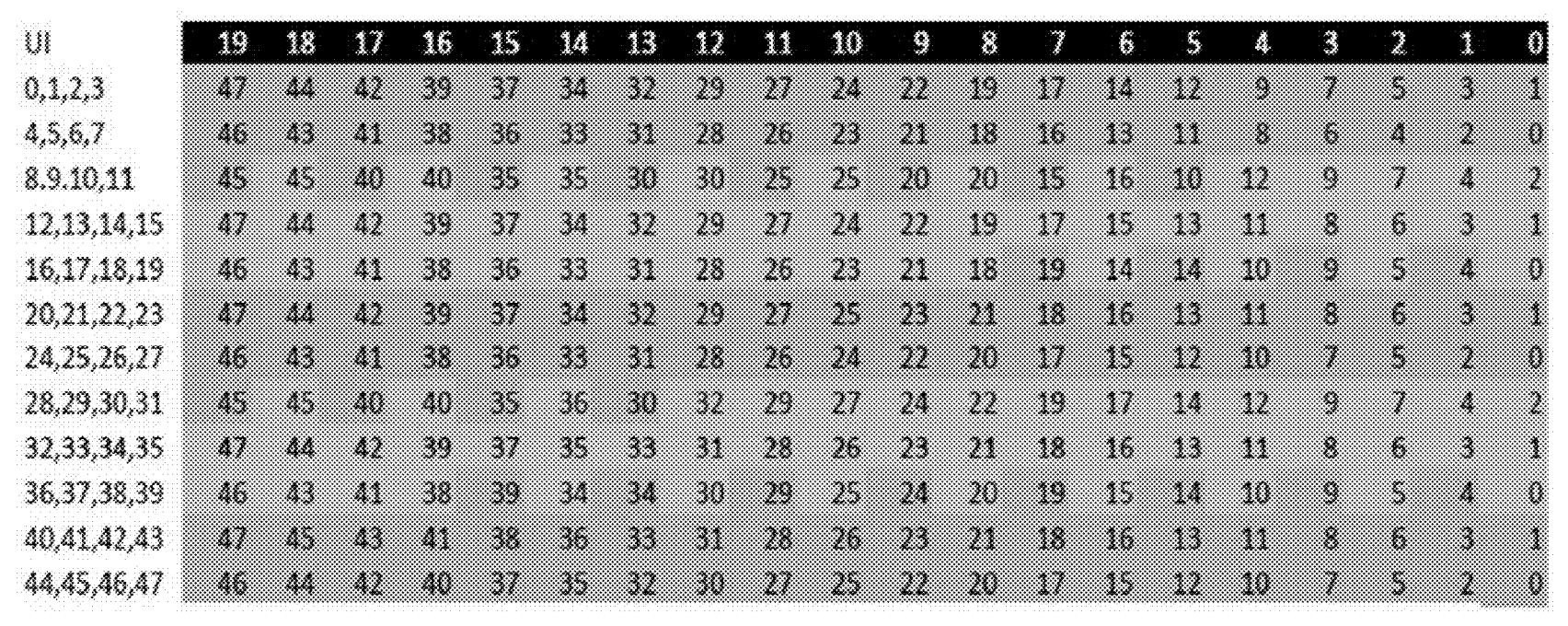

FIG. 15 illustrates a representation of transmission of consecutive flits overlapped on a number of lanes. For instance, FIG. 15 shows a representation of five overlapping 192-bit flits sent over a 20 lane link (the lanes represented by columns 0-19). Each cell of FIG. 15 represents a respective "nibble" or grouping of four bits (e.g., bits 4n+3:4n) included in a flit sent over a 4UI span. For instance, a 192 bit flit can be divided into 48 four-bit nibbles. In one example, nibble 0 includes bits 0-3, nibble 1 includes bits 4-7, etc. The bits in the nibbles can be sent so as to overlap, or be interleaved (e.g., "swizzled"), such that higher-priority fields of the flit are presented earlier, error detection properties (e.g., CRC) are retained, among other considerations. Indeed, a swizzling scheme can also provide that some nibbles (and their respective bits) are sent out of order (e.g., as in the examples of FIGS. 15 and 16). In some implementations, a swizzling scheme can be dependent on the architecture of the link layer and format of the flit used in the link layer.

The bits (or nibbles) of a flit with a length that is not a multiple of the active lanes can be swizzled, such as according to the example of FIG. 15. For instance, during the first 4UI, nibbles 1, 3, 5, 7, 9, 12, 14, 17, 19, 22, 24, 27, 29, 32, 34, 37, 39, 42, 44 and 47 can be sent. Nibbles 0, 2, 4, 6, 8, 11, 13, 16, 18, 21, 23, 26, 28, 31, 33, 36, 38, 41, 43, and 46 can be sent during the next 4UI. In UIs 8-11, only eight nibbles remain of the first flit. These final nibbles (i.e., 10, 15, 20, 25, 30, 40, 45) of the first flit can be sent concurrently with the first nibbles (i.e., nibbles 2, 4, 7, 9, 12, 16, 20, 25, 30, 35, 40, 45) of the second flit, such that the first and second flits overlap or are swizzled. Using such a technique, in the present example, five complete flits can be sent in 48UI, with each flit sent over a fractional 9.6 UI period.

In some instances, swizzling can result in periodic "clean" flit boundaries. For instance, in the example of FIG. 15, the starting 5-flit boundary (the top line of the first flit) may also be referred to as a clean flit boundary since all lanes are transmitting starting nibble from same flit. Agent link layer logic can be configured to identify swizzling of lanes and can reconstruct the flit from the swizzled bits. Additionally, physical layer logic can include functionality for identifying when and how to swizzle a stream of flit data based on the number of lanes being used at the moment. Indeed, in a transition from one link width state to another, agents can configure themselves to identify how swizzling of the data stream will be employed. Indeed, both sides of the link can identify the scheme to be used for swizzling of a data stream so as to identify how a link width state transition will affect the stream. In some implementations, in order to facilitate a link width state transition at a jagged edge of a flit, the length of a partial FTS (FTSp) can be tailored such that the signaling exit is synchronized, among other examples. Further, physical layer logic can be configured to maintain determinism in spite of jagged flit boundaries resulting from swizzling, among other features.

As noted above, links can transition between lane widths, in some instances operating at an original, or full, width and later transitioning to (and from) a partial width utilizing fewer lanes. In some instances, the defined width of a flit may be divisible by the number of lanes. For instance, the example of FIG. 16 illustrates such an example, where the 192-bit flit of the previous examples is transmitted over an 8-lane link. As represented in FIG. 16, 4-bit nibbles of a 192-bit flit can be evenly distributed and transmitted over 8 lanes (i.e., as 192 is a multiple of 8). Indeed, a single flit may be sent over 24 UI when operating at an 8-lane partial width. Further, each flit boundary can be clean in the example of FIG. 16. While clean flit boundaries can simplify the state transitions, determinism, and other features, allowing for swizzling and occasional jagged flit boundaries can allow for the minimization of wasted bandwidth on a link.

Additionally, while the example of FIG. 16, shows lanes 0-7 as the lanes that remained active in a partial width state, any set of 8 lanes can potentially be used. Note also that the examples above are for purposes of illustration only. The flits can potentially be defined to have any width. Links can also have potentially any link width. Further, the swizzling scheme of a system can be flexibly constructed according to the formats and fields of the flit, the preferred lane widths in a system, among other considerations and examples.

The operation of the HPI PHY logical layer can be independent of the underlying transmission media provided the latency does not result in latency fixing errors or timeouts at the link layer, among other considerations.

External interfaces can be provided in HPI to assist in management of the Physical layer. For instance, external signals (from pins, fuses, other layers), timers, control and status registers can be provided. The input signals may change at any time relative to PHY state but are to be observed by the Physical layer at specific points in a respective state. For example, a changing alignment signal (as introduced below) may be received but have no effect after the link has entered a transmitting link state, among other examples. Similarly command register values can be observed by Physical layer entities only at specific points in time. For instance, Physical layer logic can take a snapshot of the value and use it in subsequent operations. Consequently, in some implementations, updates to command registers may be associated with a limited subset of specific periods (e.g., in a transmitting link state or when holding in Reset calibration, in slow mode transmitting link state) to avoid anomalous behavior.

Since status values track hardware changes, the values read may depend on when they are read. Some status values, however, such as link map, latency, speed, etc., may not change after initialization. For instance, a re-initialization (or low power link state (LPLS), or L1 state, exit) is the only thing which may cause these to change (e.g., a hard lane failure in a TLS may not result in reconfiguration of link until re-initialization is triggered, among other examples).

Interface signals can include signals that are external to but affect Physical layer behavior. Such interface signals can include, as examples, encoding and timing signals. Interface signals can be design specific. These signals can be an input or output. Some interface signals, such as termed semaphores and prefixed EO among other examples, can be active once per assertion edge, i.e., they may be deasserted and then reasserted to take effect again, among other examples. For instance, Table 1 includes an example listing of example functions:

TABLE 1

| Function |
| --- |
| input pin reset (aka warm reset) |
| input pin reset (aka cold reset) |
| input in-band reset pulse; causes semaphore to be set; semaphore is cleared when in-band reset occurs |
| input enables low power states |
| input loopback parameters; applied for loopback pattern |
| input to enter PWLTS |
| input to exit PWLTS |
| input to enter LPLS |
| input to exit LPLS |
| input from idle exit detect (aka squelch break) |
| input enables use of CPhyInitBegin |
| input from local or planetary alignment for transmitter to exit initialization |
| output when remote agent NAKs LPLS request |
| output when agent enters LPLS |
| output to link layer to force non-retryable flits |
| output to link layer to force NULL flits |
| output when transmitter is in partial width link transmitting state (PWLTS) |
| output when receiver is in PWLTS |

CSR timer default values can be provided in pairs—one for slow mode and one for operational speed. In some instances, the value 0 disables the timer (i.e., timeout never occurs). Timers can include those shown in Table 2, below. Primary timers can be used to time expected actions in a state. Secondary timers are used for aborting initializations which are not progressing or for making forward state transitions at precise times in an automated test equipment (or ATE) mode. In some cases, secondary timers can be much larger than the primary timers in a state. Exponential timer sets can be suffixed with exp and the timer value is 2 raised to the field value. For linear timers, the timer value is the field value. Either timer could use different granularities. Additionally, some timers in the power management section can be in a set called a timing profile. These can be associated with a timing diagram of the same name.

TABLE 2

| Timers |
| --- |
| Table Tpriexp Set |
| Reset residency for driving EIEOS |
| Receiver calibration minimum time; for stagger transmitter off |
| Transmitter calibration minimum time; for stagger on |
| Tsecexp Set |
| Timed receiver calibration |
| Timed transmitter calibration |
| Squelch exit detect/debounce |
| DetectAtRx overhang for handshake |
| Adapt + bitlock/bytelock/deskew |
| Configure link widths |
| Wait for planetary aligned clean flit boundary |
| Re-bytelock/deskew |
| Tdebugexp Set |
| For hot plug; non-0 value to debug hangs |
| TBLSentry Set |
| BLS entry delay - fine |
| BLS entry delay - coarse |
| TBLS Set |
| BLS duration for transmitter |
| BLS duration for receiver |
| BLS clean flit interval for transmitter |
| TBLS clean flit interval for receiver |

Command and control registers can be provided. Control registers can be late action and may be read or written by software in some instances. Late-action values can take effect (e.g., pass through from software-facing to hardware-facing stage) continuously in Reset. Control semaphores (prefixed CP) are RW1S and can be cleared by hardware. Control registers may be utilized to perform any of the items described herein. They may be modifiable and accessible by hardware, software, firmware, or a combination thereof.

Status registers can be provided to track hardware changes (written and used by hardware) and can be read-only (but debug software may also be able to write to them). Such registers may not affect interoperability and can be typically complemented with many private status registers. Status semaphores (prefixed SP) can be mandated since they may be cleared by software to redo the actions which set the status. Default means initial (on reset) values can be provided as a subset of these status bits related to initialization. On an initialization abort, this register can be copied into a storage structure.

Tool Box registers can be provided. For instance, testability tool-box registers in the Physical layer can provide pattern generation, pattern checking and loop back control mechanisms. Higher-level applications can make use of these registers along with electrical parameters to determine margins. For example, Interconnect built in test may utilize this tool-box to determine margins. For transmitter adaptation, these registers can be used in conjunction with the specific registers described in previous sections, among other examples.

In some implementations, HPI supports Reliability, Availability, and Serviceability (RAS) capabilities utilizing the Physical layer. In one embodiment, HPI supports hot plug and remove with one or more layers, which may include software. Hot remove can include quiescing the link and an initialization begin state/signal can be cleared for the agent to be removed. A remote agent (i.e. the one that is not being removed (e.g., the host agent)) can be set to slow speed and its initialization signal can also be cleared. An in-band reset (e.g., through BLS) can cause both agents to wait in a reset state, such as a Calibrate Reset State (CRS); and the agent to be removed can be removed (or can be held in targeted pin reset, powered down), among other examples and features. Indeed, some of the above events may be omitted and additional events can be added.

Hot add can include initialization speed can default to slow and an initialization signal can be set on the agent to be added. Software can set speed to slow and may clear the initialization signal on the remote agent. The link can come up in slow mode and software can determine an operational speed. In some cases, no PLL relock of a remote is performed at this point. Operational speed can be set on both agents and an enable can be set for adaptation (if not done previously). The initialization begin indicator can be cleared on both agents and an in-band BLS reset can cause both agents to wait in CRS. Software can assert a warm reset (e.g., a targeted or self-reset) of an agent (to be added), which may cause a PLL to relock. Software may also set the initialization begin signal by any known logic and further set on remote (thus advancing it to Receiver Detect State (RDS)). Software can de-assert warm reset of the adding agent (thus advancing it to RDS). The link can then initialize at operational speed to a Transmitting Link State (TLS) (or to Loopback if the adaption signal is set), among other examples. Indeed, some of the above events may be omitted and additional events can be added.

Data lane failure recovery can be supported. A link in HPI, in one embodiment, can be resilient against hard error on a single lane by configuring itself to less than full width (e.g. less than half the full width) which can thereby exclude the faulty lane. As an example, the configuration can be done by link state machine and unused lanes can be turned off in the configuration state. As a result, the flit may be sent across at a narrower width, among other examples.

In some implementations of HPI, lane reversal can be supported on some links. Lane reversal can refer, for instance, to lanes 0/1/2 . . . of a transmitter connected to lanes n/n−1/n−2 . . . of a receiver (e.g. n may equal 19 or 7, etc.). Lane reversal can be detected at the receiver as identified in a field of a TS header. The receiver can handle the lane reversal by starting in a Polling state by using physical lane n . . . 0 for logical lane 0 . . . n. Hence, references to a lane may refer to a logical lane number. Therefore, board designers may more efficiently lay down the physical or electrical design and HPI may work with virtual lane assignments, as described herein. Moreover, in one embodiment, polarity may be inverted (i.e. when a differential transmitter +/− is connected to receiver −/+. Polarity can also be detected at a receiver from one or more TS header fields and handled, in one embodiment, in the Polling State.

Link Layer

The Link layer can guarantee reliable data transfer between two protocol or routing entities. The Link layer can abstract the Physical layer from the Protocol layer, handle flow control between two protocol agents, and provide virtual channel services to the Protocol layer (Message Classes) and Routing layer (Virtual Networks).

In some implementations, the Link layer can deal with a fixed quantum of information, termed a flit. In one example, the flit can be defined to be 192 bits in length. However, any range of bits, such as 81-256 (or more) may be utilized in different variations. A large flit size, such as 192 bits, may include format, cyclic redundancy check (CRC), and other changes. For instance, a larger flit length can also permit the CRC field to be expanded (e.g., to 16 bits) to handle the larger flit payload. The number of phits or unit intervals (UI) (e.g., the time used to transfer a single bit or phit, etc.) to transfer a single flit can vary with link width. For instance, a 20 lane or bit link width can transfer a single 92 bit flit in 9.6 UI, while an 8 lane link width transfers the same flit in 24 UI, among other potential examples. The link layer crediting and protocol packetizing can also be based on a flit.

Figure 17:
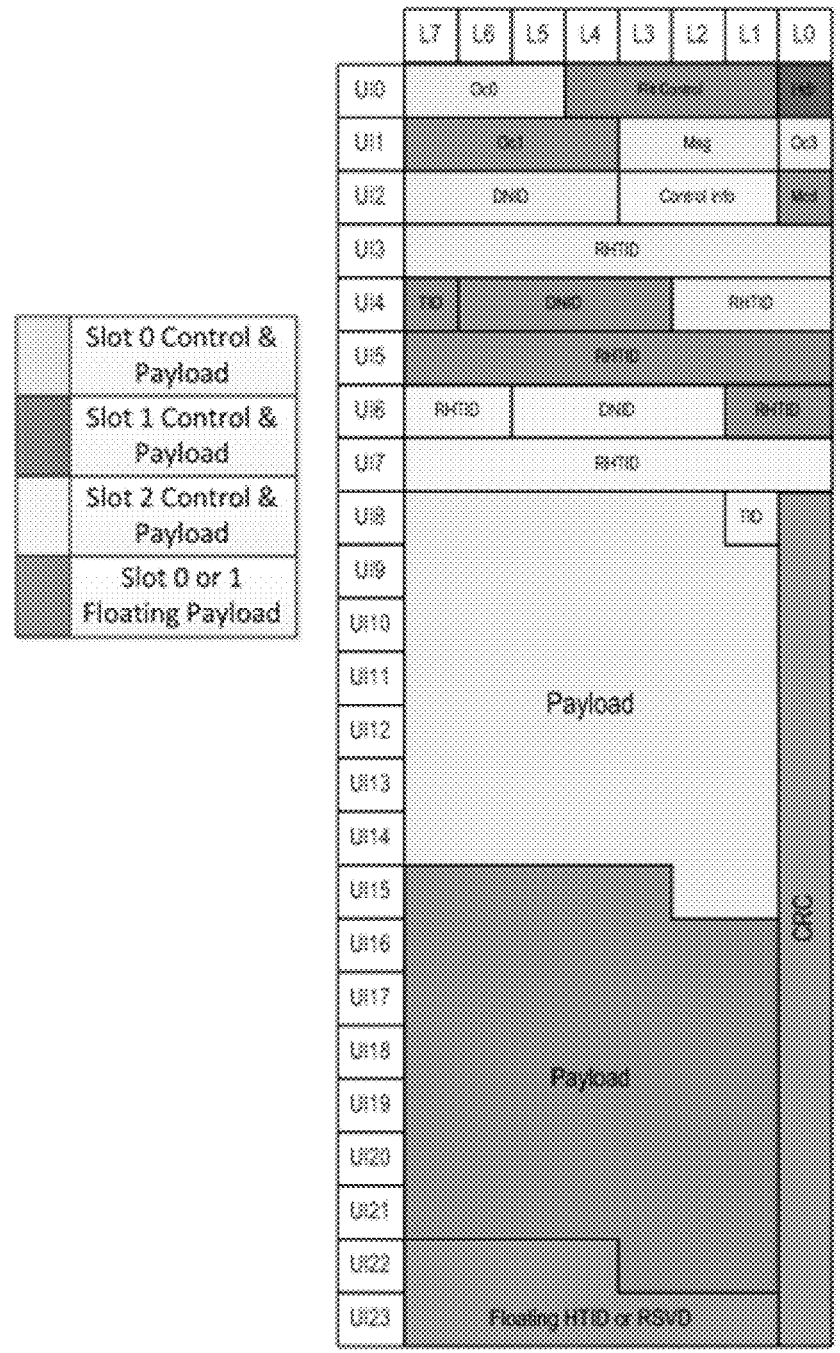
FIG. 17 illustrates a representation of an example multi-slot flit.

FIG. 17 illustrates a representation 1700 of a generalized flit for an 8 lane link width. Each column of the representation 1700 can symbolize a link lane and each row a respective UI. In some implementations, a single flit can be subdivided into two or more slots. Distinct messages or link layer headers can be included in each slot, allowing multiple distinct, and in some cases, independent messages corresponding to potentially different transactions to be sent in a single flit. Further, the multiple messages included in slots of a single flit may also be destined to different destination nodes, among other examples. For instance, the example of FIG. 17 illustrates a flit format with three slots. The shaded portions can represent the portion of the flit included in a respective slot.

In the example of FIG. 17, three slots, Slots 0, 1, and 2, are provided. Slot 0 can be provided 72 bits of flit space, of which 22 bits are dedicated to message header fields and 50 bits to message payload space. Slot 1 can be provided with 70 bits of flit space, of which 20 bits are dedicated to message header fields and 50 bits to message payload space. The difference in message header field space between can be optimized to provide that certain message types will be designated for inclusion in Slot 0 (e.g., where more message header encoding is utilized). A third slot, Slot 2, can be provided that occupies substantially less space than Slots 0 and 1, in this case utilizing 18 bits of flit space. Slot 2 can be optimized to handle those messages, such as acknowledges, credit returns, and the like that do no utilize larger message payloads. Additionally, a floating payload field can be provided that allows an additional 11 bits to be alternatively applied to supplement the payload field of either Slot 0 or Slot 1.

Continuing with the specific example of FIG. 17, other fields can be global to a flit (i.e., apply across the flit and not to a particular slot). For instance, a header bit can be provided together with a 4-bit flit control field that can be used to designate such information as a virtual network of the flit, identify how the flit is to be encoded, among other examples. Additionally, error control functionality can be provided, such as through a 16-bit cyclic CRC field, among other potential examples.

A flit format can be defined so as to optimize throughput of messages on the Link layer. Some traditional protocols have utilized unslotted, smaller flits. For instance, in QPI an 80-bit flit was utilized. While the flit throughput of a larger (e.g., 192-bit flit) may be lower, message or packet throughput can be increased by optimizing use of the flit data. For instance, in some implementations of QPI, the entire 80-bit flit space was utilized regardless of the message size or type. By subdividing a larger flit into slots of predetermined lengths and fields, the 192flit length can be optimized realizing higher efficiency even in instances when one or more of the available slots are sometimes unused. Indeed, Link layer traffic can be assumed to include many different types of messages and traffic, including messages and packets with varying header lengths and fields. The respective lengths and organization of slots defined in a flit can be defined so as to correspond with the statistical or expected frequency of various messages and the needs of these messages. For instance, two larger slots can be defined for every small slot, to accommodate an expected statistical frequency of messaging using these larger message types and header lengths, among other example. Further, flexibility can also be provided to further accommodate the varied traffic, such as through a floating payload field, as in the example of FIG. 17. In some instances, a flit format can be fixed, including the bits dedicated to particular slots in the flit.

In the example of FIG. 17, a "Hdr" field can be provided for the flit generally and represent a header indication for the flit. In some instances, the Hdr field can indicate whether the flit is a header flit or a data flit. In data flits, the flit can still remain slotted, but omit or replace the use of certain fields with payload data. In some cases, data fields may include an opcode and payload data. In the case of header flits, a variety of header fields can be provided. In the example of FIG. 17, "Oc" fields can be provided for each slot, the Oc field representing an opcode. Similarly, one or more slots can have a corresponding "msg" field representing a message type of the corresponding packet to be included in the slot, provided the slot is designed to handle such packet types, etc. "DNID" fields can represent a Destination Node ID, a "TID" field can represent a transaction ID, a "RHTID" field can represent either a requestor node ID or a home tracker ID, among other potential fields. Further, one or more slots can be provided with payload fields. Additionally, a CRC field can be included within a flit to provide a CRC value for the flit, among other examples.

In some implementations, link width can vary during the life of the link. For instance, the Physical layer can transition between link width states, such as to and from a full or original lane width and a different or partial lane width. For example, in some implementations, a link can be initialized to transfer data over 20 lanes. Later, the link can transition to a partial width transmitting state where only 8 lanes are actively used, among many other potential examples. Such lane width transitions can be utilized, for instance, in connection with power management tasks governed by one or more power control units (PCU) among other examples.

As noted above, link width can influence flit throughput rate. FIG. 18 is a representation of an example 192-bit flit sent over an 8 lane link, resulting in throughput of the flit at 24UI. Further, as shown in the example of FIG. 18, bits of the flit can be sent out of order in some instances, for example, to send more time-sensitive fields earlier in the transfer (e.g., flit type fields (e.g., data or header flit), opcodes, etc.), preserve or facilitate particular error detection or other functionality embodied in the flit, among other examples. For instance, in the example of FIG. 18, bits 191, 167, 143, 119, 95, 71, 47, and 23 are sent in parallel on lanes L7 through L0 during a first UI (i.e., UI0) of transfer, while bits 168, 144, 120, 96, 72, 48, 24, and 0 are sent during the $24^{th}$ (or final) UI of the flit transfer (i.e., UI23). It should be appreciated that other ordering schemes, flit lengths, lane widths, etc. can be utilized in other implementations and examples.

In some instances, the length of the flit can be a multiple of the number of active lanes. In such instances, the flit can be transmitted evenly on all active lanes and transfer of the flit can end substantially simultaneously at a clean (i.e., non-overlapping) boundary. For example, as shown in the representation of FIG. 15, bits of a flit can be considered to be transmitted in consecutive groupings of 4 bits, or "nibbles." In this example, a 192 bit flit is to be transferred over an 8 lane link. As 192 is a multiple of 8, the entire flit can be cleanly transferred over the 8 lane link in 24 UI. In other instances, the flit width may not be a multiple of the number of active lanes. For instance, FIG. 16 shows another representation of an example 192 bit transferred over 20 lanes. As 192 is not evenly divisible by 20, transfer of the full flit would require a non-integer number of intervals (e.g., 9.6 UI). In such cases, rather than wasting "extra" lanes not utilized during the 10th UI of transfer, a second overlapping flit can be transferred with the final bits of a preceding flit. Such overlapping, or swizzling, of the flits can result in jagged flit boundaries and flit bits sent out of order in some implementations. The pattern utilized for the transfer can be configured to allow more time-sensitive fields of the flit to be transferred earlier in the flit, preservation of error detection and correction, among other considerations. Logic can be provided in one or both of the Physical and Link layers to transfer flit bits according to such patterns and dynamically change between patterns based on the current link width. Further logic can be provided to re-order and re-construct flits from such swizzled or ordered bit streams, among other examples.

In some implementations, flits can be characterized as header flits (e.g., bearing packet header data) or data flits (e.g., bearing packet payload data). Returning to FIG. 17, a flit format can be defined that includes three (3) distinct slots (e.g., 0, 1, and 2), allowing up to three headers to be transferred in a single flit (e.g., one header in each slot). Accordingly, each slot can have both control fields and a payload field. In addition to these, payload fields can be defined for each header (and slot). Further, a floating payload field can be defined that can be flexibly used as extra payload length for two or more of the slots (e.g., by either slot 0 or slot 1), based on the header types in these slots. The floating field can enable, in one implementation, 11 extra bits of payload for either Slot 0 or Slot 1. Note in implementations defining a larger flit more floating bits may be used and in smaller flits less floating bits may be provided. In some implementations, by allowing a field to float between the two slots, extra bits can be provided as needed for certain messages while still staying within a predefined flit length (e.g., 192 bits) and maximizing the utilization of the bandwidth.

In the example of FIG. 17, three slots, Slots 0, 1, and 2, are provided. Slot 0 can be provided 72 bits of flit space, of which 22 bits are dedicated to message header fields and 50 bits to message payload space. Slot 1 can be provided with 70 bits of flit space, of which 20 bits are dedicated to message header fields and 50 bits to message payload space. The difference in message header field space between can be optimized to provide that certain message types will be designated for inclusion in Slot 0 (e.g., where more message header encoding is utilized). A third slot, Slot 2, can be provided that occupies substantially less space than Slots 0 and 1, in this case utilizing 18 bits of flit space. Slot 2 can be optimized to handle those messages, such as acknowledges, credit returns, and the like that do no utilize larger message payloads. Additionally, a floating payload field can be provided that allows an additional 11 bits to be alternatively applied to supplement the payload field of either Slot 0 or Slot 1.

Continuing with the specific example of FIG. 17, other fields can be global to a flit (i.e., apply across the flit and not to a particular slot). For instance, a header bit can be provided together with a 4-bit flit control field that can be used to designate such information as a virtual network of the flit, identify how the flit is to be encoded, among other examples. Additionally, error control functionality can be provided, such as through a 16-bit cyclic CRC field, among other potential examples.

A flit format can be defined so as to optimize throughput of messages on the Link layer. Some traditional protocols have utilized unslotted, smaller flits. For instance, in QPI an 80-bit flit was utilized. While the flit throughput of a larger (e.g., 192-bit flit) may be lower, message or packet throughput can be increased by optimizing use of the flit data. For instance, in some implementations of QPI, the entire 80-bit flit space was utilized regardless of the message size or type. By subdividing a larger flit into slots of predetermined lengths and fields, the 192 flit length can be optimized realizing higher efficiency even in instances when one or more of the available slots are sometimes unused. Indeed, Link layer traffic can be assumed to include many different types of messages and traffic, including messages and packets with varying header lengths and fields. The respective lengths and organization of slots defined in a flit can be defined so as to correspond with the statistical or expected frequency of various messages and the needs of these messages. For instance, two larger slots can be defined for every small slot, to accommodate an expected statistical frequency of messaging using these larger message types and header lengths, among other example. Further, flexibility can also be provided to further accommodate the varied traffic, such as through a floating payload field, as in the example of FIG. 17. In some instances, a flit format can be fixed, including the bits dedicated to particular slots in the flit.

In some implementations, by allowing a field to float between the two slots, extra bits can be provided as needed for certain messages while still staying within a predefined flit length (e.g., 192 bits) and maximizing the utilization of the bandwidth. Turning to the examples of FIG. 19, two instances 1905, 1910 of an example 192-bit flit are shown on an 8 lane data link. In one instance, a flit (e.g., 1905) can include three slots, Slots 0, 1, and 2. Each of Slots 0 and 1 can include 50-bit payload fields. The floating field can be provided to alternatively extend the payload field of the either Slot 0 or Slot 1 by the field length (e.g., 11 bits) of the floating field. The use of a floating field can further extend the efficiency gains provided through a defined, multi-slot flit format. The sizing of the slots within the flit, and the types of messages that can be placed in each slot, can potentially provide increased bandwidth even with a reduced flit rate.

In the particular example of FIG. 17, the messages that can use Slots 1 and 2 can be optimized, reducing the number of bits to be set aside to encode these slots' opcodes. When a header having more bits that Slot 0 can provide enters the Link layer, slotting algorithms can be provided to allow it to take over Slot 1 payload bits for additional space. Special control (e.g. LLCTRL) flits may also be provided that consume all three slots worth of bits for their needs. Slotting algorithms may also exist to allow individual slots to be utilized while other slots carry no information, for cases where the link is partially busy.

In the particular example of FIG. 19, example use of a floating flit field is shown. For instance, in the case of Standard Address Snoop (SA-S) Headers, only a single SA-S message (and header) may be permitted to be sent in the same flit (e.g., to prevent conflicts or where the SA-S payload utilizes a larger than 50-bit payload, etc.). Consequently, in such examples, a SA-S may only be sent in either Slot 0 or Slot 1 of the same flit in such instances. In the example of flit 1905, an SA-S header is included in Slot 0 and is to make use of the floating field. Consequently, in the example of flit 1905, the use of the floating field is dedicated to extend the payload of Slot 0's payload. In another example, of flit 1910, the SA-S header is to occupy Slot 1. In the example of flit 1910, the floating field is instead dedicated to extend the payload of Slot 1. Other potential examples can also make use of the flexibility provided through a floating payload field of a slotted flit utilizing principles illustrated in the particular examples of FIGS. 17 and 19.

In one embodiment, such as that illustrated in connection with FIG. 17, two slots, Slot 0 and 1, can be defined as having equally sized payload fields, while Slot 2 has a much smaller payload field for use by a particular subset of headers that lack the use of such larger payload fields, for instance. Further, in one example, Slot 1 and 2 control fields may not carry full Message Class encodings (unlike Slot 0), and Slot 2 may not carry a full opcode encoding, among other potential implementations.

As noted above, in some implementations, Slots 1 and 2 may not carry full Message Class encodings, as not all bits are utilized due to slotting restrictions. Slot 1 can carries a Message Class bit 0. Here, request (REQ) and snoop (SNP) packets are allowed. In this implementation, REQ and SNP Message Class encodings are differentiated by bit 0. As a result, if a designer wanted to allow different message classes in partial message class field, they could either select a different bit position (i.e. an upper bit that differentiates two different types of messages) or assign different message types to the lower order bit. However, here the upper two bits are implied as 0's with the lower bit distinguishing between a REQ and a SNP. In this example, Slot 2 carries no Message Class bits, as only response (RSP) (encoding 2) packets are allowed in. Therefore, the Message Class encoding for Slot 2 is a RSP-2. Slot 2 can also carry a partial opcode. As above, one or more of the opcode bits can be assumed to be 0. As a result, partial message class fields and partial operation code fields may be utilized that define a subset of messages and op codes that may be utilized. Note that multiple sets of opcodes and messages classes may be defined. Here, if a lower order bit of the message class is used, then a subset of message types (i.e. MSG type 1/MSG type 2) is available. However, if 2 bits are used, then a larger subset is provided (e.g. Message Type 1/Message Type 2/Message Type 3/Message Type 4), among other examples.

Message class encodings can correspond to particular header types to be included (or to utilize) one or more defined slots in a flit. For instance, a header may have multiple sizes. In one example, a three slot flit can be defined to support potentially four sizes of header, based on header type. Table 3 includes an exemplary listing of potential header formats and associated sizes:

TABLE 3

| Header Format | Header Size | Description |
|---|---|---|
| SA | Single Slot | Request |
| SA-S | Single Slot | Snoops (incorporates floating payload field) |
| SA-D | Single Slot | Data header |
| SR-U | Small Slot | Completion without data |
| SR-O | Single Slot | Ordering |
| SR-C | Single Slot | Conflict resolution |
| SR-D | Single Slot | Data header |
| PW | Dual Slot | Partial write |
| PR | Dual Slot | Partial read |
| P2P | Dual Slot | Peer-to-peer |
| NCM | Dual Slot | Non-coherent messaging |
| Slot-NULL | Single Slot (or Opcode only) | Control flit |
| LLCRD | Small Slot | Control flit |
| LLCTRL | Full Flit | Control flit |

Small (or single) slot headers can be for those message small enough to fit in Slot 2, and that don't have protocol ordering requirements forcing them into Slot 0. A small slot header can also be placed in Slot 0, if the slotting restrictions for the flit call for it. The single slot header can be for those messages with payload that can fit in Slot 0 or Slot 1. Some single slot headers may also make use of the floating payload field. For instance, Standard Address Snoop (SA-S) Headers, in one embodiment, may not be sent in both slot 0 and slot 1 of the same flit in the example where only one HTID or floating field exists. Certain single slot headers may use Slot 0 based on protocol ordering requirements. The dual slot header can be for those messages large enough that they are to consume both the Slot 0 and Slot 1 payload fields, in addition to the floating payload field, among other examples.

A slot NULL opcode may include a special opcode, that can be used, in one example, in either Slot 0 or Slot 1. As an example, FIG. For Slot 0, Slot_NULL may be used when the link layer has no header to transmit in Slot 0, but it does have a header to transmit in Slot 1 or 2. When Slot_NULL is used in Slot 0, the Slot 0payload is considered reserved (RSVD), among other examples. In some implementations, Slot_NULL can be utilized in Slot 1 potentially under two conditions. First, when Slot 0 is encoding a dual slot or special control header, and thus consuming the Slot 1 payload. In such instances, the Slot 1 opcode can be set to Slot_NULL. The second condition is when the link layer has nothing to send in Slot 1, but does have a valid Single Slot header for Slot 0 or Small Slot Header for Slot 2. Under this condition, the Slot 1 opcode can be set to Slot_NULL and the Slot 1 payload can be considered Reserved, among other potential examples.

In some implementations, the small Slot 2, may include a reduced number of opcode bits. When the link layer has nothing to send in Slot 2, it may send an "Implicit NULL" by encoding a specific opcode, such as a link layer credit opcode and setting the Slot 2 payload field to all zeros. The receiver of this Slot 2 encoding can process it as a link layer credit message (except in the case of the special control flits), but the all zeros encoding will have no effect on the Credit and Acknowledge state. In the case of special control flits, because they can consume the entire flit, the Slot 2 payload can be considered RSVD and the Implicit NULL will be ignored. Where the link layer has nothing to send in any of the three slots and the CRD/ACK fields, the link layer may transmit a special control null message, among other examples.

Slotting restrictions can be defined for one or more of the defined slots of a flit. In one embodiment, dual slot headers may only have their Message Class and Opcode placed in Slot 0. When Slot 0 contains a Dual Slot Header, Slot 1 may encode a Slot_NULL opcode, as the Slot 1 Payload field will be consumed by the Slot 0 header. When Slot 0 contains a Slot_NULL, single slot, or small slot header, Slots 1 and 2 may both encode a non-NULL header. Only small slot headers are allowed in Slot 2 in this particular example (e.g., illustrated in FIG. 17). When both Slot 0 and Slot 1 contain single slot headers, one may be of a type that consumes the floating payload field. If neither Slot 0 or Slot 1 contain a header type that consumes the floating payload field, the field may be considered RSVD.

Additionally, in some implementations, the Link layer can utilize multiple different types of virtual network or virtual channel credits. In one example, pooled virtual network adaptive (VNA) credits can be supported and a VNA field can be provided. In one example implementation, when the VNA field indicates a non-VNA flit (e.g., a flit that utilizes a different credit pool), the header may be designated to be placed in Slot 0. Further, the Slot 2 opcode may include a Slot_2 credit in this case. Further, when Slot 0 encodes a special control Header, both Slot 1 and Slot 2 control fields may be set to fixed values, and no headers may be placed in these slots, among other potential implementations.

As noted above, in header flits, a variety of different fields can be provided to be incorporated in corresponding flit slots, such as illustrated in the particular example of FIG. 17. Note that the fields illustrated and described a provided by way of example and additional or substitute fields can also be incorporated. Indeed, some of the fields described may be optional and be omitted in some implementations, among other examples.

In one example, a message class (MC) field can be provided, as well as other fields. In some examples, the Protocol layer can use the Message Class field to define the Protocol Class which also acts as the Major Opcode field. The Link layer can use the Message Class field as part of the virtual channel (VC) definition. Some Protocol Classes/VC can use multiple Message Class encodings due to the number of opcodes that are to be encoded, among other examples. For instance, Requests (REQ), Snoops (SNP), Response (RSP), writeback, non-coherent bypass, and non-coherent standard types can be supported. If each type encoded sixteen operations, then there would be an opcode space of 96 operations. And if another mode bit or other opcode space was defined for each type, then another 96 operations could be provided; and so on.

In one example, an Opcode field can additionally be provided. The Protocol layer may use the opcode in conjunction with the Message Class to form a complete opcode (i.e. define the message class type and the operation within). As an example, the same opcode with a REQ message type may define a first request operation, while the same opcode with a SNP message class may define a second, different SNP operation, among other examples. The Link Layer may use the opcode to distinguish, for instance, between a Home Agent target or a Caching Agent target for packets when a Home Agent and a Caching Agent share the same NodeID. Additionally, the Link Layer may also use the opcode to determine packet size, among other potential uses.

As noted above, flit headers can further include a Virtual network Adaptive (VNA) field. In one example, when a VNA field is set to a first value, the field can indicate that the flit is using VNA credits. When set to a second value, the flit is using VN0 or VN1 credits, among other potential implementations. In one embodiment, a value may indicate the flit is a single slot flit and slots 1 and 2 codes can be defined as NULL.

A Virtual Network (VN) field can also be provided and indicate for a flit if the header(s) in the flit are utilizing a particular virtual network, such as a virtual network VN0 or VN1. This may be used for both crediting purposes and to indicate which virtual network a message should drain to if using VNA. If one VN bit is provided for the entire flit, any VNA flit that contains multiple headers can ensure that all of them are draining to VN0 or all of them are draining to VN1. Alternatively, multiple VN bits may be provided. For non VNA flits, only Slot 0 may be allowed to have a non-control opcode, so the VN may indicate that header's network.

In some implementations, slots in a flit can be used for small payload messages such as credit returns, ACKs, NAKs, among others. In one example, a channel field can be provided that can be encoded for use in credit returns. This encoding, in combination with the Virtual Network field, may provide the Virtual Channel that a credit return maps to. Where a Message Class has multiple encodings, they may all map to a single Channel value for crediting. When the credit return type is VNA, the Channel value can be ignored. Use of RSVD encodings may be treated as an error by the receiving component. Table 4 includes examples of different Channel options that can be encoded. Note that any combination of bits (or bits representing a hexidecimal value) may be utilized. As an example, a lower order of 3 bits can be used for encoding.

TABLE 4

| Channel |
| --- |
| REQ: Request |
| SNP: Snoop |
| RSP: Response |
| RSVD: Reserved |
| WB: Write back |
| NCB: Non-coherent Bypass |
| NCS: Non-coherent Standard |

Acknowledgement, or ACK, fields can also be provided as header fields to be included in a flit slot. An ACK field may be used by the Link layer to communicate from a receiver to a sender error free receipt of flits. ACK having a first value indicates that a number of flits, such as 4, 8, or 12, have been received without error. When a sender receives an ACK it may deallocate the corresponding flits from the Link Layer Retry Queue. Ack and Ack fields can be used in credit return control flits (e.g., LLCRD), with the total number of Acknowledges being returned determined by creating the full acknowledge return value (Acknowledge first portion, ACK, Acknowledge second portion), among other examples.

As noted above, a Header indication bit (Hdr) can also be provided in some implementations and can be used for one or more purposes. For instance, a Hdr packet can identify whether the packet is a header or data flit, can indicate that the flit is the start of a new packet, as well as indicate the start of an interleaved Link Layer Control flit. The Hdr can be set for the first flit of all packets. Further, an Address field can be provided to identify a global system address. All coherent transactions may be a number of byte aligned and may return the number of bytes of data, eliminating the need for some portion of the Address bits (e.g. at 64 bytes, the lower 6 bits may be omitted). For certain other packets, a full byte level address is to be utilized. A Length field can be provided in some examples to indicate a length of the requested data in bytes for any transaction that is doing a partial read. The partial read specifies the offset (e.g. the lower portion of the address bits omitted above) and the Length. Valid lengths are 0 to the number of bytes that the transactions are aligned to less one, among other examples.

Additional fields can be included. A Byte Enable field can be provided in some instances to indicate the valid bytes for any transaction doing a partial write. A Byte Enable field may have any number 0 to the number of bytes that the transactions are aligned to less one. A Request TID (RTID) field can be used to uniquely identify the different requests from a single Protocol Agent. A Home tracker ID (HTID) field can be used in Snoop packets and Snoop Response packets to indicate the Home Tracker ID of the transaction the snoop and its response are to be associated with. An RHTID field can also be provided in some implementations and flexibly embody an RTID or an HTID, depending on the opcode. For instance, for a snoop, RHTID can be interpreted as RTID, as snoops have an explicit HTID field. For response packets, on the other hand, targeting a home agent, RHTID can be interpreted as HTID. Additionally, for response packets targeting a cache agent, RHTID can be interpreted as RTID for opcodes except FwdCnfltO, among other examples. In some implementations, other message types can default to being interpreted as RTID.

In some implementations, additional fields can be provided such as a Destination Node ID (DNID) field, Requestor Node ID (RNID) field, Conflict Node ID (CNID) field, and Source Node ID (SNID) field. The DNID can identify the destination of a packet. It can be supplied by the Protocol Layer and used by the Link and Routing layers to guide packets to their destinations. The RNID field can identify the original requester/initiator of a transaction and can be supplied by the Protocol Layer. The CNID can be used in RspCnflt packets to indicate the node ID (NID) of the agent where the snoop experienced a conflict and the FwdCnfltO should be sent. A SNID field can be used in SR-D packets to indicate the Node ID of the agent transmitting the SR-D packet.

Additionally, a Prior Cache Line State (PCLS) field can be provided to encode the state of the cache line where it was found at either a peer caching agent or in a home node. For example, if the cache line was supplied by a peer node in the F state, the field should be set to a first value. If the cache line was sent by a home node, the home node should set the field to reflect either the I state or S state depending on the snoop responses it received. If an agent does not support this field it should always be encoded as a default value. Note the PCLS field may be used for performance monitoring/tuning A Non-Coherent Protected field can denote whether a request is to Normal or Protected space. See the table below for the encodings.

In some implementations, HPI Link layer can support a multi-slot flit with explicit fields, such as those described above, as well as implicit fields. For instance, slot message encoding and opcodes can be regarded as implicit. For instance, Slots 1 and 2 may not carry full Message Class encodings, as not all bits are required, in some instances, due to slotting restrictions. Slot 1 carries only Message Class bit 0, and only REQ and SNP packets may be allowed in this slot. REQ and SNP Message Class encodings can be differentiated by bit 0, and the upper two bits can be implied as 0's. Slot 2 may not carry Message Class bits, as only RSP (encoding 2) packets are allowed in this Slot. Therefore the Message Class encoding for Slot 2 may be RSP-2. Slot 2 can also only carry a portion of an opcode, with a second portion of an opcode being assumed to be a default value. This means that RSP-2 packets with the second portion holding the default value are allowed in Slot 2. Further, the Complete opcode field, in one embodiment, can be created by combining the full Message Class with the full Opcode field, forming a Complete Opcode.

Additional examples of implicit fields can include packet length, which can be implied by the opcode. Further, the globally Unique Transaction ID (UTID) may be formed by combining Requester NodeID with Requester Transaction ID. Note, that there may be an overlap in the RTID space between P2P and non-P2P transactions. For instance, the globally P2P Unique Transaction ID (P2PUTID) may be formed by combining Requester NodeID with Requester Transaction ID.

In some implementations, such as that illustrated in the examples of FIG. 17, the structure of the flit can permit Transaction IDs (TIDs) that utilize 11 bits of flit space. As a result, pre-allocation and the enabling of distributed home agents may be removed. Furthermore, use of 11 bits, in some implementations, allows for the TID to be used without having use for an extended TID mode.

Link layer logic can be provided on each agent on each side of a link. A transmitter of an agent or device can receive data from higher layers (e.g., a Protocol or Routing layer) and generate one or more flits to transfer the data to a receiver of a remote agent. The agent can generate a flit with two or more slots. In some instances, the agent can attempt to combine multiple messages or packets within a single flit utilizing the defined slots.

Link layer logic can include, in some implementations, dedicated paths corresponding to each defined slot. The paths can be embodied in either or both hardware and software. A receiver of an agent can receive a flit (as re-constructed using the Physical layer) and Link layer logic can identify each of the slots and process the slots using each slot's respective path. The Link layer can process the flits, and the data included in each slot, according to one or more encoded fields of the flit, such as a control field, header field, CRC field, etc.

In one illustrative example, a transmitter can receiver a write request associated with a first transaction, a snoop request associated with another second transaction, and one or more acknowledges or credit returns that it can send to (or through) another device. The transmitter can send a single flit to the other device over a serial data link of an interconnect, the single flit to include headers for each of the write request, the snoop, and an acknowledge (e.g., a completion), each header occupying a respective flit slot (such as in the 3-slot implementation illustrated in the example of FIG. 17). The transmitter can buffer data it receives and identify opportunities to send multiple messages in a single flit. The receiver can receive the compiled flit and process each slot in parallel to identify and process each of the three messages, among many other potential examples.

In some implementations, multiple headers can be included in a multi-slot flit so as to send multiple messages using a single flit. In some examples, the respective headers can each relate to fully independent transactions. In some implementations, the flexibility of the flit can be constrained such that each flit only contains messages directed to a particular virtual network. Other implementations may abstain from such a condition.

In instances where slot messages are to all apply to a common one of a plurality of virtual networks, bits that would have traditionally been reserved for identification of a slot's respective virtual network can be dedicated to other uses, that in some implementations, further increases efficiency gains introduced by the flit format, among potentially other benefits. In one example, all slots in a multi-slot header flit may be aligned to a single virtual network such as only VNA, only VN0, or only VN1, etc. By enforcing this, per slot bits indicating virtual network can be removed. This increases the efficiency of flit bit utilization and potentially enables such other features, as expanding from 10 bit TIDs to 11 bit TIDs, among other examples. Expanding to an 11 bit TID can, in some implementations, allow for the TID to be used without having use for an extended TID mode.

As noted above, in some implementations, special flit types can be provided, such as Link layer control flit. Such control flits can still utilize the defined multi-slot format defined for a slot while utilizing special header types corresponding to the control and error management functionality to be facilitated using such control flits. For example, a special header types can be provided that consume the entire flit and are used for communication between connected Link layers.

In one implementations, special control messages can be placed under a single Message class plus Opcode encoding for Link layer control messaging. This opcode can be designated "LLCTRL" and all control message types can fall under this sub-type of opcode. This can, in some implementations, allow the number of Message class bits to be included in a multi-slot flit format to be reduced (e.g., from four message class bits to three, etc.). In some implementations, another form of Link layer control flit can also be provided to handle a subset of the control messages. For instance, a LLCRD opcode can be defined for acknowledgement and credit returns, among other examples. In the case of LLCTRL opcodes, a multi-slot flit, rather than permitting use of each of the multiple slots, can dedicate the entire flit payload to the control message and permit special encodings for link-to-link communications.

A variety of control flits can be defined (e.g., under LLCTRL). In one example, some implementations of an HPI interconnect can include transmission of Viral status in protocol level messages and Poison status in data flits. In one embodiment, HPI protocol level messages and Poison status can be moved to control flits. Since these bits are infrequently used (e.g., only in the case of errors), removing them from the protocol level messages potentially increases flit utilization. Injecting them using control flits can still allow containment of the errors.

Viral alerts can include an error containment mechanism that results from a fatal error where it is difficult to avoid error propagation without immediately shutting down the system or suffering data corruption. Viral alert can address the error propagation issue relating to fatal errors, allowing an infected system to be shutdown gracefully and in the process cleaning up the system interface and other shared resources across system partitions.

Viral alerts can be implemented according to an assumption that the HPI interface is operational and can be used to deliver the error indication. In HPI, a viral alert can be issued using a special Viral Error control flit. When an agent becomes viral, it will preempt outbound flits and send a Viral Flit to the remote agent. Each protocol agent that detects a fatal error or receives a packet indicating a viral condition, can transition to a viral condition. Once a viral condition is set, the condition can last until the agent is reset (a system reset) or some other platform specific mechanism is used to clear out the viral condition. Once an agent becomes viral, then it is assumed that all future packets from that agent are compromised until the platform can determine the severity of the error. The platform can be responsible for controlling the system so that masking viral propagation or clearing of the viral state does not compromise error containment. For instance, I/O proxy entities may stop committing any data to permanent storage or I/O devices after they have become viral. Additionally, agent(s) that are in viral state may generate new requests to allow error handling software to gracefully shutdown the system partition. The mechanisms used by a system for graceful shutdown can be platform implementation specific and outside the scope of this specification.

Figure 20:
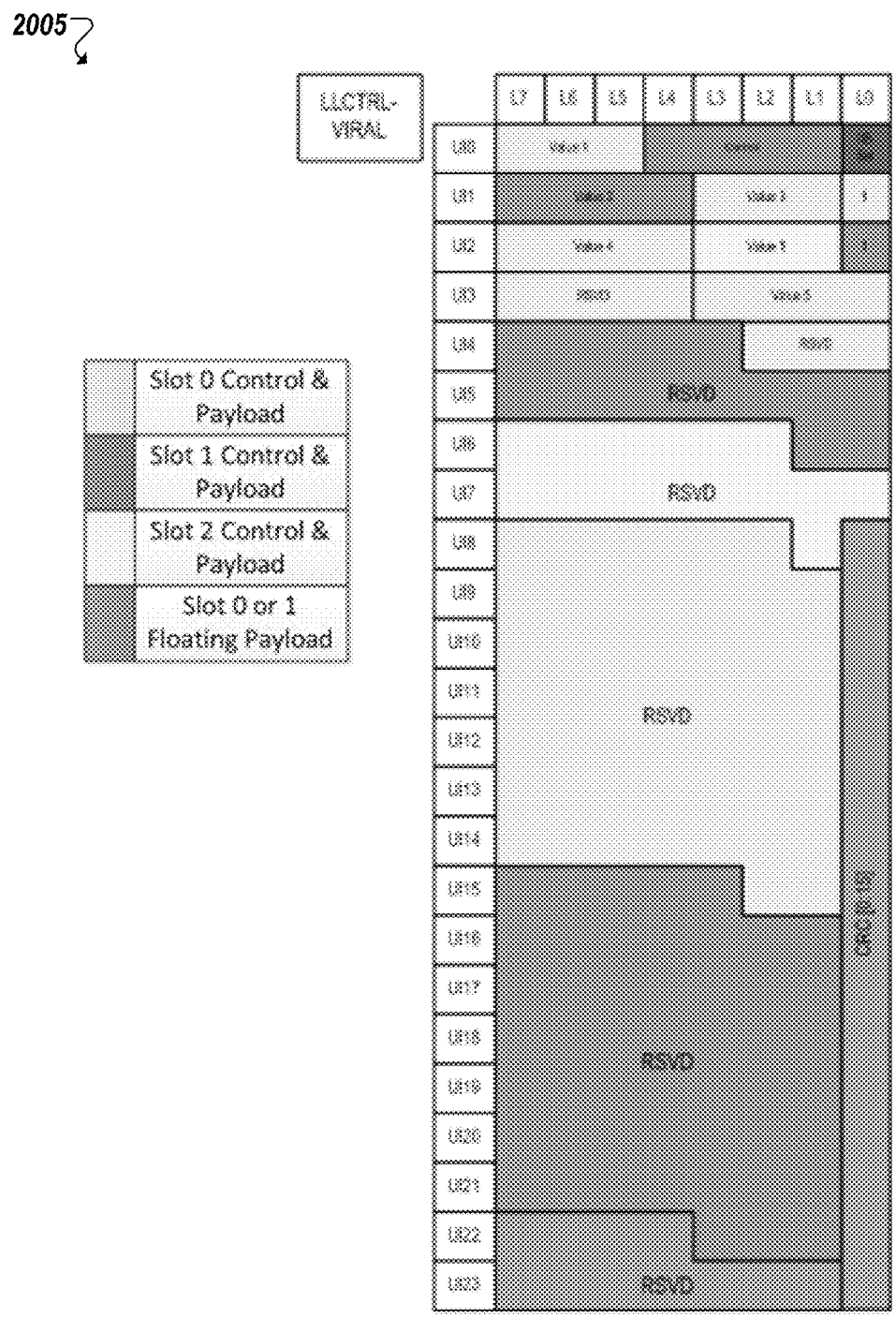
FIG. 20 illustrates a representation of an example viral error control flit.

The Viral Alert mechanism can be a global status per partition and may be cleared on all reset events including warm reset and cold reset. Under Viral Alert, other outbound flits are preempted with the sending of a Viral Error control flit. FIG. 20 illustrates a representation of an example of a special Viral Error control flit 2005 on an 8 lane link. As shown in this particular example, the general multi-slot format of a flit is maintained. However, in this example, Slot 0's message header fields are utilized to communicate the viral condition. The remaining slots can be Slot_NULL as well as the payloads (e.g., interpreted as being RSVD).

Link layer logic, in some implementations, can be configured to restrict Viral Error control flits from being included in and entering a Link Layer Retry Queue. Indeed, special control flits can be identified and handled differently than other flits so that the flit takes priority. Further, the structure of the special flit can be simplified, as in the example of FIG. 20, to make processing of the control flit more efficient. As an example, to ensure that a Viral state is not lost in the event of an error on a Viral Error flit, for instance, a Viral state can also be carried in a LLCTRL-RETRY.Ack message, among other features and examples.

Figure 21:
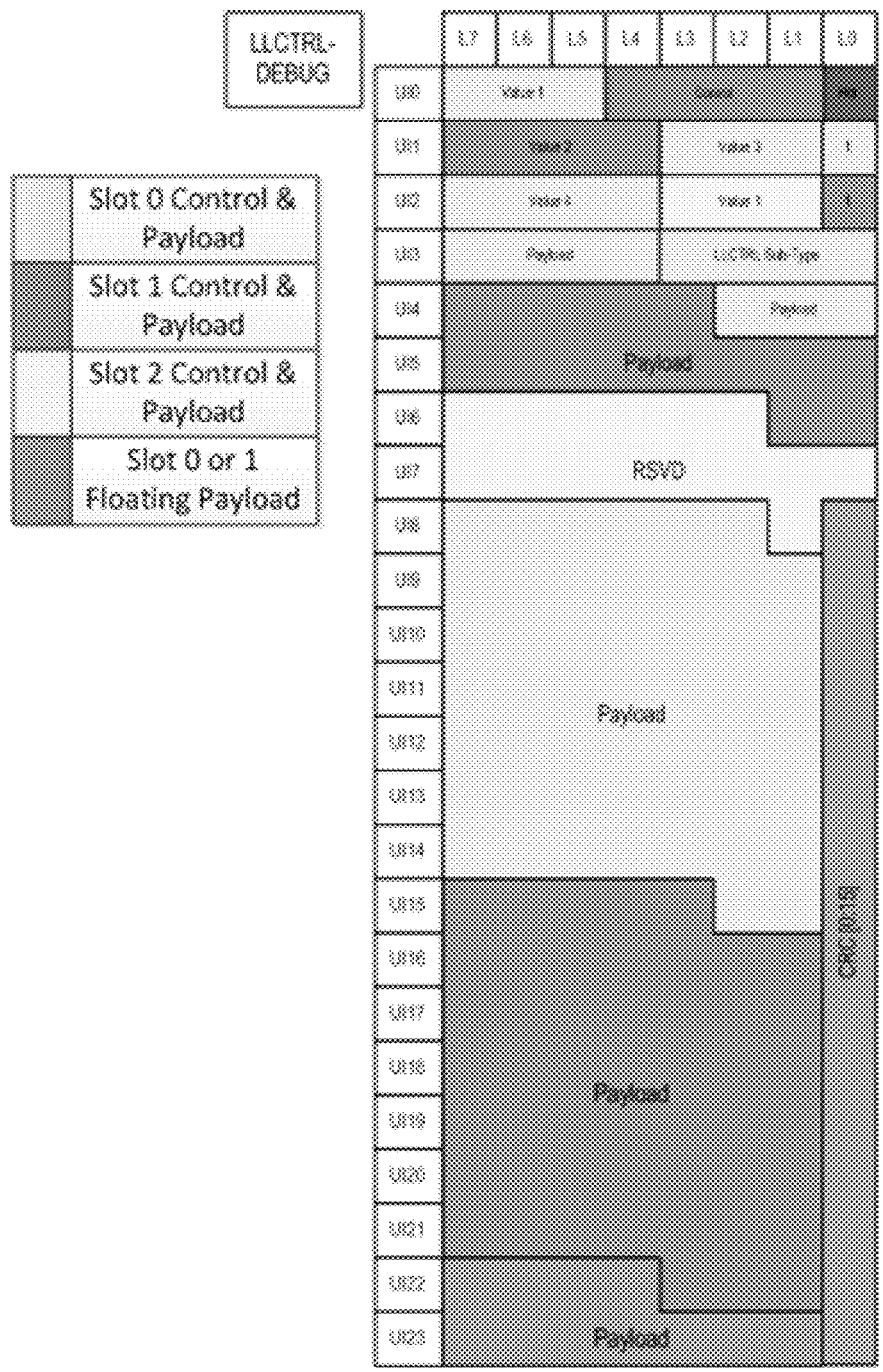
FIG. 21 illustrates a representation of an example multi-layer flit including a debug message.

In one embodiment, the Link Layer can additionally define three Special Debug Message types. A second number of Standard Debug Message types may be reserved for future general debug packet type extensions. Support of Debug message types can be implementation or device specific. In one example, LLCTRL-DEBUG flits may be sent by the Link Layer when an enable debug control field is set. When this bit is not set, LLCTRL-DEBUG flits may not be transmitted on the link. Debug Packets may be important to expose internal states of devices connected by HPI that are otherwise inaccessible. The contents of debug packets can also be implementation specific. Contents could include things like branch info (source and target IPs), time-stamps, indication of an internal event trigger, and so on. The exposed data can be, for instance, by monitoring devices such as logic analyzers for post-processing and failure analysis. An example flit encoding of a Debug message type is illustrated in FIG. 21.

HPI can further support including communication of poison errors using special flits. For instance, a special Poison Error control flit, such as the one (e.g., 2205) illustrated in the example of FIG. 22, can be used to inject poison into the data payload of a data packet and indicate that previously-transmitted data has been determined to be corrupted or otherwise possess errors. In some instances, a Poison Error control flit can apply to an immediately preceding flit on the same link. A special Poison Error control flit can be retry-able, to guarantee that poison information is not lost in the event of a link error. When data is to be poisoned, the Link layer control Poison Error flit is interleaved between the first and second data flits of a packet if the first 32 bytes need to be poisoned. If the second 32 bytes need to be poisoned, the Poison Error flit is interleaved between the second and third data flits, and so on.

Figure 22:
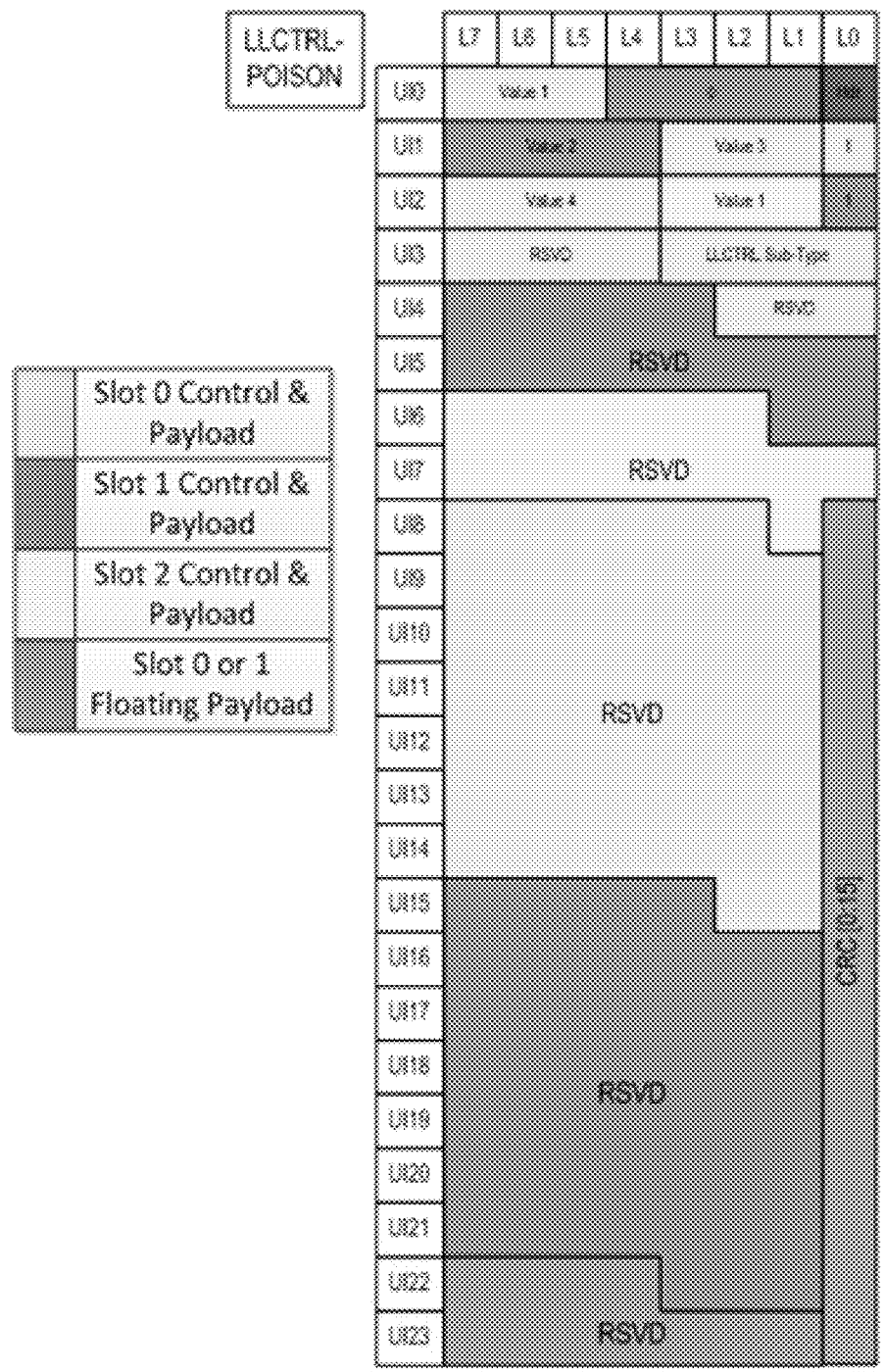
FIG. 22 illustrates a representation of an example poison error control flit.

In the particular example of FIG. 22, a Poison Error flit 2205 can encode the poison condition in the opcode of Slot 0, with the remaining slots (and corresponding fields) encoded with Slot_NULL. Further, as in the example of the Viral Error control flit, payload fields can be zeroed or null and be regarded as RSVD fields.

Small slot fields can be utilized in some link layer control messages. For instance, credit (CRD) and acknowledge (ACK) bits can be included in small slots of a flit to allow return of a pre-mapped number of credits, such as eight, or number of ACKs, such as 8, among many other examples. In some implementations, credit and acknowledge fields can be fully encoded so as to designate any denomination of credits or acknowledges. As an example, in a fully encoded credit fields, bits can be utilized as Credit[n] and Acknowledge[n] when a slot is encoded to indicate that it includes a link-layer credit (LLCRD) message. In some instances, full encoding credit return fields can potentially improve efficiency by allowing any flit to return the number of credits and the number of Acknowledges using a total of only 2 bits, but also allowing their definitions to remain consistent when a fully encoded LLCRD return is used.

In one example, for flow control, credit/acknowledge information can flow as part of non-LLCTRL messages. For instance, in one implementations, HPI can provide that every header flit includes single bit fields serving as a mechanism for bulk credit returns or bulk acknowledges. For instance, setting such fields to a "1" can indicates a refund of 8 VNA credits (in the case of the CRD field) or 8 ACKs (in the case of the ACK field). This can allows credit refunds on any header flit being sent (with the exception, in some implementations, of LLCTRL messages).

On other hand, to address credit/acknowledgement return increments other than some bulk or pre-defined quantity (e.g., 8), and to deal with the inefficiencies that can be introduced through a limited set of return increments, an LLCRD opcode can be provided. The LLCRD opcode can utilize and encode the smallest slot in a header flit (e.g., Slot 2) to communicate credit and ACK returns in one or more formats. For instance, in one example, a first format can be provided that allows a return of any quantity (e.g., from 0-7) of VN0 or VN1 credits for a single message class, and any quantity of ACKs (e.g., from 0-255) through bits dedicated for VN0/1 credit returns (e.g., 3 bits), other bits dedicated for ACK return (e.g., 7 bits), and utilizing the header flit's "ACK" bit as Acknowledge[2] to construct, for instance, an 8 bit field. A second format can be provided that allows return of any quantity (e.g., from 0-255) of VNA credits and any quantity of ACKs (e.g., from 0-255) through dedicated bits (e.g., 7 bits) for VNA returns, and utilizing the header flit's "CRD" bit as Credit[2], to construct, for instance, an 8 field. Likewise, dedicated bits (e.g., 7 bits) can be provided for ACK returns, and the header flit's "ACK" bit can be utilized to construct, for instance, an 8 field. These large, fully encoded, fields can allow the transmitter to refund all credits or acknowledges that have been accumulated (e.g., buffered) in a single message. This can simplify the accumulated credit count logic, in some implementations, to a simple "clear", rather than, for instance, a decrementer on the accumulator.

Figure 23:
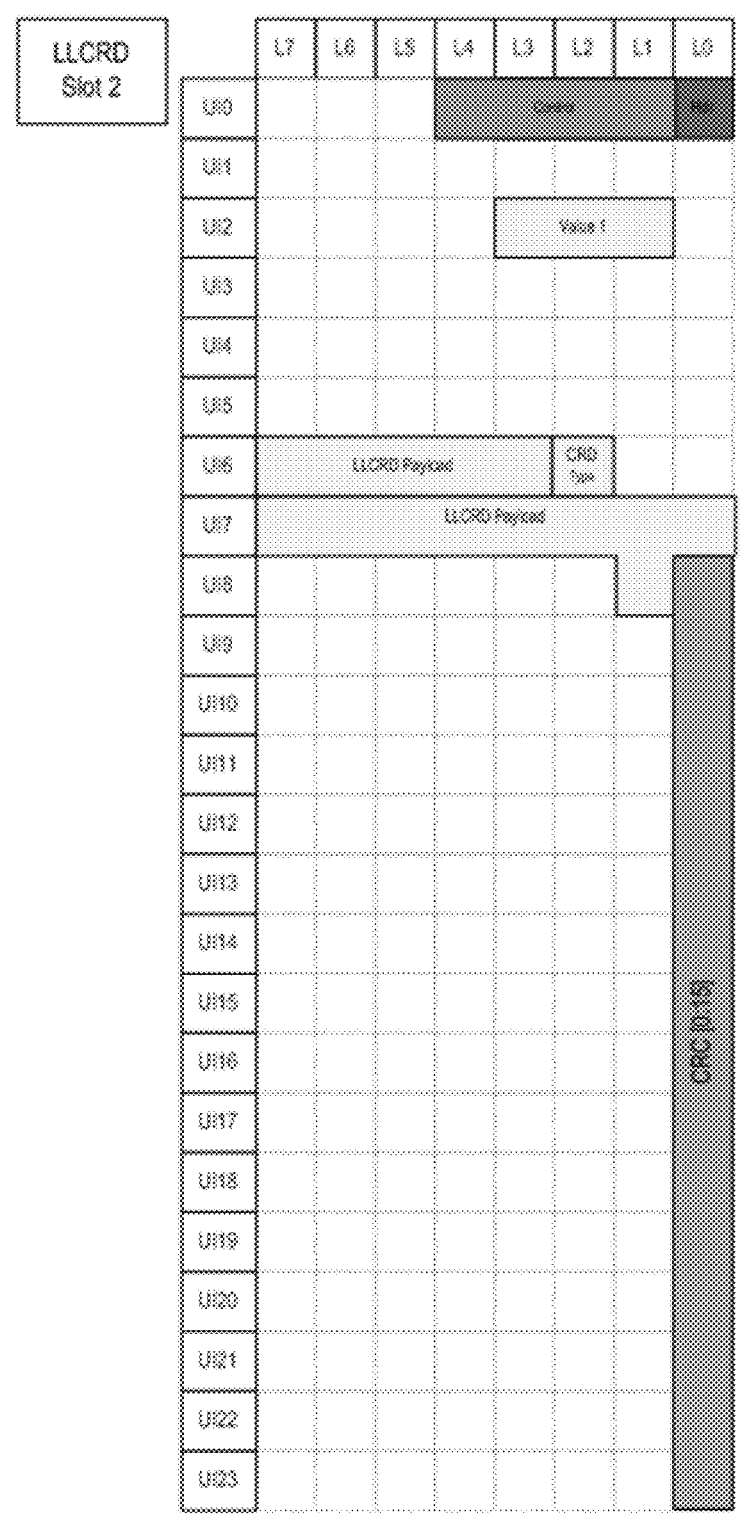

In one particular example illustrated in FIG. 23, a flit with a format such as that defined in the example of FIG. 17, can be utilized to support a LLCRD message. For instance, in this particular example, a LLCRD message may be used in Slot 2 with a pre-designated opcode to return VN0, VN1, and VNA credits, as well as ACKs for the Link Layer Retry Queue. A Link Layer Credits (LLCRD) field (e.g., included in "Value 1") can indicates the format for the LLCRD payload field (e.g., the examples of FIG. 24 below, among other potential field formats).

Figure 24:
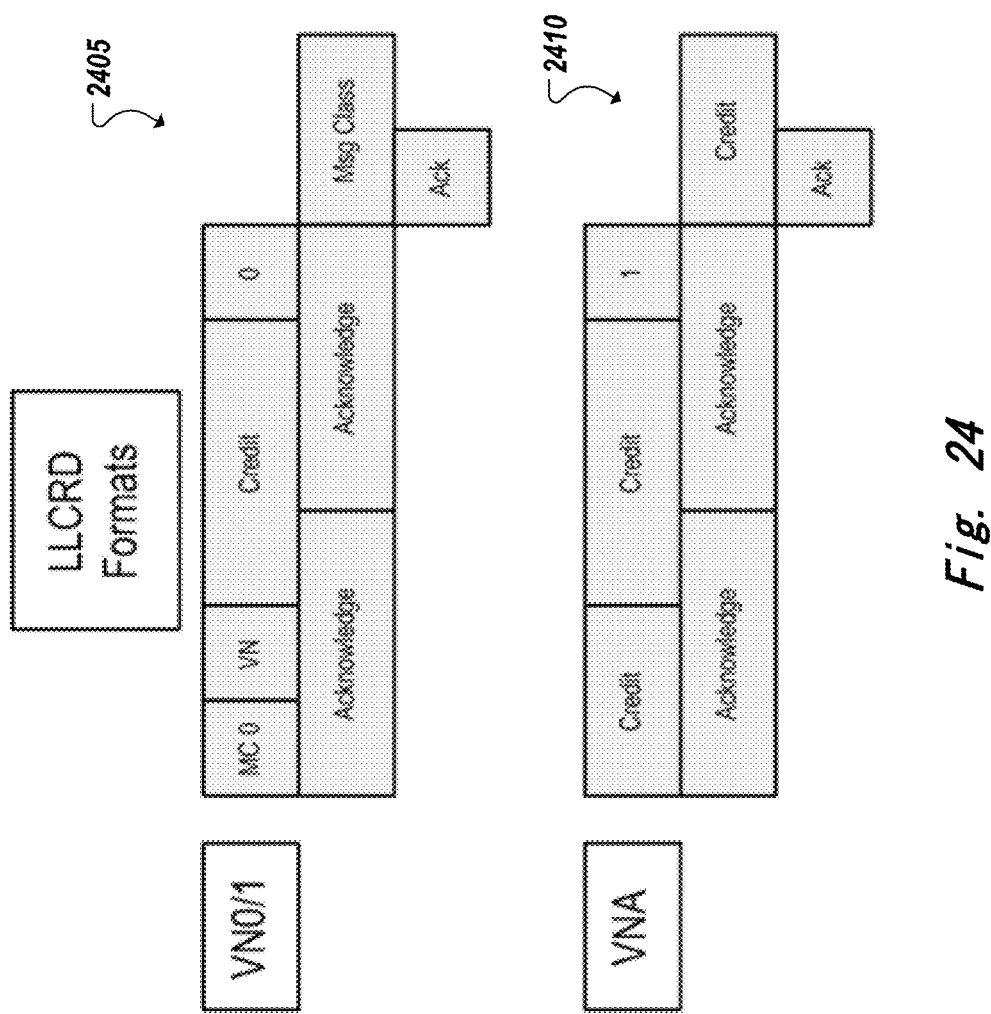
FIG. 24 illustrates credit return formats for use in the example slot of FIG. 23.

FIG. 23 shows a generic format for the slot in LLCRD messaging. FIG. 24 illustrates formats for two different LLCRD credit refund messages 2405, 2410 that can be supported in Slot 2. For instance, LLCRD format headers can be provided for both VN0/1 credit returns (e.g., 2405) and VNA credit returns (e.g., 2410). A Credit Return (CRD) field can be used to refund VNA credits across the link. When set to a first value, this field indicates refund of a number of VNA credits, such as 4, 8, or 12. A Credit and Credit Return (CRDCRC) field can also be provided and may be used in LLCRD format headers, for both VN credit returns and VNA returns. In a VN LLCRD return format, the credit portion may indicate the total number of credits returned for the Virtual Network and Message class. In a VNA LLCRD return format, the total number of VNA credits being returned may be determined by creating the full VNA return value (e.g. a portion of the credit, CRD, and a second portion of the credit.

In one particular example, such as in the examples of FIG. 24, in a VN0/1 LLCRD return format (e.g., 2405), Credit [N:0] indicates the total number of credits returned for the Virtual Network and Message class. In a VNA LLCRD return format (e.g., 2410), the total number of VNA credits being returned is determined by creating the Full_VNA[A:0] return value, where Full_VNA[A:0]={Credit[A:B], CRD, Credit[C:0]}. In some instances, a CRD field can also be used to refund VNA credits across the link. When set to 1, this field indicates refund of 8 VNA credits. When Slot 2 is encoding a VNA LLCRD return type, the total number of VNA credits returned is as described below.

In some implementations of Link layer credit returns, a Channel field can be used to encode the channel for use in credit returns. This encoding, in combination with the Virtual Network field, can be used to identify the Virtual Channel that a credit return maps to. Where a Message Class has multiple encodings, they will all map to a single Channel value for crediting. When the credit return type is VNA, the Channel value can be ignored.

As shown in the examples of FIG. 24, ACK fields can also be included along with credit return fields in the Link layer message. An ACK field may be used by the Link layer to communicate from a receiver to a sender error free receipt of flits. As an example, ACK=1 can indicate that a number of flits have been received without error. When a sender receives an ACK it can deallocate the corresponding flits from the Link Layer Retry Queue. In the examples of FIG. 24, Acknowledge [A:B] and Acknowledge [C:0] can be used to determine the total number of Acknowledges being returned by creating the Full Acknowledge[A:0] return value, where Full Acknowledge[A:0]={Acknowledge[A:B], ACK, Acknowledge[C:0]}.

In some implementations, some fields may be defined to only allow returns in certain predefined increments. For instance, in one example, increments can be defined of 1 (for VN0/1), 2/8/16 (for VNA), and 8 (for Acknowledge), among other examples. This means that returning a large number of pending Credits or Acknowledges may use multiple return messages. It also means that odd numbered return values for VNA and Acknowledge may be left stranded pending accumulation of an evenly divisible value. Some implementations of HPI may have fully encoded credit and ACK return fields, allowing an agent to return all accumulated credits or ACKs for a pool with a single message. This potentially improves link efficiency and also potentially simplifies logic implementation (return logic can implement a "clear" signal rather than a full decrementer).

In some implementations, credits for buffers in VN0 and VN1 can be returned on a per packet basis for each message class. Hence, each buffer for each credit in VN0/VN1 may be sized to cover the buffer requirements for the largest packet size that can use the credit. In some instances, this can provide the most efficient method of credit return for these channels.

In some implementations, because of the shared resource and a variety of message sizes that may be allocated/ deallocated, it may not be efficient to use packet credit/debit for VNA. Instead, in some instances a flit credit/debit scheme can be used for VNA. Each flit can represents 1 flit of receiver buffer space with the credits shared by all message classes that can transmit on VNA. The encodings for the credit return can be described in relation to "LLCRD-Type." Further, as noted above, a flit sent using VNA may contain up to 3 headers (one per slot), in some implementations. The receiver may not return a VNA credit until all three slots have been freed from the receiver queue, among other potential conditions or implementations.

In HPI, a large CRC baseline can be used to provide error detection on a larger multi-slot flit. In some cases, the CRC baseline can even improve error detection over traditional error detection, including other CRC, implementation. In one example, as shown in the example multi-slot flit of FIG. 17, 16 bits can be dedicated per flit to CRC. As a result of the larger CRC, a larger payload may also be utilized. The 16 bits of CRC in combination with a polynomial used with those bits improves error detection.

The value of a CRC field of a flit can be generated from a bit data mask representing the payload of the flit. The CRC value can be generated based on a particular polynomial. In one example, such as the example of FIG. 17, a 192 bit flit can include a 16 bit CRC field. Accordingly, a 176 (non-CRC) bit data masks can be used with an XOR tree (based on the selected polynomial) to produce the 16 CRC bits. Note that the flit payload bits can map vertically across UI within lanes. This may maintain burst error protection.

Link layer logic of an agent can be used to generate the CRC value for a flit. The generated CRC value can be encoded in the CRC field of its corresponding flit. The flit can then be sent over a serial data link to a receiver. The Link layer logic of the receiver can apply the same polynomial used to generate the CRC value to the CRC value identified in the CRC field of a received flit. The receiver can generate a checksum from the CRC value and compare the result against the remaining, non-CRC flit data to determine whether any bit errors resulted from the transmission of the flit over the link. If an error exists on a lane, the checksum should produce a mismatched result, indicating one or more bit errors, among other examples. Additionally, in some implementations, the CRC code may be inverted after generation at the transmitter and inverted again before checking at the receiver, for instance, to prevent a flit of potentially all 0's or all 1's from passing the CRC check.

The accuracy of a CRC can be based on the length of the CRC value and the number of lanes utilized to send the flit. For instance, the potential error burst rate can increase as the number of lanes used in the link decreases. This can introduce additional complexity in HPI systems supporting partial width transmitting states, for instance.

In some cases, the CRC polynomial can be designed based on the maximum total length of the block to be protected (data+CRC bits), the desired error protection features, and the type of resources for implementing the CRC, as well as the desired performance. In some examples, a CRC polynomial can be derived from either an irreducible polynomial or an irreducible polynomial times the factor to detect all errors affecting an odd number of bits. However, in some instances, choosing a reducible polynomial can result in missed errors, due to the rings having zero divisors, etc.

In one example implementation, a primitive polynomial can be utilized as the generator for a CRC code to provide a resulting CRC code with maximal total block length. For instance, if r is the degree of the primitive generator polynomial, then the maximum block length can be $(2^r-1)$, and the associated code can be able to detect any single-bit or double-bit errors. In another implementations, a generator polynomial $g(x)=p(x)(1+x)$ can be utilized, where $p(x)$ is a primitive polynomial of degree $(r-1)$, a maximum block length is $(2^{r-1}-1)$, and the resulting code able to detect single, double, and triple errors, among other examples.

A polynomial $g(x)$ that admits other factorizations may be utilized so as to balance the maximal total blocklength with a desired error detection power. For instance, BCH codes are a powerful class of such polynomials. Regardless of the reducibility properties of a generator polynomial of degree r, if it includes the "+1" term, the code can be able to detect error patterns that are confined to a window of r contiguous bits. These patterns can be referred to as "error bursts". Such error bursts can result, for instance, when an error affects one of the lanes of a link.

In one particular example, a 192 bit flit can include a 16 bit CRC field. A 16 bit CRC polynomial can be implemented in Link layer logic to generate values of the CRC field. In one embodiment, the polynomial can permit detection of 1-bit, 2-bit, 3-bit, and 4-bit errors, detection of errors of burst length 16 or less, with only $1:2^{16}$ of all other error conditions going undetected. In one particular example, the 16 CRC polynomial utilized can be 0x17 db $(x^{16}+x^{15}+x^{13}+x^{12}+x^{10}+x^9+x^8+x_7+x^6+x^5+x^4+x^3+x^1+1)$ to provide an XOR depth of 93, 4 bit random error detection, and 16 bit burst protection, among other potential implementations and alternatives.

As noted above, the error detection properties of a CRC can be based on the length of the CRC. For instance, in the case of a 16 bit CRC protecting a 192 bit flit, error detection can capture errors of burst length 16 or less. Such an implementation can effectively capture substantially all single-lane errors that could appear on a link employing 12 or more lanes to transmit the flit. However, for links or link states utilizing fewer lanes to transmit the flit, a 16 bit CRC can insufficient. For instance, a malfunction or error on a single lane of an 8 lane link can result in errors with burst lengths as high as 24 bits.

In some implementations, rolling CRC can be employed to extend the error detection properties provided through a flit format dedicating a fixed number of bits to a CRC. In one embodiment, a rolling CRC based on two or more CRC polynomials and two or more corresponding XOR trees can be provided (at least on some HPI-compliant devices). For a sequence of two or more flits, a first CRC code can be generated by the first polynomial for a first flit. For the second flit, the second CRC polynomial can be used to generate a second CRC code, and so on. The first CRC code generated by the first polynomial can be XORed with the second CRC code generated by the second polynomial to produce a rolling CRC value. The rolling CRC value can be provided to the receiver (e.g., in the CRC field of a flit). The rolling CRC value can reflect effectively multiple flits' worth of data improving the ability of the system to detect bit errors of higher burst lengths while no sacrificing additional payload for extra CRC bits, among other examples.

In one embodiment, a rolling CRC based on two CRC-16 equations is utilized. Two 16 bit polynomials may be used, the polynomial from HPI CRC-16 and a second polynomial. The second polynomial has the smallest number of gates to implement a 32 bit rolling CRC algorithm that realizes the properties of 1) detection of all 1-7 bit errors; 2) per lane burst protection in x8 link widths (to covers 24UI in a 8 lane length); 3) detection of all errors of burst length 16 or less; and 4) only $1:2^{32}$ of all other error conditions go undetected. In one example, the second polynomial can comprise 0x10147 $(x^{16}+x^8+x^6+x^2+x^1+1)$. Other example implementations can utilize the principles illustrated above, such as implementations tailored to flits of a different length, or systems with links supporting a different (higher or lower) minimum lane width with corresponding defined polynomials and CRC field lengths in accordance with the implementations' particular designs.

Protocol Layer

The HPI Coherence Protocol also may ensure the forward progress of coherence requests made by an agent to an address in the coherent memory space. Certainly, transactions may eventually be satisfied and retired for proper system operation. The HPI Coherence Protocol, in some embodiments, may have no notion of retry for resolving resource allocation conflicts. Thus, the protocol itself may be defined to contain no circular resource dependencies, and implementations may take care in their designs not to introduce dependencies that can result in deadlocks. Additionally, the protocol may indicate where designs are able to provide fair access to protocol resources.

Logically, the HPI Coherence Protocol, in one embodiment, can include three items: coherence (or "cache" or "caching") agents, home agents, and the HPI interconnect fabric connecting the agents. Coherence agents and home agents can work together to achieve data consistency by exchanging messages over the interconnect. The link layer 610a,b and its related description can provide the details of the interconnect fabric including how it adheres to the coherence protocol's requirements, discussed herein. (It may be noted that the division into coherence agents and home agents is for clarity. A design may contain multiple agents of both types within a socket or even combine agents behaviors into a single design unit, among other examples.)

In one embodiment, home agents can be configured to guard physical memory. Each home agent can be responsible for a region of the coherent memory space. Regions may be non-overlapping, in that a single address is guarded by one home agent, and together the home agent regions in a system cover the coherent memory space. For instance, each address can be guarded by at least one home agent. Therefore, in one embodiment, each address in a HPI system's coherent memory space can map to exactly one home agent.

Home agents in the HPI Coherence Protocol, in one embodiment, can be responsible for servicing requests to the coherent memory space. For read (Rd) requests, home agents may generate snoops (Snp), process their responses, send a data response, and send a completion response. For invalidation (Inv) requests, home agents may generate necessary snoops, process their responses, and send a completion response. For write requests, home agents may commit the data to memory and send a completion response.

Home agents may provide snoops in the HPI Coherence Protocol and process snoop responses from coherence agents. Home agents can also process forward requests, which are a special snoop response, from coherence agents for conflict resolution. When a home agent receives a forward request, it may send a forward response to the coherence agent that generated the forward request (i.e., the agent that detected a conflicting snoop request). Coherence agents can use the ordering of these forward responses and completion responses from the home agent to resolve conflicts.

A coherence agent may issue supported coherence protocol requests. Requests may be issued to an address in the coherent memory space. Data received for read requests (Rd) except RdCur may be consistent. Data for RdCur requests may have been consistent when the data packet was generated (although it may have become out of date during delivery). Table 5 shows an exemplary, non-exhaustive list of potential supported requests:

TABLE 5

| Name | Semantics | Cache State |
|---|---|---|
| RdCode | Request a cache line in F or S state. | F or S |
| RdData | Request a cache line in E, F, or S state. | F or S |
| RdMigr | Request a cache line in M, E, F, or S state. | M and (F or S) |
| RdInv | Request a cache line in E state. If line was previously cached in M state, the line will be written to memory before E data is delivered. | E |
| RdInvOwn | Request a cache line in M or E state. | M |
| RdCur | Request an uncacheable snapshot of a cache line. | |
| InvItoE | Request exclusive ownership of a cache line without receiving data. | M or E |
| InvItoM | Request exclusive ownership of a cache line without receiving data and with the intent of performing a writeback soon afterward. | M or E |
| InvXtoI | Flush a cache line from all caches. Requesting agent is to invalidate the line in its cache before issuing this request. | |
| WbMtoI | Write a cache line in M state back to memory and invalidate the line in the cache. | M |
| WbMtoS | Write a cache line in M state back to memory and transition line to S state. | M and S |
| WbMtoE | Write a cache line in M state back to memory and transition line to E state. | M and E |
| WbMtoIPtl | Write a cache line in M state back to memory, according to a byte-enable mask, and transition line to I state. | M |
| WbMtoEPtl | Write a cache line in M state back to memory, according to a byte-enable mask, transition line to E state, and clear the line's mask in the cache. | M and E |
| EvctCln | Notification to home agent that a cache line in E state was invalidated in the cache. | E |
| WbPushMtoI | Send a line in M state to home agent and invalidate the line in the cache; home agent may either write the line back to memory or send it to a local cache agent with M state. | M |
| WbFlush | Request that home flush writes to implementation-specific addresses in its memory hierarchy. No data is sent with the request. | |

HPI can support a Coherency protocol making use of principles of the MESI protocol. Each cache line can be marked with one or more supported states (e.g., coded in the cache line). A "M" or "Modified" state can indicate that the cache line value has been modified from that value which is in main memory. A line in the M-state is only present in the particular and the corresponding cache agent can be required to write the modified data back to memory at some time in the future, for instance, before permitting any other read of the (no longer valid) maing memory state. A writeback can transition the line from the M-state to the E-state. The "E" or "Exclusive" state can indicate that the cache line is only present in the current cache but that its value matches that in main memory. The cache line in E-state can transition to the S-state at any time in response to a read request or may be changed to the M-state by writing to the line. The "S" or "Shared" state can indicates that the cache line may be stored in other caches of the machine and has a value that matches that of the main memory. The line may be discarded (changed to the I-state) at any time. The "I" or "Invalid" state can indicate that a cache line is invalid or unused. Other state can also supported in HPI, such as an "F" or "Forward" shared state that indicates that the particular shared line value is to be forwarded to other caches that are to also share the line, among other examples.

Table 6 include exemplary information that can be included in some Coherence protocol messages, including snoop, read, and write requests, among other examples:

TABLE 6

| Field | Usage |
|---|---|
| cmd | Message command (or name or opcode). |
| addr | Address of a coherent cache line. |

TABLE 6-continued

| Field | Usage |
|---|---|
| destNID | NID of destination (home or coherence) agent. |
| reqNID | NID of requesting coherence agent. |
| peerNID | NID of coherence agent that sent the (forward request) message. |
| reqTID | ID of the resource allocated by the requesting agent for the transaction, also known as RTID. |
| homeTID | ID of the resource allocated by the home agent to process the request, also known as HTID. |
| data | A cache line of data. |
| mask | Byte mask to qualify the data. |

Snoop messages may be generated by home agents and directed toward coherence agents. A snoop (SNP) virtual channel can be used for snoops and, in one embodiment, are the only messages that use the SNP virtual channel. Snoops can include the requesting agent's NID and the RTID it allocated for the request in case the snoop results in data being sent directly to the requesting agent. Snoops, in one embodiment, can also include the HTID allocated by the home agent to process the request. The coherence agent processing the snoop may include the HTID in the snoop response it sends back to the home agent. Snoops may, in some instance, not include the home agent's NID because it may be derived from the included address, which the targeted coherence agent does when sending its response. Fanout snoops (those with "SnpF" prefix) may not include a destination NID because the Routing Layer is responsible for generating the appropriate snoop messages to all peers in the fanout region. An exemplary list of snoop channel messages is listed Table 7:

TABLE 7

| Command | Semantics | Fields |
|---|---|---|
| SnpCode | Snoop to get data in F or S state. | cmd, |
| SnpData | Snoop to get data in E, F, or S state. | addr, |
| SnpMigr | Snoop to get data in M, E, F, or S state. | destNID, |
| SnpInv | Snoop to invalidate the peer's cache, flushing any M copy to memory. | reqNID, reqTID, |
| SnpInvOwn | Snoop to get data in M or E state. | homeTID |
| SnpCur | Snoop to get an uncacheable snapshot of a cache line. | |
| SnpFCode | Snoop to get data in F or S state; Routing layer to handle distribution to all fanout peers | cmd, addr, |
| SnpFData | Snoop to get data in E, F, or S state; Routing layer to handle distribution to all fanout peers | reqNID, reqTID, |
| SnpFMigr | Snoop to get data in M, E, F, or S state; Routing layer to handle distribution to all fanout peers | homeTID |
| SnpFInvOwn | Snoop to get data in M or E state; Routing layer to handle distribution to all fanout peers. | |
| SnpFInv | Snoop to invalidate the peer's cache, flushing any M copy to memory; Routing layer to handle distribution to all fanout peers. | |
| SnpCur | Snoop to get an uncacheable snapshot of a cache line; Routing layer to handle distribution to all fanout peers. | |

HPI may also support non snoop requests that they may issue to an address, such as those implemented as non-coherent requests. Examples of such requests can include a non-snoop read to request a read-only line form memory, a non-snoop write to write a line to memory, and a write a line to memory according to a mask, among other potential examples.

In one example, four general types of response messages can be defined in the HPI Coherence Protocol: data, completion, snoop, and forward. Certain data messages can carry an additional completion indication and certain snoop responses can carry data. Response messages may use the RSP virtual channel, and the communication fabric may maintain proper message delivery ordering among ordered completion responses and forward responses.

Table 8 includes a listing of at least some potential response messages supported by an example HPI Coherence Protocol:

TABLE 8

| Name | Semantics | Fields |
|---|---|---|
| Data_M | Data is M state. | cmd, |
| Data_E | Data is E state. | destNID, |
| Data_F | Data is F state. | reqTID, |
| Data_SI | Depending upon request, data in S state or uncacheable "snapshot" data. | data |
| Data_M | Data is M state with an ordered completion response. | |
| Data_E | Data is E state with an ordered completion response. | |
| Data_F | Data is F state with an ordered completion response. | |
| Data_SI | Depending upon request, data in S state or uncacheable "snapshot" data, with an ordered completion response. | |
| CmpU | Completion message with no ordering requirements. | cmd, |
| CmpO | Completion message to be ordered with forward responses. | destNID, reqTID |
| RspI | Cache is in I state. | cmd, |
| RspS | Cache is in S state. | destNID, |
| RspFwd | Copy of cache line was sent to requesting agent, cache state did not change. | homeTID |
| RspFwdI | Copy of cache line was sent to requesting agent, cache transitions to I state. | |
| RspFwdS | Copy of cache line was sent to requesting agent, cache transitions to S state. | |
| RspIWb | Modified line is being implicitly written back to memory, cache was transitioned to I state. | cmd, destNID, |
| RspSWb | Modified line is being implicitly written back to memory, cache was transitioned to S state. | homeTID, data |
| RspFwdIWb | Modified line is being implicitly written back to memory, copy of cache line was sent to requesting agent, cache was transitioned to I state. | |
| RspFwdSWb | Modified line is being implicitly written back to memory, copy of cache line was sent to requesting agent, cache was transitioned to S state. | |
| RspCnflt | Peer has an outstanding request to same address, is requesting an ordered forward response, and has allocated a resource for the forward. | cmd, destNID, homeTID, peerNID |

In one example, data responses can target a requesting coherence agent. A home agent may send any of the data responses. A coherence agent may send only data responses not containing an ordered completion indication. Additionally, coherence agents may be limited to sending data responses only as a result of processing a snoop request. Combined data and completion responses may always be of the ordered-completion type and can be kept ordered with forward responses by the communication fabric.

The HPI Coherence Protocol can use the general unordered completion message and a coherence-specific ordered completion message. A home agent may send completion responses to coherent requests and completion responses can be typically destined for a coherence agent. The ordered completion response can be kept ordered with forward responses by the communication fabric.

Snoop responses may be sent by coherence agents, specifically in response to processing a snoop request, and target the home agent handling the snoop request. The destNID is usually a home agent (determined from the address in the snoop request) and the included TID is for the home agent's resource allocated to process the request. Snoop responses with "Wb" in the command are for implicit writebacks of modified cache lines, and they carry the cache line data. (Implicit writebacks can include those a coherence agent makes due to another agent's request, whereas the other requests are made explicitly by the coherence agent using its request resources.)

Coherence agents can generate a forward request when a snoop request conflicts with an outstanding request. Forward requests target the home agent that generated the snoop, which is determined from the address in the snoop request. Thus, the destNID is a home agent. The forward request can also include the TID for the home agent's resource allocated to process the original request and the NID of the coherence agent generating the forward request The HPI Coherence Protocol can support a single forward response, FwdCnfltO. Home agents can send a forward response for every forward request received and to the coherence agent in the forward request's peerNID field. Forward responses carry the cache line address so the coherence agent can match the message to the forward resource it allocated. Forward response message can carry the requesting agent's NID but, in some cases, not the requesting agent's TID. If a coherence agent wants to support cache-to-cache transfers for forward responses, it can save the requesting agent's TID when processing the snoop and send a forward request. To support conflict resolution, the communication fabric may maintain ordering between the forward response and all ordered completions sent before it to the same destination coherence agent.

In some systems, home agent resources are pre-allocated in that "RTIDs" represent resources in the home agents and the caching agents allocate RTIDs from system-configured pools when generating new coherence requests. Such schemes can limit the number of active requests any particular caching agent can have to a home agent to the number of RTIDs it was given by the system, effectively slicing up home resources statically among caching agents. Such schemes can result inefficient allocation of resources and properly sizing a home agent to support request throughput can become impractical for large systems, among other potential issues. For instance, such schemes can force RTID pool management upon the caching agents. Additionally, in some systems, a caching agent may not reuse the RTID until the home agent has completely processed the transaction. Waiting until a home agent completes all processing, however, can unnecessarily throttle caching agents. Additionally, certain flows in the protocol can involve caching agents holding onto RTIDs beyond the home agent release notification, further throttling their performance, among other issues.

In one implementation, home agents can be allowed to allocate their resources as requests arrive from cache agents. In such instances, home agent resource management can be kept separate from coherence agent logic. In some implementations, home resource management and coherence agent logic can be at least partially intermingled. In some instances, coherence agents can have more outstanding requests to a home agent than the home agent can simultaneously handle. For instance, HPI can allow requests to queue up in the communication fabric. Further, to avoid deadlocks caused by the home agent blocking incoming requests until resources become available, the HPI Coherence protocol can be configured to ensure that other messages can make progress around blocked requests to ensure that active transactions reach completion.

In one example, resource management can be supported by allowing an agent receiving a request to allocate resources to process it, the agent sending the request allocating respective resources for all responses to the request The HTID can represent the resource that a home agent allocates for a given request included in some protocol messages. The HTID (along with RNID/RTID) in snoop requests and forward responses can be used to support responses to a home agent as well as data forwarding to a requesting agent, among other examples. Further, HPI can support the ability of an agent to send an ordered complete (CmpO) early, that is, before the home agent is finished processing the request, when it is determined to be safe for a requesting agent to reuse its RTID resource. General handling of snoops with similar RNID/RTID can also be defined by the protocol.

In one illustrative example, when a particular request's tracker state is busy, a directory state can be used to determine when the home agent may send a response. For instance, an Invalid directory state can allow a response to be sent, except for RdCur requests which indicates there are no outstanding snoop responses. An Unknown directory state can dictate that all peer agents have been snooped and all their responses gathered before a response can be sent. The Exclusive directory state can dictate that the owner be snooped and all responses gathered before a response is sent, or if the requesting agent is the owner then a response may immediately be sent. The Shared directory state can specify that an invalidating request (e.g., RdInv* or Inv*) has snooped all peer agents and gathered all snoop responses. When a given request's tracker state is writeback buffered (WbBuffered), the home agent may send a data response. When the request's tracker state is DataSent (indicating the home agent has already sent a data response) or DataXfrd (indicating a peer transferred a copy of the line), the home agent may send the completion response.

In instances such as those described above, a home agent may send data and completion responses before all snoop responses have been gathered. The HPI interface allows these "early" responses. When sending early data and completions, the home agent may gather all outstanding snoop responses before releasing the resource it allocated for the request. The home agent can also continue blocking further standard requests to the same address until all snoop responses have been gathered, then releasing the resource. A home agent sending a response message from a Busy or WbBuffered state can use a sub-action table (e.g., included in a set of protocol tables embodying the formal specification of the HPI Coherence protocol) for which message to send and use a sub action table for how to update the directory state, among other examples. In some cases, an early completion can be performed without pre-allocation by a home node.

In one embodiment, HPI Coherence protocol can omit the use of either or both pre-allocated home resources and ordered request channels. In such implementations, certain messages on the HPI RSP communication channel can be ordered. For instance, specifically "ordered completion" and "forward response" messages, can be provided, that can be sent from the home agent to the coherence agent. Home agents can send an ordered completion (CmpO or Data_*_CmpO) for all coherent read and invalidation requests (as well as other requests, such as a NonSnpRd requests, that are not involved in cache-coherence conflicts).

Home agents can send forward responses (FwdCnfltO) to coherence agents that send forward requests (RspCnflt) to indicate a conflict. A coherence agent can generate a forward request whenever it has an outstanding read or invalidation request and detects an incoming snoop request to the same cache line as the request. When the coherence agent receives the forward response, it checks the current state of the outstanding request to determine how to process the original snoop. The home agent can sent the forward response to be ordered with a complete (e.g., CmpO or Data_*_CmpO). The coherence agent can utilize information included in the snoop to aid the coherence agent in processing a forward response. For instance, a forward response may not include any "type" information and no RTID. The nature of the forward response can be derived from information obtained from the preceding snoop(s). Further, a coherence agent may block outstanding snoop requests when all of its "forward resources" are waiting for forward responses. In some implementations, each coherence agent can be designed to have at least one forward resource.

In some implementations, communication fabric requirements can be upon the Routing Layer. In one embodiment, the HPI Coherence protocol has one communication fabric requirement that is specific to the Routing Layer. The coherence protocol can depend upon the routing layer to convert a fanout snoop (SnpF* opcodes—Snoop (SNP) Channel Messages") into the appropriate snoops for all of the request's peers in the fanout set of Coherence Agents. The fanout set is a configuration parameter of the Routing Layer that is shared by the Protocol Layer. In this coherence protocol specification it is described as a Home Agent configuration parameter.

In some implementations above, the HPI Coherence Protocol can utilizes four of the virtual channels: REQ, WB, SNP, and RSP. The virtual channels can be used to unwind dependency cycles and avoid deadlock. In one embodiment, every message can be delivered without duplication on all virtual channels and an ordering requirement upon the RSP virtual channel.

In some implementations, the communication fabric can be configured to preserve an ordering among certain completion messages and the FwdCnfltO message. The completion messages are the CmpO message and any data message with CmpO attached (Data_*_CmpO). Together, all of these messages are the "ordered completion responses." The conceptual requirement between ordered completion responses and the FwdCnfltO message is that a FwdCnfltO does not "pass" an ordered completion. More specifically, if a home agent sends an ordered completion response followed by a FwdCnfltO message and both messages are destined for the same coherence agent, then the communication fabric delivers the ordered completion response before the FwdCnfltO, among other potential examples.

It should be appreciated that while some examples of the protocol flow are disclosed herein, the described examples are merely intended to give an intuitive feel for the protocol and do not necessarily cover all possible scenarios and behaviors the protocol may exhibit.

A conflict may occur when requests to the same cacheline address from more than one coherence agent occur around the same time. As a specific example, a conflict can occur when a snoop for a coherence agent's standard request arrives at a peer coherence agent with an outstanding request to the same address. Because each snoop may end up in a conflict, a single request can have multiple conflicts. Resolving conflicts may be a coordinated effort among the home agent, the coherence agents, and the communication fabric. However, the primary responsibility lies with the coherence agents detecting conflicting snoops.

In one embodiment, home agents, coherence agents, and communication fabric can be configured to assist in successfully resolving conflicts. For example, home agents may have outstanding snoops for only one request per address at a time, such that, for a given address, a home agent may have outstanding snoops for only one request. This can serve to exclude the possibility of race conditions involving two requests conflicting with each other. It can also ensure that a coherence agent will not see another snoop to the same address after it has detected a conflict but not yet resolved it.

In another example, when a coherence agent processes a snoop with an address matching an active standard request, it can allocates a forward resource and sends a forward request to the home agent. A coherence agent with an outstanding standard request that receives a snoop to the same address can responds with a RspCnflt snoop response. This response can be a forward request to the home agent. Because the message is a request, before sending it the coherence agent can allocate a resource to handle the response that the home agent will send. (The coherence protocol allows blocking conflicting snoops when the coherence agent has run out of forward resources, in some instances.) The coherence agent may store information about the conflicting snoop to use when processing the forward response. After detecting a conflict and until processing the forward response, a coherence agent may be guaranteed to not see another snoop to the same address.

In some examples, when a home agent receives a forward request, it does not record the snoop response. Instead, the home agent can send a forward response to the conflicting coherence agent. A forward request (RspCnflt), in one example, looks like a snoop response but the home agent does not treat it as one. It does not record the message as a snoop response, but instead sends a forward response. Specifically, for every forward request (RspCnflt) a home agent receives, it sends a forward response (FwdCnfltO) to the requesting coherence agent.

The HPI Communication Fabric orders forward responses and ordered completions between the home agent and the targeted coherence agent. The fabric can thereby serve to differentiate an early conflict from a late conflict at the conflicting coherence agent. From a system-level perspective, an early conflict occurs when a snoop encounters a request that the home agent has not yet processed, and a late conflict occurs when a snoop encounters a request that the home agent has already processed. From a home agent's perspective, an early conflict is when a snoop for the currently active request encounters a request that the home agent has not yet received or started processing, and a late conflict is when the snoop encounters a request it has already processed. In other words, a late conflict is with a request to which the home agent has already sent a completion response. Thus, when a home agent receives a forward request for a late conflict, it will have already sent the completion response to the conflicting agent's outstanding request. By ordering the forward responses and ordered completion responses from home agent to the coherence agent, the coherence agent can determine whether the conflict was early or late by the processing state of its conflicting request.

When a coherence agent receives a forward response, it uses the state of its conflicting request to determine whether the conflict was early or late and when to process the original snoop. Because of the communication fabric's ordering requirement, the state of the conflicting request indicates whether the conflict was early or late. If the request state indicates the completion has been received then it was a late conflict, otherwise it was an early conflict. Alternatively, if the request state indicates the request is still waiting for its response(s) then it was an early conflict, otherwise it was a late conflict. The type of conflict determines when to process the snoop: From a coherence agent's perspective, an early conflict means the snoop is for a request being processed before the agent's conflicting request, and a late conflict means the snoop is for a request being processed after the agent's conflicting request. Given that ordering, for an early conflict, the coherence agent immediately processes the original snoop; and for a late conflict, the coherence agent waits until the conflicting request has received its data (for reads) and its processor has had an opportunity to act upon the finished request before processing the snoop. When the conflicting snoop is processed, the coherence agent will generate a snoop response for the home agent to finally record.

All conflicts with writeback requests can be late conflicts. A late conflict from the coherence agent's perspective is when the agent's request is processed before the snoop's request. By this definition all conflicts with writeback requests can be treated as late conflicts because the writeback is processed first. Otherwise, data consistency and coherency could be violated if the home agent were to process the request before the writeback commits to memory. Because all conflicts with writebacks are deemed late conflicts, coherence agents can be configured to block conflicting snoops until an outstanding writeback request completes. Further, writebacks can also block the processing of forwards. Blocking forwards by an active writeback can also be implemented as a protocol requirement for supporting uncacheable stores, among other examples.

When a coherence agent receives a request to snoop its cache, it can first check if the coherence protocol will allow it, and then it may process the snoop and generate a response. One or more state tables can be defined within a set of state tables that defines the protocol specification. One or more state table can specify when a coherence agent may process a snoop and whether it will snoop the cache or instead generate a conflict forward request. In one example, there are two conditions under which a coherence agent processes a snoop. The first condition is when the coherence agent has a REQ request (Rd* or Inv*) to the snoop address and it has an available forward resource. In this case, the coherence agent must generate a forward request (RspCnflt). The second condition is when the coherence agent does not have a REQ, Wb*, or EvctCln request to the snoop address.

A state table can define how a coherence agent is to process the snoop in accordance with such respective conditions. In one example, under other conditions, the coherence agent can block the snoop until either a forward resource becomes available (first condition) or the blocking Wb* or EvctCln receives its CmpU response (second condition). Note that NonSnp* requests may not affect snoop processing and a coherence agent can disregard NonSnp* entries when determining how to process or block a snoop.

When generating a forward request, a coherence agent can reserve a resource for the forward response. The HPI Coherence protocol, in one example, may not require a minimum number of forward response resources (beyond having at least one) and can allow a coherence agent to block snoops when it has no forward response resources available.

How a coherence agent processes a snoop in its cache can depend upon the snoop type and current cache state. For a given snoop type and cache state, however, there may be many allowed responses. For example, a coherence agent with a full modified line that receives a non-conflicting SnpMigr (or is processing a forward response after a SnpMigr) may do any of the following: Downgrade to S, send implicit writeback to Home and Data_F to requestor; Downgrade to S, send implicit writeback to Home; Downgrade to I, send Data_M to requestor; Downgrade to I, send implicit writeback to Home and Data_E to requestor; Downgrade to I, send implicit writeback to Home; among potentially other examples.

The HPI Coherence protocol allows a coherence agent to store modified lines with partial masks in its cache. However, all rows in for M copies can require a Full or Empty mask. The HPI Coherence protocol, in one example, may restrict implicit writeback of partial lines. A coherence agent wishing to evict a partial M line due to a snoop request (or forward response) can first initiate an explicit writeback and block the snoop (or forward) until the explicit writeback is completed.

Saving information for forward responses: The HPI Coherence Protocol, in one embodiment, allows a coherence agent to store forward response information separate from the outgoing request buffer (ORB). Separating the information allows the ORB to release ORB resources and RTID when all responses are gathered, regardless of the entry being involved in a conflict. State tables can be utilized to specify what information to store for forward responses and under what conditions.

Forward responses in the HPI Coherence protocol can contain the address, the requesting agent's NID, and the home TID. It does not contain the original snoop type or the RTID. A coherence agent may store the forward type and the RTID if it wishes to use them with the forward response, and it may use the address to match the incoming forward response with the proper forward entry (and to generate the home NID). Storing the forward type may be optional. If no type is stored, the coherence agent can treat a forward response as having FwdInv type. Likewise, storing the RTID can be optional and may only occur when the coherence agent is to support cache-to-cache transfers when processing forward responses.

As noted above, coherence agents can generate a forward request when a snoop request conflicts with an outstanding request. Forward requests target the home agent that generated the snoop, which can be determined from the address in the snoop request. Thus, the destNID can identify a home agent. The forward request can also include the TID for the home agent's resource allocated to process the original request and the NID of the coherence agent generating the forward request.

In one embodiment, a coherence agent can block forwards for writeback requests to maintain data consistency. Coherence agents can also use a writeback request to commit uncacheable (UC) data before processing a forward and can allow the coherence agent to writeback partial cache lines instead of protocol supporting a partial implicit writeback for forwards. Indeed, in one embodiment, a coherence agent can be allowed to store modified lines with partial masks in its cache (although M copies are to include a Full or Empty mask).

In one example, early conflicts may be resolved by a forward response encountering an outstanding standard request before it has received any response. A corresponding protocol state table can specify, in one example, that a forward response can be processed as long as the standard request entry is still in ReqSent state. Late conflicts can be resolved by a forward response arriving after the outstanding request has received its completion response. When this occurs either the request will have finished (already received its data or was an Inv* request) or the entry is in its RcvdCmp state. If the request is still waiting for its data, then the coherence agent must block the forward until the data is received (and used). If the conflicting Rd* or Inv* request has finished, then the forward response may be processed as long as the coherence agent has not initiated an explicit writeback of the cache line. It can be permissible for a coherence agent to initiate an explicit writeback while it has a forward response (or snoop request) to the same address, thus allowing partial lines (e.g. Snoop Requests to Partially Modified Lines") or uncacheable stores to be properly committed to memory.

Figure 25:
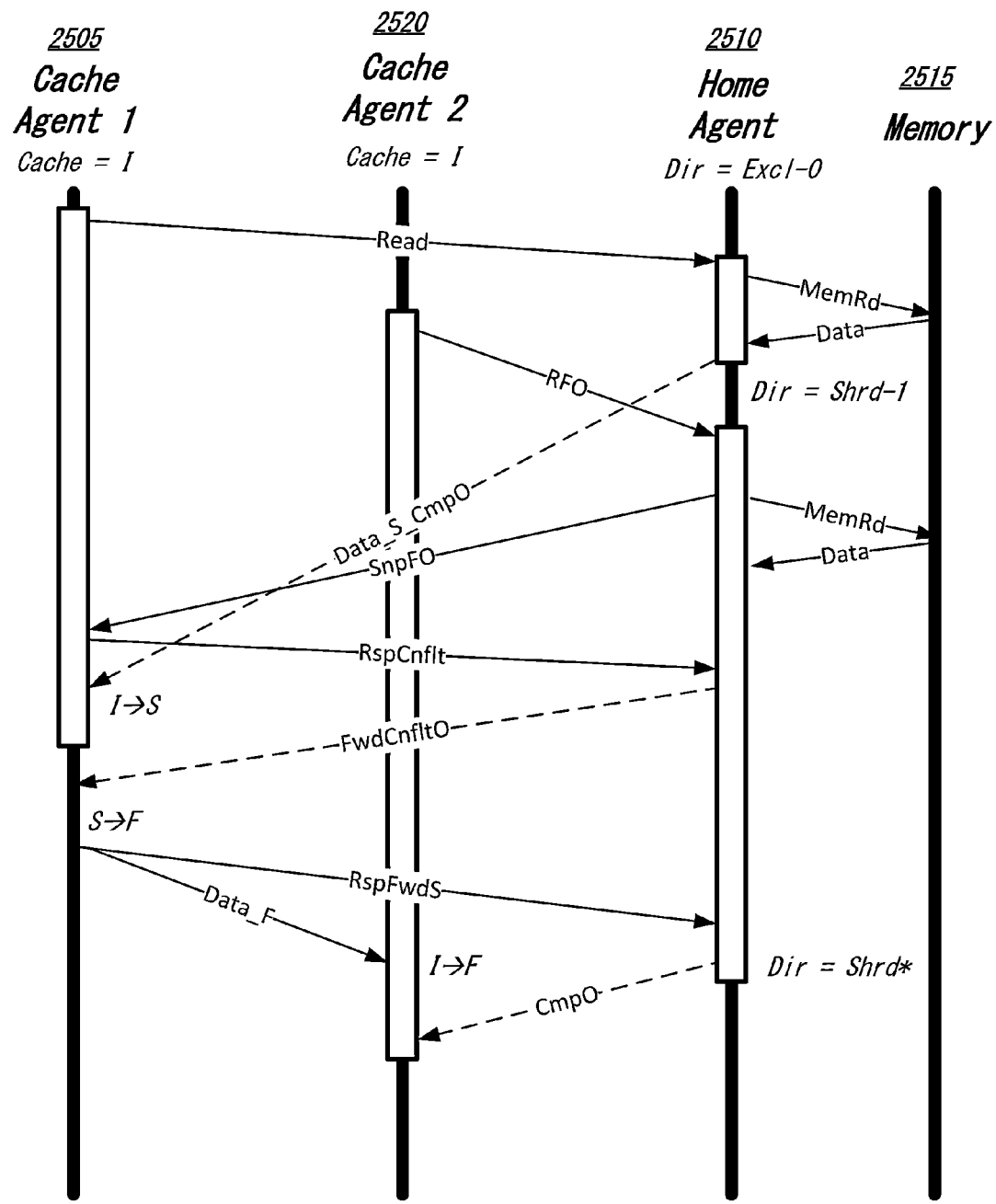
FIG. 25 illustrates a flow diagram of example coherence protocol conflict management.

Turning to FIG. 25, a first example is illustrated of an example conflict management scheme. A first cache (or coherence) agent 2505 can send a read request for a particular line of data to home agent 2510 resulting in a read of memory 2515. Shortly after the read request by cache agent 2505, another cache agent 2520 makes a request for ownership (RFO) of the same line. However, the home agent 2510 has sent the Data_S_CmpO to the first cache agent 2505 prior to receiving the RFO from cache agent 2520. The RFO can result in a snoop (SnpFO) being sent to the cache agent 2505 (as well as other cache agents), the snoop being received by the first cache agent 2505 prior to receiving the complete Data_S_CmpO. The cache agent 2505, upon receiving the snoop SnpO can identify a potential conflict involving the line of memory requested in its original read request and can notify the home agent 2510 of the conflict by responding to the SnpO with a forward responses conflict message (RspCnflt). The home agent 2510 can respond to the forward response RspCnflt by sending a forward response (FwdCnfltO). The cache agent 2505 can then receive the shared data complete Data_S_CmpO and transition from an I state to S state. The forward response FwdCnfltO can then be received by the cache agent 2505 and cache agent 2505 can determine how to respond to the forward response message FwdClfltO based on the snoop SnpFO that triggered the sending of the forward response RspCnflt. In this example, the cache agent 2505 can consult a protocol state table, for instance, to determine a response to the forward response message FwdClfltO. In the particular example of FIG. 25, the cache agent 2505 can transition to an F-state and send the S-copy of the data it received from the home agent 2510 in the Data_S_CmpO message to the second cache agent 2520 in a Data_F message. The first cache agent 2505 can also send a response message RspFwdS to the home agent 2510 notifying the home agent 2510 that the first cache agent has shared its copy of the data with the second cache agent.

Figure 26:
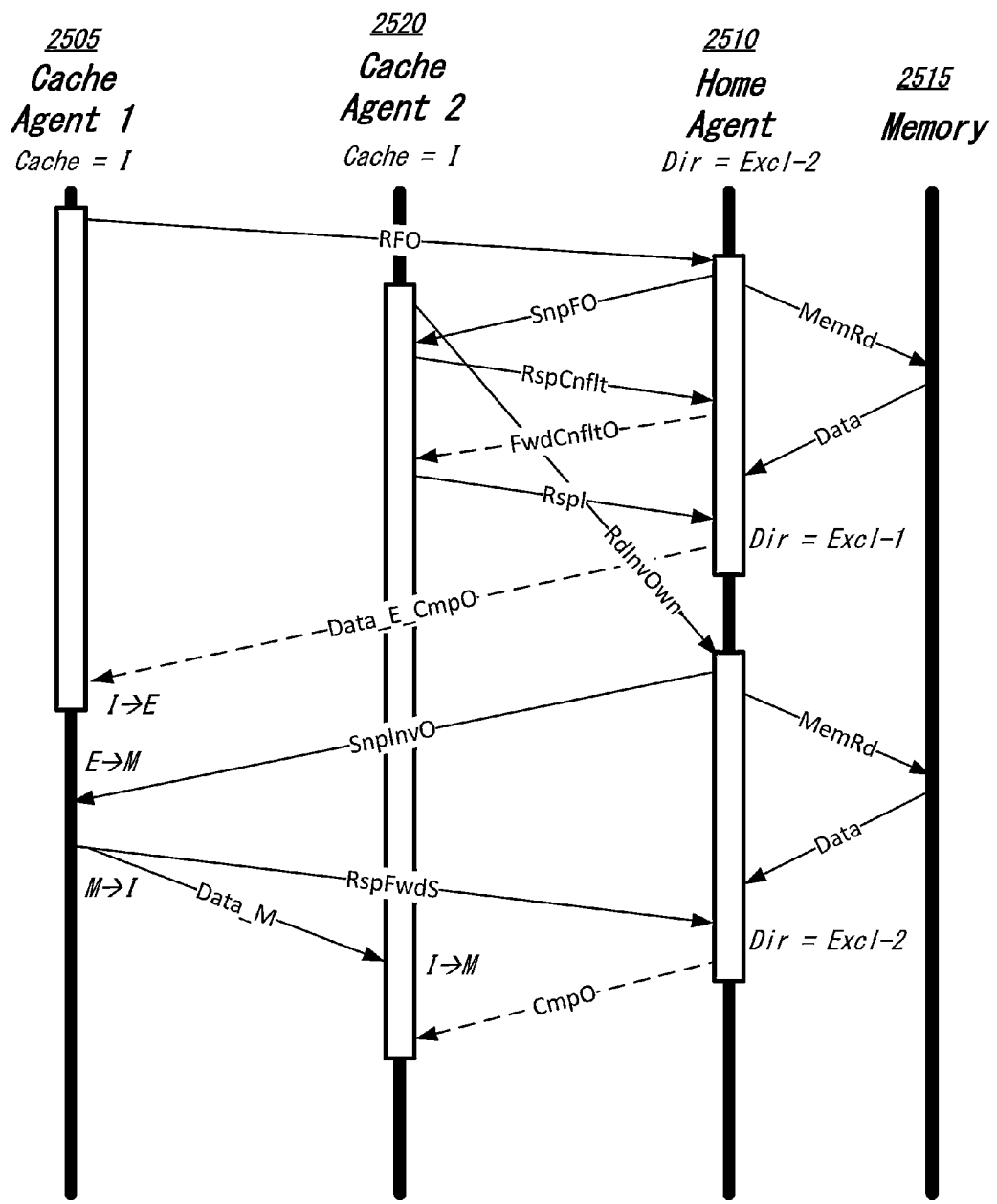
FIG. 26 illustrates a flow diagram of another example coherence protocol conflict management.

In another illustrative example, shown in the simplified flow diagram of FIG. 26, the first cache agent 2505 can send a request for ownership (RFO) of a particular line of memory to the home agent 2510. Shortly thereafter, a second cache agent can send a RdInvOwn message to the home agent 2510 as a request for the same line of memory in an M state. In connection with the RFO message from the first cache agent 2505, the home agent 2510 can send a snoop (SnpFO) to the second cache agent 2520 which the second cache agent 2520 can identify as a potential conflict involving the line of memory subject to both the RFO and RdInvOwn requests. Accordingly, the second cache agent 2520 can send a forward request RspCnflt to the home agent 2520. The home agent 2520 responds to the second cache agent's 2520 forward request with a forward response. The second cache agent 2520 determines a response to the forward response based on information contained in the original snoop SnpFO. In this example, the second cache agent 2520 responds with a snoop response RspI indicating that the second cache agent 2520 is in an I-state. The home agent 2510 receives the snoop response RspI and determines that it is appropriate to send the data complete exclusive (Data_E_CmpO) to the first cache agent 2505, which causes the first cache agent to transition to an E state. With the complete sent, the home agent 2510 can then begin responding to the second cache agent's RdInvOwn request, beginning with a snoop request SnpInvO of the first cache agent 2505. The first cache agent 2505 can identify that the snoop results in a request by the second cache agent 2520 to obtain an exclusive M-state copy of the line. Consequently, the first cache agent 2505 transitions to the M state to send its copy of the line as an M-state copy (with Data_M message) to the second cache agent 2520. Additionally, the first cache agent 2505 also sends a response message RspFwdI to indicate that the copy of the line has been sent to the second cache agent 2520 and that the first cache agent has transitioned to an I-state (having given up ownership of the copy to the second cache agent 2520).

Figure 27:
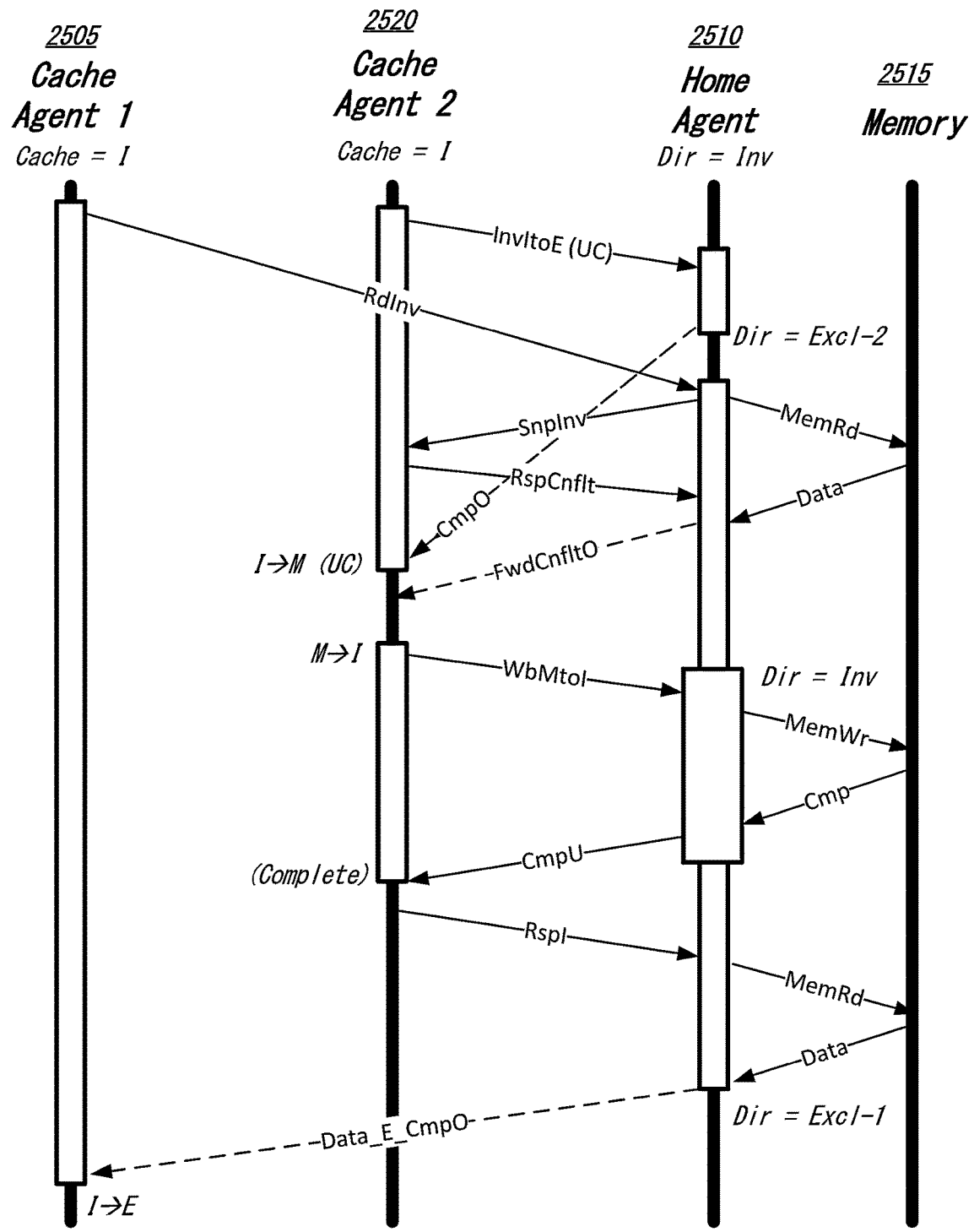
FIG. 27 illustrates a flow diagram of another example coherence protocol conflict management.

Turning next to the example of FIG. 27, another simplified flowchart is shown. In this example, a cache agent 2520 attempts to request exclusive ownership of an uncacheable (UC) line without receiving data (e.g., through a InvItoE message). A first cache agent 2505 send a competing message (RdInv) for the cache line in E state. The HPI Coherence protocol can specify that if the requested line was previously cached in M state, the line will be written to memory before E data is delivered in response to the RdInv of the first cache agent 2505. The home agent 2510 can send a complete (CmpO) to the InvItoE request and send a snoop (SnpInv) to cache agent 2520 based on the RdInv request. If the cache agent 2520 receives the snoop before the complete, the cache agent 2520 can identify that the snoop pertains to the same cache line as its exclusive ownership request and indicate a conflict through a forward requests RspCnflt. As in previous examples, the home agent 2510 can be configured to respond to the forward request with a forward response (FwdCnfltO). Multiple permissible responses may be allowed to the forward response. For instance, the cache agent 2520 can initiate an explicit writeback (e.g., WbMtoI) and block the snoop (or forward) until the explicit writeback is completed (e.g., CmpU), as shown in the example of FIG. 27. The cache agent can then complete the snoop response (RspI). The home agent 2510 can then process the RdInv request of the first cache agent 2505 and return a complete Data_E_CmpO, among other examples.

In examples, such as the example of FIG. 27, where a cache agent receives a snoop when the agent has an outstanding read or invalidation request to the same address and it has cached a partial modified line (often referred to as a "buried-M"), the HPI Coherence protocol, in one implementation, allows the agent to either 1) perform an explicit writeback (partial) of the line while blocking the snoop or 2) send a forward request (RspCnflt) to the home agent. If (1) is chosen, the agent processes the snoop after receiving the complete for the writeback. If (2) is chosen, it is possible that the agent will receive forward response (FwdCnfltO) while its outstanding read or invalidation request is still waiting for responses and the agent still has a partial modified line. If that is the case, the protocol allows the agent to block the forward while performing an explicit writeback (partial) of the line. During the writeback, the protocol guarantees the agent will not receive responses for the outstanding read or invalidation request. The mechanism described above (allowing coherence agents to issue explicit writebacks and block snoops and forwards, even when the agent has an outstanding read or invalidation request) is also used to ensure partial or UC writes are posted to memory before the writer acquires global observability.

Coherence agents use a two-step process for partial/UC writes. First, they check if they have ownership of the cacheline and issue an ownership (invalidation) request in the protocol if they do not. Second, they perform the write. In the first step, if they performed an ownership request, it is possible that the request will conflict with other agents' requests for the line, meaning the agent might receive a snoop while the ownership request is outstanding. Per coherence protocol requirements, the agent will issue a forward request for the conflicting snoop. While waiting for the forward response, the agent may receive the ownership request's completion, which grants ownership of the line to the agent and allows the agent to initiate the writeback for the partial/UC write. While this is occurring, the agent might receive the forward response, which it is obligated to process also. The coherence agent may not combine the two activities. The coherence agent is to instead writeback the partial/UC write data separately from processing the forward, and perform the writeback first. For instance, a cache agent may use a writeback request to commit UC data before processing forward and writeback partial cache lines, among other examples and features.

Figure 28:
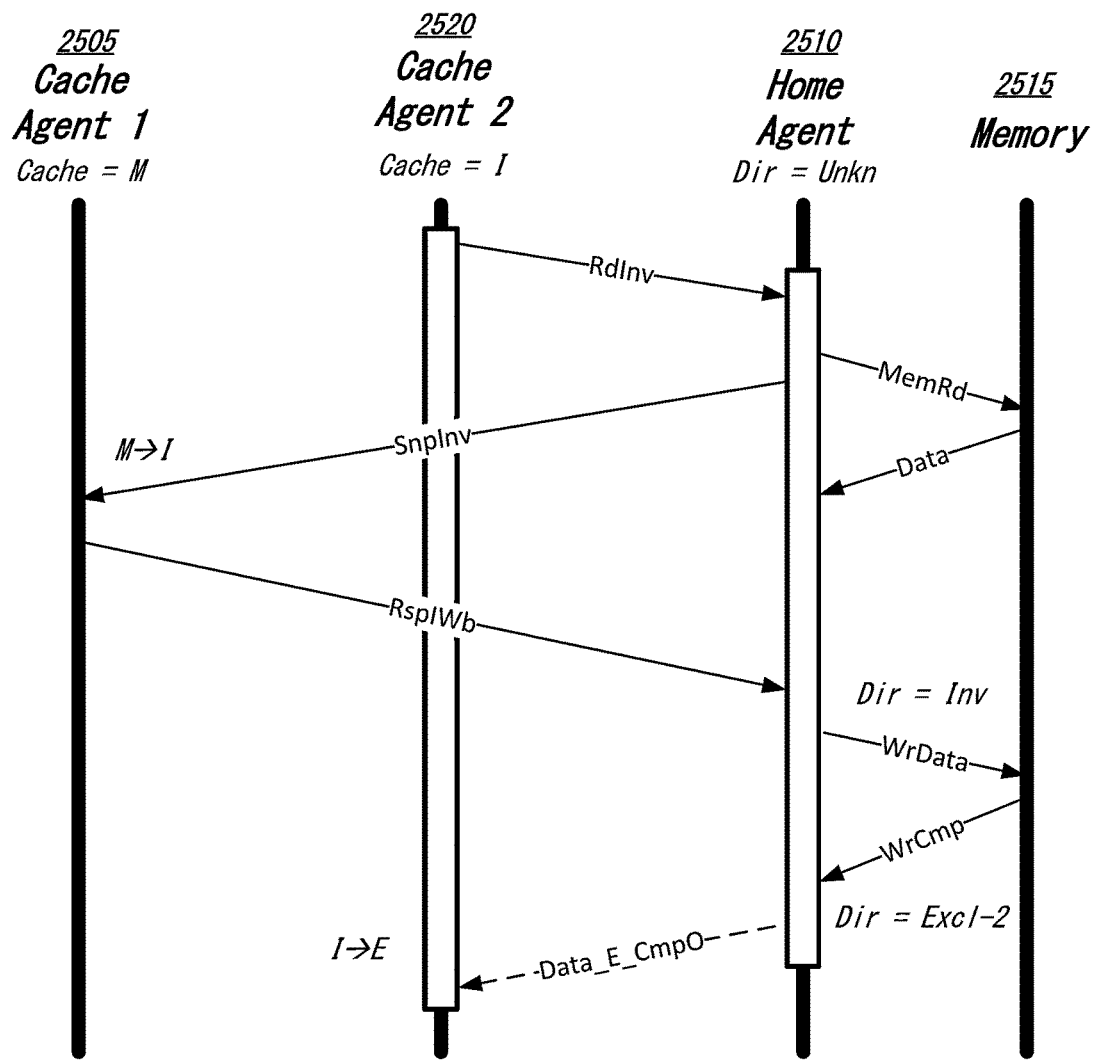
FIG. 28 illustrates a flow diagram of an example snoop response with writeback to memory.

In one embodiment, the HPI Coherence protocol can support a read invalidate (RdInv) request accepting Exclusive-state data. Semantics of uncacheable (UC) reads include flushing modified data to memory. Some architectures, however, allow forwarding M data to invalidating reads, which forced the requesting agent to clean the line if it received M data. The RdInv simplifies the flow and does not allow E data to be forwarded. For instance, as shown in the example of FIG. 28, the directory state of a home agent 2510 can indicate that no agent (e.g., 2505, 2510) has a copy of the line. In such instances, the home agent 2510 may immediately send the data and completion response(s). HPI allows the same if the effective directory state indicates no peer can have a copy of the line.

As shown in the example of FIG. 28, in some implementations an agent can respond to a snoop with a RspIWb message, indicating that the cache agent (e.g., 2505) is in (or has transitioned to) an I-state while requesting a write to memory. A RspIWb can set the effective directory state to Invalid and allows a home agent 2510 to send a response without snooping all peers. In the example of FIG. 28, a second cache agent 2520 send a RdInv request while the home agent directory is in an Unknown state. In response, the home agent 2510 initially snoops only first cache agent 2505. In this example, cache agent 2505 has a modified copy of the line and responds with an implicit writeback (e.g., RspIWb). When Home receives the RspIWb message, it can determined that no other agent could have had a copy of the line and identified further that cache agent 2505 has invalidated its cache through the RspIWb. In response, the home agent 2510 can set the directory state to Invalid. Because the directory state is Invalid, the home agent 2510 waits until the write to memory 2515 completes and then sends the data and completion response(s) (e.g., Data_E_CmpO) and releases the resource it allocated for the request from cache agent 2520. In this example, the home agent may skip the snooping of other cache agents in the system. Indeed, in such examples, a home agent (e.g., 2510) can send data and a completion response prior to receiving all snoop responses (e.g., due to the identification of an M-copy at agent 2505), as illustrated in the example illustrated in FIG. 29 (with cache agent 2905).

Figure 29:
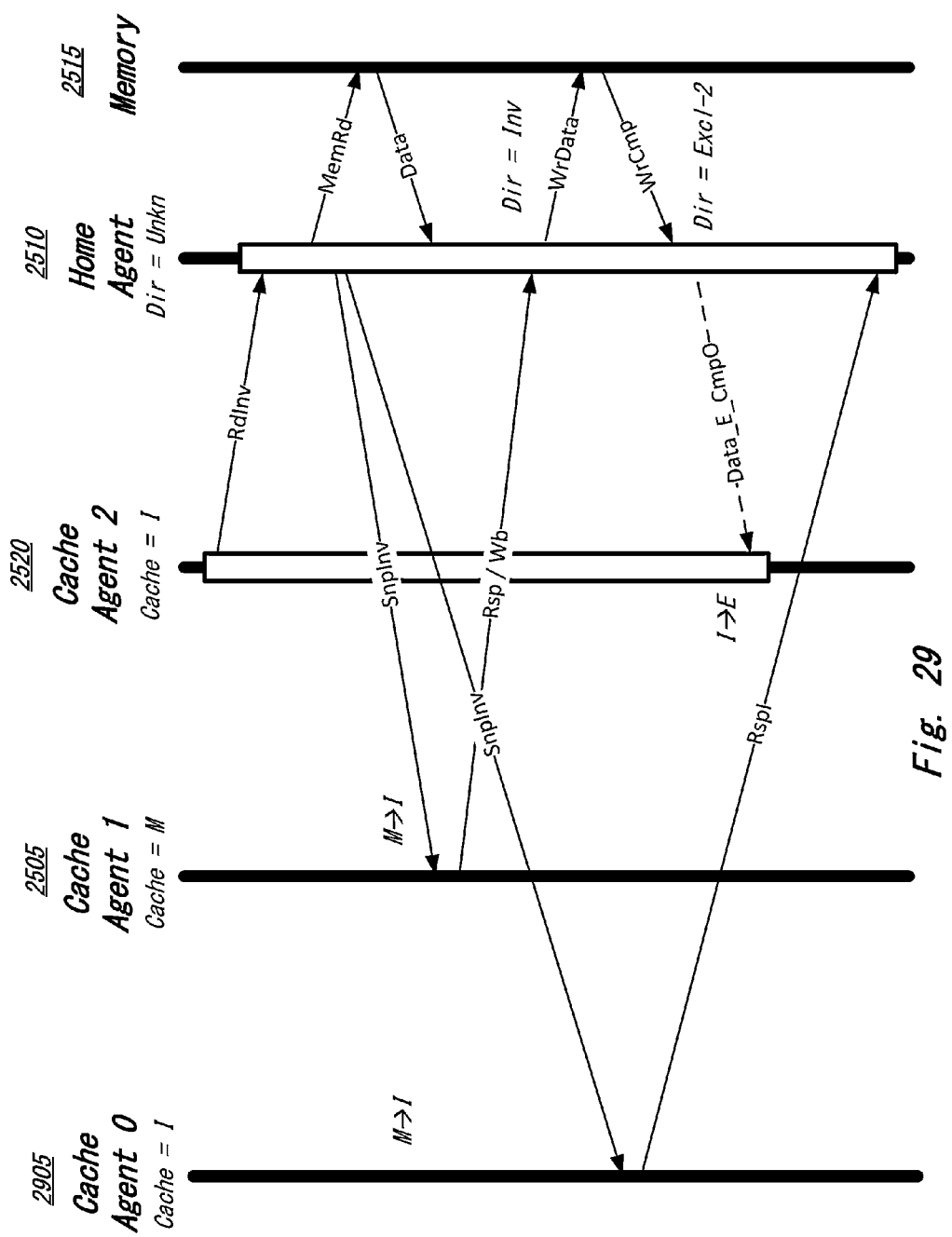
FIG. 29 illustrates a flow diagram of another example of a snoop response with writeback to memory.

In the examples of FIGS. 28 and 29, when the second cache agent 2520 receives the Data_E_CmpO response from the home agent 2510, the cache agent 2520 can load the data into its cache, set its cache state to E, and release the resource RTID it allocated for the request. After releasing the RTID, cache agent 2520 may reuse it for a new request. In the meantime, the home agent 2510 can wait for snoop responses for snoops to the request originally using the RTID. Snoop messages can contain the request's RTID and requesting agent's NID. Thus, because cache agent 2520 could reuse the RTID for a new request to the same or a different home agent, and that home agent could generate snoops for the new request while snoops for the original request are outstanding, it is possible that the same "unique" transaction ID will exist in snoops to the same coherence agents. From a coherency perspective this duplication of transaction ID (TID) can nonetheless be acceptable because snoops for the original request will only find I states.

A home agent may generate a snoop when the request's Tracker state is Wait, Busy or DataXfrd, meaning either the home agent has not yet sent a data response or a snoop response indicated some peer forwarded the data to the requesting agent. A home agent may also check the request's Snoop field to ensure it has not yet sent a snoop to a Peer. When sending a snoop, a home agent may add Peer (or all fanout Peers) to Snoop (to prevent sending a second snoop) and track outstanding snoop responses.

As noted above, some implementations of HPI can support fanout snoops. Additionally, in some examples, HPI can support an explicit fanout snoop operation, SnpF, for fanout snoops generated by the Routing layer. An HPI home agent (e.g., 2510) can utilize SnpF to generate a single fanout snoop request (e.g., with a single command and message) and, in response, the Routing layer can generate snoops to all peer agents in the respective fanout cone based on the SnpF request. The home agent may accordingly expect snoop responses from each of the agent sections. While other snoop messages may include a destination node ID, fanout snoops may omit a destination NID because the Routing layer is responsible for generating the appropriate snoop messages to all peers in the fanout region.

As the Routing layer is immediately below the Protocol layer, in some implementations, communication fabric requirements are upon the Routing Layer. In one embodiment, the HPI Coherence protocol can have has one communication fabric requirement that is specific to the Routing layer. For instance, the Coherence protocol can depend upon the Routing layer to convert a fanout snoop (SnpF* opcodes—Snoop (SNP) Channel Messages) into the appropriate snoops for all of the request's peers in the fanout set of cache agents. The fanout set is a configuration parameter of the Routing layer that is shared by the Protocol layer, or a home agent configuration parameter.

In some implementations, a home agent may send a fanout snoop for an active standard request. The HPI Routing layer can convert the fanout snoop request of the home agent into regular snoops to each of the peers in the fanout cone defined by the Routing layer. The HPI Coherence protocol home agent is made aware of which coherence agents are covered by the Routing layer fanout via a HAFanoutAgent configuration parameter identifying the respective cache agents that are included in the fanout cone by address. The Routing layer can receive the fanout snoop SnpF and convert it into a snoops of every cache agent included in the fanout cone (excepting the requesting agent). In one implementation, the Routing layer can convert the fanout snoop into corresponding non-fanout snoops (with appropriate non-fanout opcodes, such as those in Table 3), among other examples.

Similar to regular snoops, a home agent may be limited to sending a fanout snoop only before it sends a completion response to a coherence protocol request by a cache agent. Further, additional conditions can be placed on the fanout snoops. As examples, a home agent may send a fanout snoop if it has not individually snooped any of the peers in the fanout cone. In other words, a home agent may not initiate a fanout snoop, in some implementations, if the fanout cone is empty or if the requesting cache agent is the only agent in the fanout cone, among other examples In one embodiment, HPI can support an explicit writeback with cache-push hint (WbPushMtoI). Generally, in some examples, modified data can be transferred by either explicitly writing the data back to memory or transferring the modified data in response to a snoop request. Transferring modified data in connection with a snoop response can be considered a "pull" transfer. In some implementations, a "push" mechanism can also be supported, whereby a cache agent with the modified data sends the modified data directly to another caching agent for storage in the target agent's cache (along with the Modified cache state).

Figure 30:
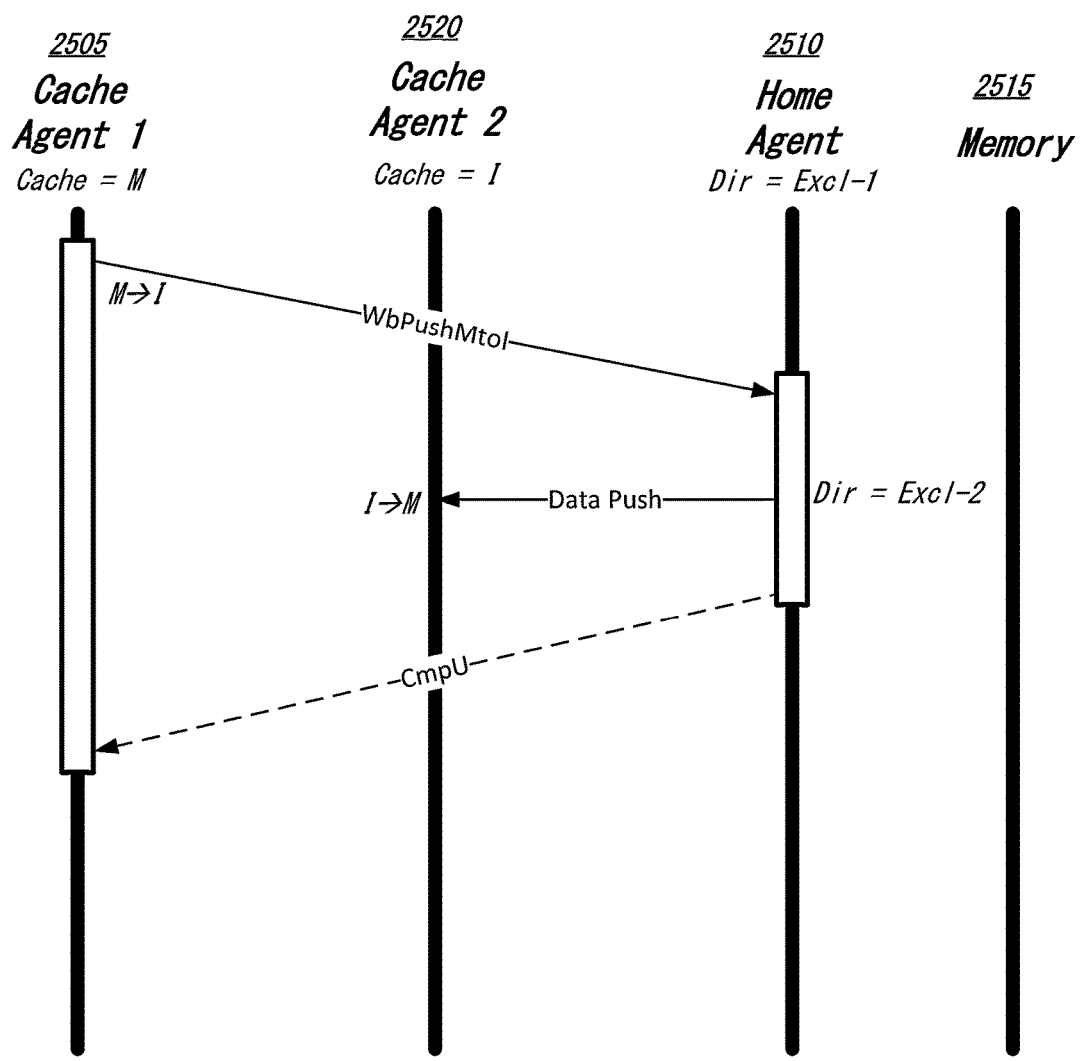
FIG. 30 illustrates a flow diagram of an example writeback push operation.
Figure 31:
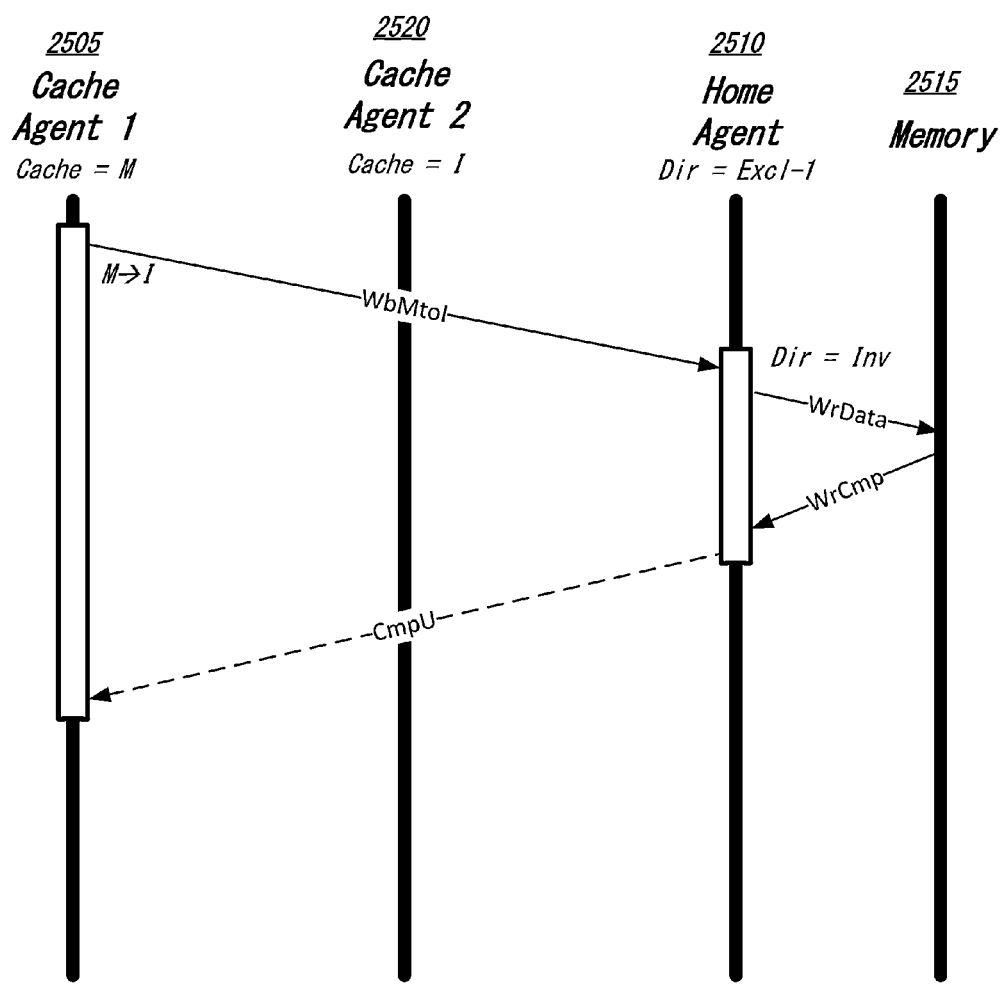
FIG. 31 illustrates a flow diagram of an example writeback to memory.

In one embodiment, a cache agent can write back modified data with a hint to the home agent that it may push the modified data to a "local" cache, storing the data in M state in the local cache, without writing the data to memory. In one implementation, a home agent 2510 can receive a WbPushMtoI message from a cache agent 2505 and identify the hint that another cache agent (e.g., 2520) is likely to utilize or desire ownership of a particular line in the near future, as shown in the example of FIG. 30. The home agent 2510 can process the WbPushMtoI message and effectively accept the hint and push the written-back data to the other cache agent 2520 without writing the data to memory 2515, thereby causing the other cache agent 2520 to transition to an M state. In some implementations, the home agent 2510 can alternatively process the WbPushMtoI message and opt to write the data back to memory, as in a WbMtoI request (such as illustrated in FIG. 31) and not push the written-back data directly to the other cache agent 2520.

In one example implementation, a home agent (e.g., 2510) can process a WbPushMtoI message by checking that the tracker state is WbBuffered, which can indicate that the home agent has not yet processed the data. In some instances, a "push" of the data can be conditioned on the home agent determining that the home agent is not already processing a standard request to the same address. In some implementations, the push can be further conditioned on the home agent determining that the targeted cache agent (e.g., 2520, in the example of FIG. 30) is "local." If the targeted cache agent is not covered by the home agent directory, then the home agent may transfer the data to the target cache agent's cache and update the directory to Invalid. If the targeted cache agent is covered by the directory, then the data transfer to the cache agent's cache may only be allowed only if the targeted cache agent does not have an active InvXtoI, and when transferred the home agent can update the directory to Exclusive with the target cache agent as the owner. Other conditions can be defined (e.g., in a corresponding protocol state table) for a home agent in determining whether to accept the hint of the WbPushMtoI message and push data to a targeted cache agent, or instead process the WbPushMtoI message as a WbMtoI request by first writing the data to memory, among other potential examples.

In some implementations, HPI Can support an InvItoM message to pre-allocate to a directory cache of a home agent, such as an I/O directory cache (IODC). An InvItoM can request exclusive ownership of a cache line without receiving data while indicating an the intent of performing a writeback soon afterward. A required cache state may be an M state, and E state, or either. A home agent can process an InvItoM message to pre-allocate a resource for the writeback hinted at through the InvItoM message (including the InvItoM opcode).

Figure 32:
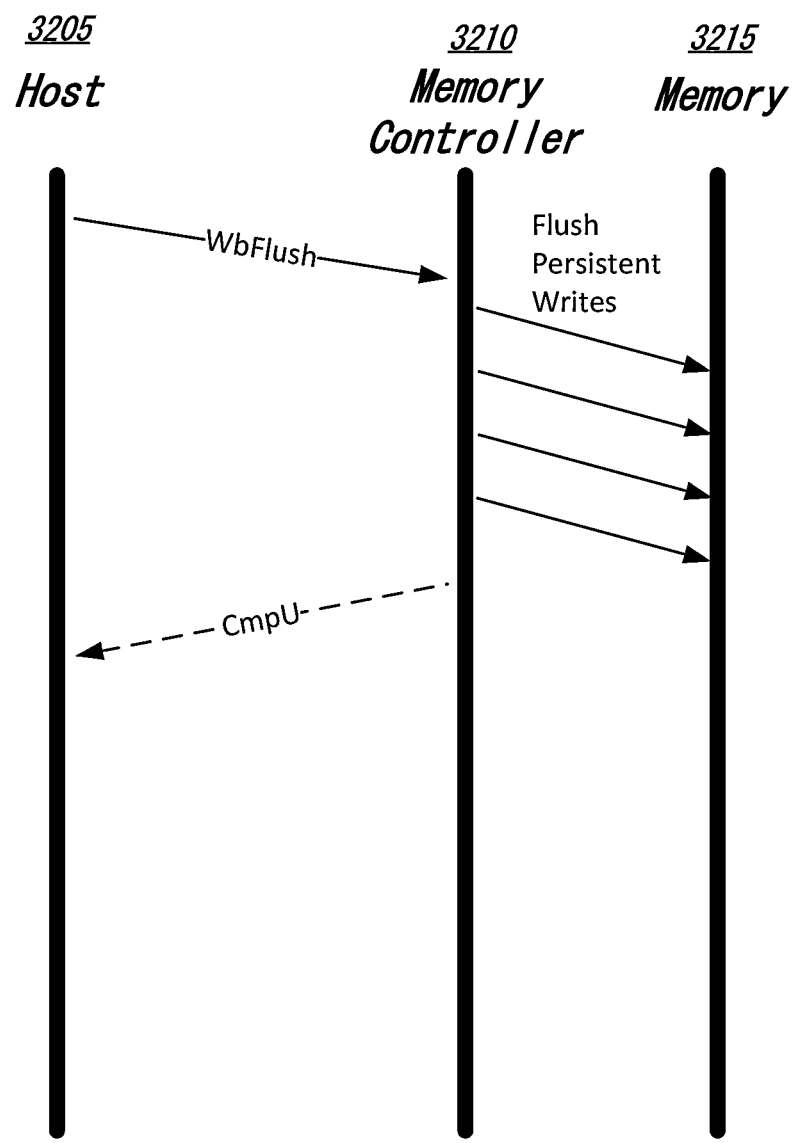
FIG. 32 illustrates a flow diagram of an example memory controller flush operation.

In some implementations, an opcode can be provided through HPI Coherence protocol to trigger a memory flush of a memory controller with which one or more home agents interact. For instance, an opcode, WbFlush, can be defined for persistent memory flush. As shown in the example of FIG. 32, a host (e.g., 3205) can send a WbFlush message directed to a particular memory controller 3210. In some instances, the WbFlush can indicate a particular address and the WbFlush command can be sent to the specific memory controller targeted by the address. In another example, a WbFlush message can be broadcast to multiple memory controllers. In one example, the t may be sent as a result of a persistent commit in a CPU. Each respective memory controller (e.g., 3210) receiving a WbFlush command can process the message to all pending writes at the memory controller to a persistent memory device (or memory location) managed by the memory controller. The purpose of the command can be to commit all previous writes to persistent memory. For example, a WbFlush command can be triggered in connection with a power failure management controller or process, so as to ensure that pending writes are flushed to non-volatile memory and preserved in the event of a power failure of the system. Further, as shown in the example of FIG. 32, upon flushing (or initiating the flushing of) all pending writes to memory (e.g., 3215), the memory controller 3210 can respond to the requesting host (or agent) (e.g., 3205) with a completion indicating the flush. The completion should not be sent to the host until the memory controller has assured that the data will make it to persistent memory. The WbFlush message or corresponding completion can serve as a check point for other processes and controllers dependent on or driving the flushing of pending writes to memory, among other uses and examples.

Some traditional architectures can require for Data_M and corresponding completes to be sent separately. HPI may be extended to have coherence agents support accepting a combined Data_M_CmpO. Further, home agents can be configured to generate a combined Data_M_CmpO message via buffering implicit writeback data. Indeed, in some implementations, an agent can be provided with logic that combines cache and home agent behaviors, such that when the agent receives a request and find M data in its cache, it can directly generate the Data_M_CmpO. In such instances, the Data_M_CmpO response can be generated without generating a RspIWb or buffering writeback data, among other examples.

In another example, as shown in the example protocol state table 3300 illustrated in FIG. 33, a state machine (embodied by a machine readable state table (e.g., 3300)) can define a variety of potential response messages a home agent may send when the standard request's tracker entry is identified as in Busy or WbBuffered state. As shown in table 3300, in one example, a home agent may not be allowed to send a CmpO completion message to a read Rd* request from either state, effectively meaning a home agent is to send a data response before or with a completion response. In cases where a Data_X response may be sent in the home agent response message, the home agent may combine the data response with a completion and send it instead.

The state of the data response can be fixed for invalidating requests and RdCur. For RdMigr and RdData, non-shared directory states can allow E data to be sent. For RdMigr, RdData, and RdCode, a Shared directory state can involve checking if all peers that might have F state were snooped. If they were, then the data can be sent with F state; otherwise, the data can be sent in S state in case an unsnooped peer has an F copy, among other potential examples. Further, a home agent may send a Data_M or Data_M_CmpO response, in some implementations, only if it buffered the data from a RspIWb snoop response. When a home agent buffers RspIWb data, it can store the data in the tracker entry and change the entry's state to WbBuffered. Note that if a home agent buffers the RspIWb data instead of writing it to memory, it sends a Data_M or Data_M_CmpO response in this example.

In one embodiment, as noted above, HPI Coherence protocol can support an F state that allows a cache agent to keep F state when forwarding shared data. In some systems, or instances, the F (forward) cache state can be itself forwardable. When a cache holds a line in F state and receives a snoop which allows transferring shared data, the cache may forward the data, and when it does it can send the F state with the data and transition its cache state to S (or I). In some circumstances, it is desirable for the cache to instead keep the F state when forwarding data, in which case it will send S state with the forwarded data.

In one example, the ability of a cache agent to keep or pass an F state on a shared transfer can be controllable. In one example, a configuration parameter, per coherence agent, can indicate whether a coherence agent will transfer or hold onto a F state. Regardless of the parameter setting, the coherence agent can use the same snoop response (e.g., RspFwdS). In the additional case of an agent having the line in E state when the snoop arrives, the cache agent can transition its cache state to F when forwarding the S data and sending the RspFwdS response (when the parameter is set to hold F state). In the additional case of an agent having the line in M (full) state when the snoop arrives, the cache agent can downgrade its cache state to F when forwarding the S data, writing back the data to memory, and sending the RspFwdSWb response (when the parameter is set to hold F state). Further, a coherence agent with F state that receives a "sharing" snoop or forward after such a snoop may keep the F state while sending S state to the requesting agent. In other instances, the configuration parameter can be toggled to allow the F state to be transferred in a transfer of shared data and transition to an S (or I) state, among other examples. Indeed, as shown in the example state table 3400 of FIG. 34, a cache agent in F state can respond in a variety of ways, including a SnpMigr/FwdMigr, F, F, RspFwdS, Data_S, among other examples.

As noted above, in some implementations, state transitions of a cache line and agents can be managed using a state machine. In one implementation, the state machine can be further embodied by a set or library of state tables that have been defined to detail all of the various combinations of commands, attributes, previous states, and other conditions that can influence how state transitions are to take place, as well as the types of messages, data operations, masks, and so on, that can be associated with the state transition (such as illustrated in the particular examples of FIGS. 33 and 34). Each state table can correspond to a particular action or category of actions or states. The set of tables can include multiple tables, each table corresponding to a particular action or sub-action. The set of tables can embody a formal specification of a protocol, such as the Coherence Protocol or another protocol (at any of the stack layers) of HPI.

State tables can be human-readable files, such as table structures that can be readily interpreted and modified and developed by a human user interacting with the state table structure using an endpoint computer device. Other users can utilize the state table to readily interpret state transitions within the Coherence Protocol (or any other protocol of HPI). Further, state tables can be machine-readable and parsable structures that can be read and interpreted by a computer to identify how states are to transition according to a particular protocol specification.

FIG. 35 illustrates a simplified representation of a generalized state table for an action "Action A". A protocol state table 3500, in one example, can include columns (e.g., 3505) pertaining to current states (or the states from which a transition is to be made) and other columns (e.g., 3510) pertaining to next states (or the states that are to be transitioned to). Columns in the current state columns can correspond to various characteristics of the state, such as commands received in a response message, snoop message, or other message, a cache line state, outgoing request buffer (ORB) condition, credits or resources to apply/reserve, whether the cache line is partially modified, a forwarding condition, and so on. Each row in the table 3500 can correspond to a detected set of conditions for a cache line in a particular state. Further, the cells in the row within the next state columns (e.g., 3510) can indicate the next state and conditions of the next state that is to be entered into based on the current state conditions specified in the row cells in the current state columns (e.g., 3505). The next state columns (e.g., 3510) can correspond to conditions in the next state such as the messages that are to be sent (e.g., to a corresponding home node (HNID), requesting node (RNID), peer node, etc.), the next cache line state, forward state, and so on.

In one embodiment, protocol state tables can use row spanning to indicate that multiple behaviors or states (rows) are equally permissible for a certain set of current state conditions. For instance, in the example of FIG. 35, when the Command is Cmd1, a first condition is false, the cache line is in a second state, and a second condition is also false (as indicated by rows 3515), multiple potential next state conditions are possible and may be equally permissible, each indicated by a respective row. In other word, any one of such equally permissible transitions can be triggered based on the corresponding current state conditions. In some implementations, additional agent logic can select which of the multiple next state to select, among other example implementations. In one illustrative example, a current state section of a state table corresponding to home agent send request responses can include multiple conditions (or input and state guards) including all valid behaviors for a coherence agent to perform when the agent holds a full M-line in its cache and is processing a SnpMigr to the same cacheline. The table rows may correspond to five different, and equally permissible, next state behaviors the coherence agent can take in response to the current state conditions, among other examples.

In other systems, a bias bit may be included in protocol state tables where multiple potential next states or conditions are possible for a particular current state, In QPI, for instance, a "bias" bit is included in tables as a mechanism to select among behaviors. Such bias bits may be primarily used during validation of a protocol's state machine, but such bias bits introduce additional complexity and, in some cases, confusion unfamiliar with the utility of the bias bit. In some respects, a bias bit may be nothing more than an artifact of a validation exercise. In one example of HPI, through protocol tables using rows that potentially span multiple rows, bias bits and other features can be excluded. In such instances, HPI protocol tables can emphasize explicit non-determinism.

Turning to the example of FIG. 36, in one embodiment, protocol tables may be nested by having one table refer to another sub-table in the "next state" columns, and the nested table can have additional or finer-grained guards to specify which rows (behaviors) are permitted. As shown in FIG. 36, an example protocol state table 3500 can include an embedded reference 3605 to another table 3600 included in the set of tables embodying a protocol specification, such as a state table pertaining to a sub-action related to the action or behavior included in the next state designated for certain rows of table 3500. Multiple tables (e.g., 3500, 3610) can reference a nested table (e.g., 3600). As an example, an agent processing incoming responses to protocol responses may follow an action table (e.g., 3500, 3610) and a subaction table 3600. Here, action table 3500 can include a next state with a subaction table nested under one or more other protocol tables. This type of nesting can apply beyond coherence protocol and protocol layer state tables, but can also be applied to any known or future protocol response/tables.

In one example, an agent can make use of protocol tables (or another parsable structure constructed from the protocol tables) and can identify a particular state table corresponding to a particular action or event. Further, the agent can identify the row that applies to the cache line handled or targeted by the agent and identify, from the table, the next state information for the cache line. This determination can include the identification of a reference to a nested table of a sub-action. Accordingly, the agent can identify the corresponding structure of the linked-to nested table and further reference the nested table to determine the state transition.

In one particular example, a collective set of protocol tables can be defined and represent all of the possible, defined state transitions in a protocol. Further, each table can specify a set of transitions covering a set of related behaviors within the protocol (e.g. one table covers all the behaviors involved in snooping and updating cache state, one covers all behaviors generating new requests, etc.). When an agent is to perform a behavior, process an event, or check if some other action should be taken the agent can identify the particular state table covering that particular behavior within the set of state tables. The agent can then identify the current state of the system and reference the selected state table to identify the row or group of rows matching the current state, if any. If no rows match, the agent may, in some instances, refrain from taking any action for the given current state and wait for some other event/behavior to change the state before trying again. Further, in some instances, as introduced above, if more than one row matches the identified system state, the agent can selects any of them to perform, as all can be regarded as equally permissible. Further, in the case of nesting, if a row refers to a nested table, the agent can access the nested table and use the identified current state of the system to search for allowed rows in the nested table.

In some examples, upon traversing any primary and nested tables to determine a response to a particular identified system (or protocol) state, the agent can cause the corresponding actions to be performed and the state of the system to be updated in accordance with the "next states" designated in the corresponding state tables.

In some instances, it can be possible that more than one state table relates to or covers a set of behaviors. For instance, as an illustrative example, two tables may be provided for processing snoops, the first for the case when there was a conflicting active request, the second table was for when there was not. Accordingly, in some implementations, an agent may survey multiple tables to determine which table includes rows relevant to the particular conditions and states identified by the agent. Further, in some cases, an agent may handle two unrelated or distinct events occurring simultaneously, such as an example where a home agent receives a snoop response and a new request at the same time. In instances where multiple events are being processes, an agent can identify and use multiple corresponding tables simultaneously to determine how to process the events.

Figure 37:
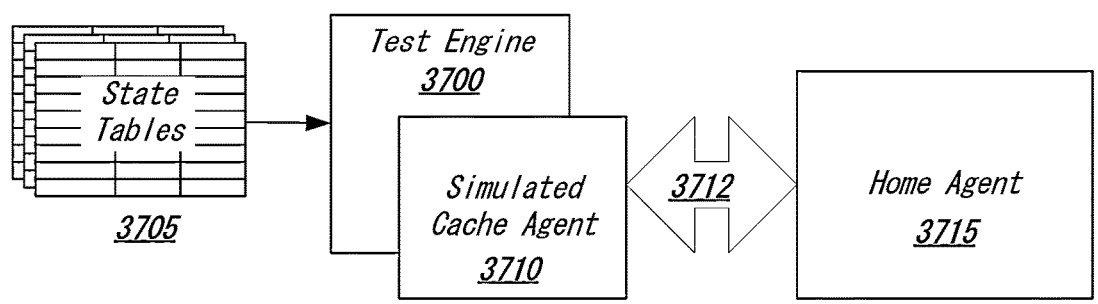
FIG. 37 illustrates a representation of use of a set of protocol state tables by an example testing engine.
Figure 38:
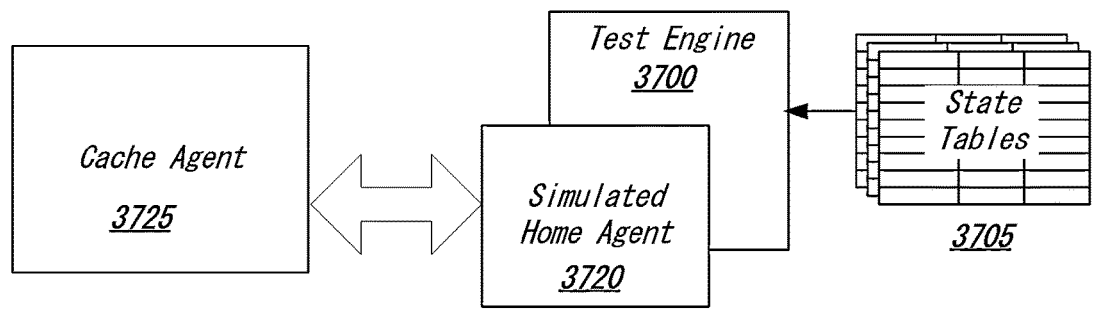
FIG. 38 illustrates a representation of use of a set of protocol state tables by an example testing engine

Turning now to FIGS. 37 and 38, simplified block diagrams 3700, 3800 are shown of examples of a testing or validation environment for use in validating at least a portion of a protocol. For instance, in the example of FIG. 37, a test engine 3700 is provided adapted to validate a state machine of a protocol. For instance, in one example, test engine 3700 can include or be based upon principles of a Murphi tool or another enumerative (explicit state) model checker, among other examples. For instance, other specification languages can be utilized in lieu of the Murphi examples described, including, as another example, TLA+ or another suitable language or format. In traditional systems, state model checkers have been constructed by human developers who attempt to translate state machines (e.g., from accompanying state tables, etc.) into a set of requirements that are then used to generate a checker capable of checking the state machine. This is not only a typically labor- and resource-intensive process, but also introduces human error as the states and state transitions of a state table are transcribed and interpreted by human users.

In one implementation, a test engine 3700 can utilize a set of state tables (e.g., 3705) to automatically generate, from the set of state tables, resources to model behaviors of agents in a test environment. For instance, in the example of FIG. 37, a test engine 3700 can utilize the state tables 3705 as a functionality engine for modeling a cache agent or other agent (e.g., 3710) that can be used to validate various state transitions by simulating requests and responses (e.g., 3712) with other real or simulated agents, including a home agent 3715. Similarly, as shown in the example of FIG. 38, test engine 3700 can utilize state tables 3705 to simulate requests and responses (e.g., 3718) of a home agent (e.g., 3720) and interface with other real or simulated agents (e.g., 3725) to further validate and enumerate states of the protocol. As an example, test engine 3700 can model an agent and receive real or modeled protocol messages, such as HPI Coherence protocol messages, and reference state tables 3705 (or another parsable structure generated from the state tables 3705) to automatically generate an appropriate response, perform corresponding state transitions, and so on, based on the state tables 3705.

In one particular implementation, a test engine or other software- or hardware-based utility can be used to utilize state tables (e.g., 3705) to generate code to drive and react to designs that employ a particular protocol, such as HPI Coherence protocol. In this particular example, state tables can be utilized as an input of the test engine by converting tables or included pseudocode along with Murphi mappings for table values and pseudocode elements into appropriate Murphi rule and procedure format. The test engine can be used to further generate Murphi code for type definitions and supporting functionality. The Murphi rule, procedure, type and support code can be used to generate a Murphi model. The Murphi model can be translated, for instance, using a converter, to a C++ or other class definition. Indeed, any suitable programming language can be utilized. Sub-classes of the model class can be further generated and these modules can be used to behave as a simulated or testbench version of an agent employing and aligned to the protocol specification embodied in the state tables. Further, an internal API can be generated or otherwise provided that is aligned to message generation and message reception as defined in the protocol state tables. For instance, a message generation API can be tied to link packet types and message reception can be unified under single interface point. In this example, an entire formal protocol specification can be converted into a C++(or other object-oriented programming language) class. Inheritance can be used to intercept messages generated, and instances of the inheriting class can be created as functional testbench agent(s). Generally, formal specification tables can be used as a functionality engine for a validation or testing environment tool rather than having developers separately create their own tools based upon their interpretation of the specification.

HPI can be incorporated in any variety of computing devices and systems, including mainframes, server systems, personal computers, mobile computers (such as tablets, smartphones, personal digital systems, etc.), smart appliances, gaming or entertainment consoles and set top boxes, among other examples. For instance, referring to FIG. 39, an embodiment of a block diagram for a computing system including a multicore processor is depicted. Processor 3900 includes any processor or processing device, such as a microprocessor, an embedded processor, a digital signal processor (DSP), a network processor, a handheld processor, an application processor, a co-processor, a system on a chip (SOC), or other device to execute code. Processor 3900, in one embodiment, includes at least two cores—core 3901 and 3902, which may include asymmetric cores or symmetric cores (the illustrated embodiment). However, processor 3900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Figure 39:
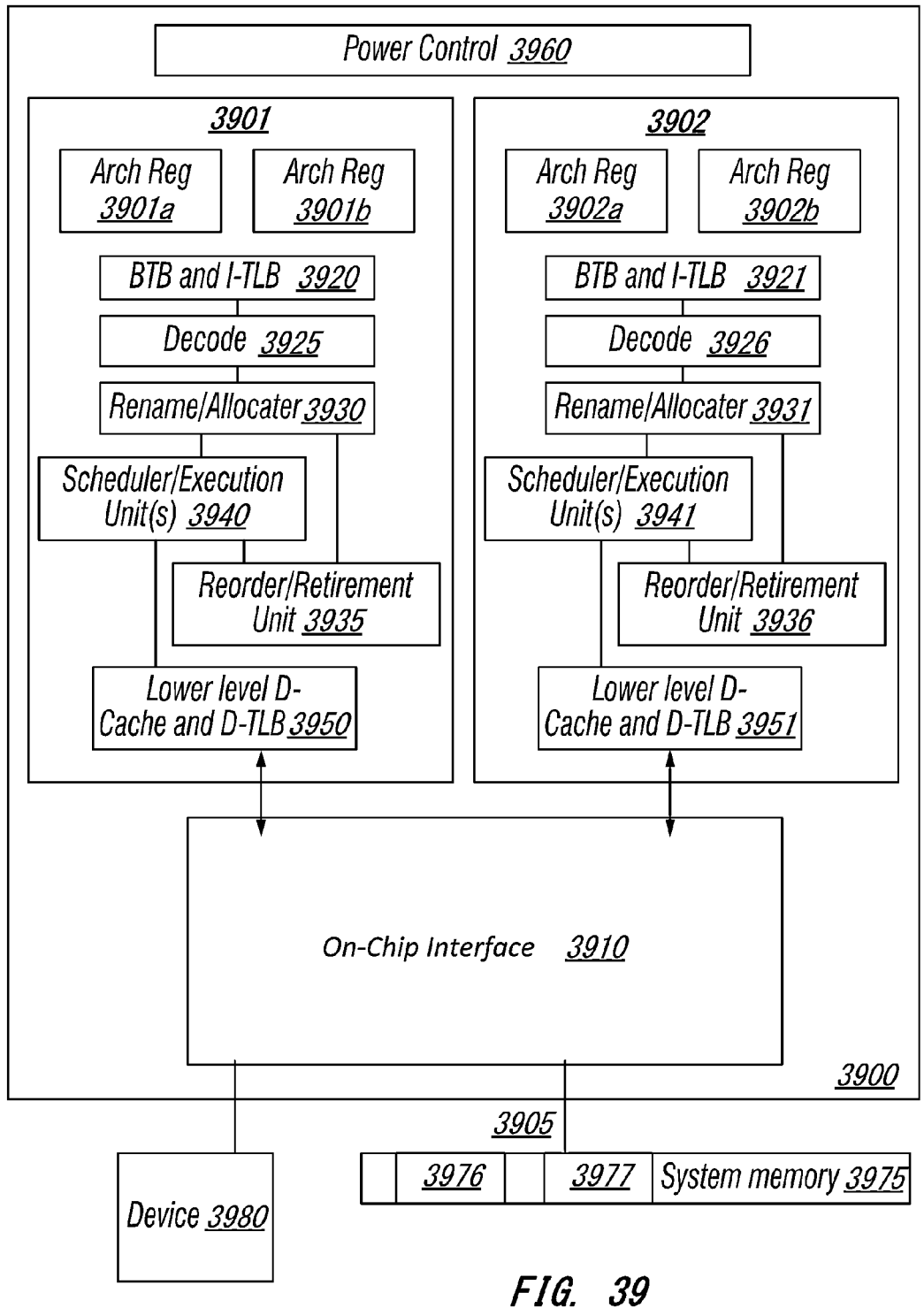
FIG. 39 illustrates an embodiment of a block diagram for a computing system including a multicore processor.

Physical processor 3900, as illustrated in FIG. 39, includes two cores—core 3901 and 3902. Here, core 3901 and 3902 are considered symmetric cores, i.e. cores with the same configurations, functional units, and/or logic. In another embodiment, core 3901 includes an out-of-order processor core, while core 3902 includes an in-order processor core. However, cores 3901 and 3902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 3901 are described in further detail below, as the units in core 3902 operate in a similar manner in the depicted embodiment.

As depicted, core 3901 includes two hardware threads 3901a and 3901b, which may also be referred to as hardware thread slots 3901a and 3901b. Therefore, software entities, such as an operating system, in one embodiment potentially view processor 3900 as four separate processors, i.e., four logical processors or processing elements capable of executing four software threads concurrently. As alluded to above, a first thread is associated with architecture state registers 3901a, a second thread is associated with architecture state registers 3901b, a third thread may be associated with architecture state registers 3902a, and a fourth thread may be associated with architecture state registers 3902b. Here, each of the architecture state registers (3901a, 3901b, 3902a, and 3902b) may be referred to as processing elements, thread slots, or thread units, as described above. As illustrated, architecture state registers 3901a are replicated in architecture state registers 3901b, so individual architecture states/contexts are capable of being stored for logical processor 3901a and logical processor 3901b. In core 3901, other smaller resources, such as instruction pointers and renaming logic in allocator and renamer block 3930 may also be replicated for threads 3901a and 3901b. Some resources, such as re-order buffers in reorder/retirement unit 3935, ILTB 3920, load/store buffers, and queues may be shared through partitioning. Other resources, such as general purpose internal registers, page-table base register(s), low-level data-cache and data-TLB 3915, execution unit(s) 3940, and portions of out-of-order unit 3935 are potentially fully shared.

Processor 3900 often includes other resources, which may be fully shared, shared through partitioning, or dedicated by/to processing elements. In FIG. 39, an embodiment of a purely exemplary processor with illustrative logical units/resources of a processor is illustrated. Note that a processor may include, or omit, any of these functional units, as well as include any other known functional units, logic, or firmware not depicted. As illustrated, core 3901 includes a simplified, representative out-of-order (OOO) processor core. But an in-order processor may be utilized in different embodiments. The OOO core includes a branch target buffer 3920 to predict branches to be executed/taken and an instruction-translation buffer (I-TLB) 3920 to store address translation entries for instructions.

Core 3901 further includes decode module 3925 coupled to fetch unit 3920 to decode fetched elements. Fetch logic, in one embodiment, includes individual sequencers associated with thread slots 3901a, 3901b, respectively. Usually core 3901 is associated with a first ISA, which defines/specifies instructions executable on processor 3900. Often machine code instructions that are part of the first ISA include a portion of the instruction (referred to as an opcode), which references/specifies an instruction or operation to be performed. Decode logic 3925 includes circuitry that recognizes these instructions from their opcodes and passes the decoded instructions on in the pipeline for processing as defined by the first ISA. For example, as discussed in more detail below decoders 3925, in one embodiment, include logic designed or adapted to recognize specific instructions, such as transactional instruction. As a result of the recognition by decoders 3925, the architecture or core 3901 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 3926, in one embodiment, recognize the same ISA (or a subset thereof). Alternatively, in a heterogeneous core environment, decoders 3926 recognize a second ISA (either a subset of the first ISA or a distinct ISA).

In one example, allocator and renamer block 3930 includes an allocator to reserve resources, such as register files to store instruction processing results. However, threads 3901a and 3901b are potentially capable of out-of-order execution, where allocator and renamer block 3930 also reserves other resources, such as reorder buffers to track instruction results. Unit 3930 may also include a register renamer to rename program/instruction reference registers to other registers internal to processor 3900. Reorder/retirement unit 3935 includes components, such as the reorder buffers mentioned above, load buffers, and store buffers, to support out-of-order execution and later in-order retirement of instructions executed out-of-order.

Scheduler and execution unit(s) block 3940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 3950 are coupled to execution unit(s) 3940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 3901 and 3902 share access to higher-level or further-out cache, such as a second level cache associated with on-chip interface 3910. Note that higher-level or further-out refers to cache levels increasing or getting further way from the execution unit(s). In one embodiment, higher-level cache is a last-level data cache—last cache in the memory hierarchy on processor 3900—such as a second or third level data cache. However, higher level cache is not so limited, as it may be associated with or include an instruction cache. A trace cache—a type of instruction cache—instead may be coupled after decoder 3925 to store recently decoded traces. Here, an instruction potentially refers to a macro-instruction (i.e. a general instruction recognized by the decoders), which may decode into a number of micro-instructions (micro-operations).

In the depicted configuration, processor 3900 also includes on-chip interface module 3910. Historically, a memory controller, which is described in more detail below, has been included in a computing system external to processor 3900. In this scenario, on-chip interface 3910 is to communicate with devices external to processor 3900, such as system memory 3975, a chipset (often including a memory controller hub to connect to memory 3975 and an I/O controller hub to connect peripheral devices), a memory controller hub, a northbridge, or other integrated circuit. And in this scenario, bus 3905 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 3975 may be dedicated to processor 3900 or shared with other devices in a system. Common examples of types of memory 3975 include DRAM, SRAM, non-volatile memory (NV memory), and other known storage devices. Note that device 3980 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 3900. For example in one embodiment, a memory controller hub is on the same package and/or die with processor 3900. Here, a portion of the core (an on-core portion) 3910 includes one or more controller(s) for interfacing with other devices such as memory 3975 or a graphics device 3980. The configuration including an interconnect and controllers for interfacing with such devices is often referred to as an on-core (or un-core configuration). As an example, on-chip interface 3910 includes a ring interconnect for on-chip communication and a high-speed serial point-to-point link 3905 for off-chip communication. Yet, in the SOC environment, even more devices, such as the network interface, co-processors, memory 3975, graphics processor 3980, and any other known computer devices/interface may be integrated on a single die or integrated circuit to provide small form factor with high functionality and low power consumption.

In one embodiment, processor 3900 is capable of executing a compiler, optimization, and/or translator code 3977 to compile, translate, and/or optimize application code 3976 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 40:
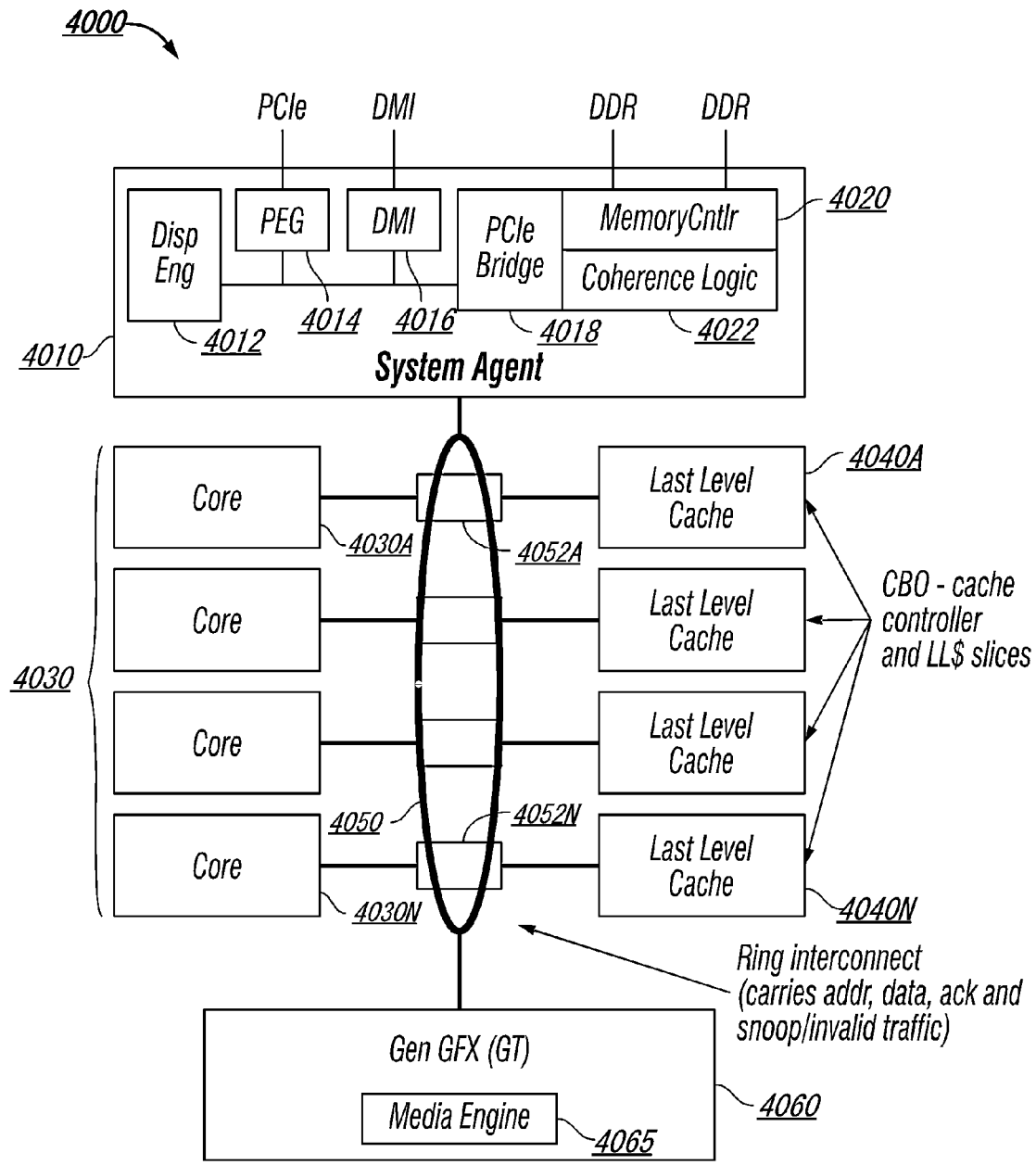
FIG. 40 illustrates another embodiment of a block diagram for a computing system including a multicore processor.

Referring now to FIG. 40, shown is a block diagram of an embodiment of a multicore processor. As shown in the embodiment of FIG. 40, processor 4000 includes multiple domains. Specifically, a core domain 4030 includes a plurality of cores 4030A-4030N, a graphics domain 4060 includes one or more graphics engines having a media engine 4065, and a system agent domain 4010.

In various embodiments, system agent domain 4010 handles power control events and power management, such that individual units of domains 4030 and 4060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 4030 and 4060 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 4030 further includes low level caches in addition to various execution units and additional processing elements. Here, the various cores are coupled to each other and to a shared cache memory that is formed of a plurality of units or slices of a last level cache (LLC) 4040A-4040N; these LLCs often include storage and cache controller functionality and are shared amongst the cores, as well as potentially among the graphics engine too.

As seen, a ring interconnect 4050 couples the cores together, and provides interconnection between the core domain 4030, graphics domain 4060 and system agent circuitry 4010, via a plurality of ring stops 4052A-4052N, each at a coupling between a core and LLC slice. As seen in FIG. 40, interconnect 4050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 4010 includes display engine 4012 which is to provide control of and an interface to an associated display. System agent domain 4010 may include other units, such as: an integrated memory controller 4020 that provides for an interface to a system memory (e.g., a DRAM implemented with multiple DIMMs; coherence logic 4022 to perform memory coherence operations. Multiple interfaces may be present to enable interconnection between the processor and other circuitry. For example, in one embodiment at least one direct media interface (DMI) 4016 interface is provided as well as one or more PCIe™ interfaces 4014. The display engine and these interfaces typically couple to memory via a PCIe™ bridge 4018. Still further, to provide for communications between other agents, such as additional processors or other circuitry, one or more other interfaces may be provided.

Figure 41:
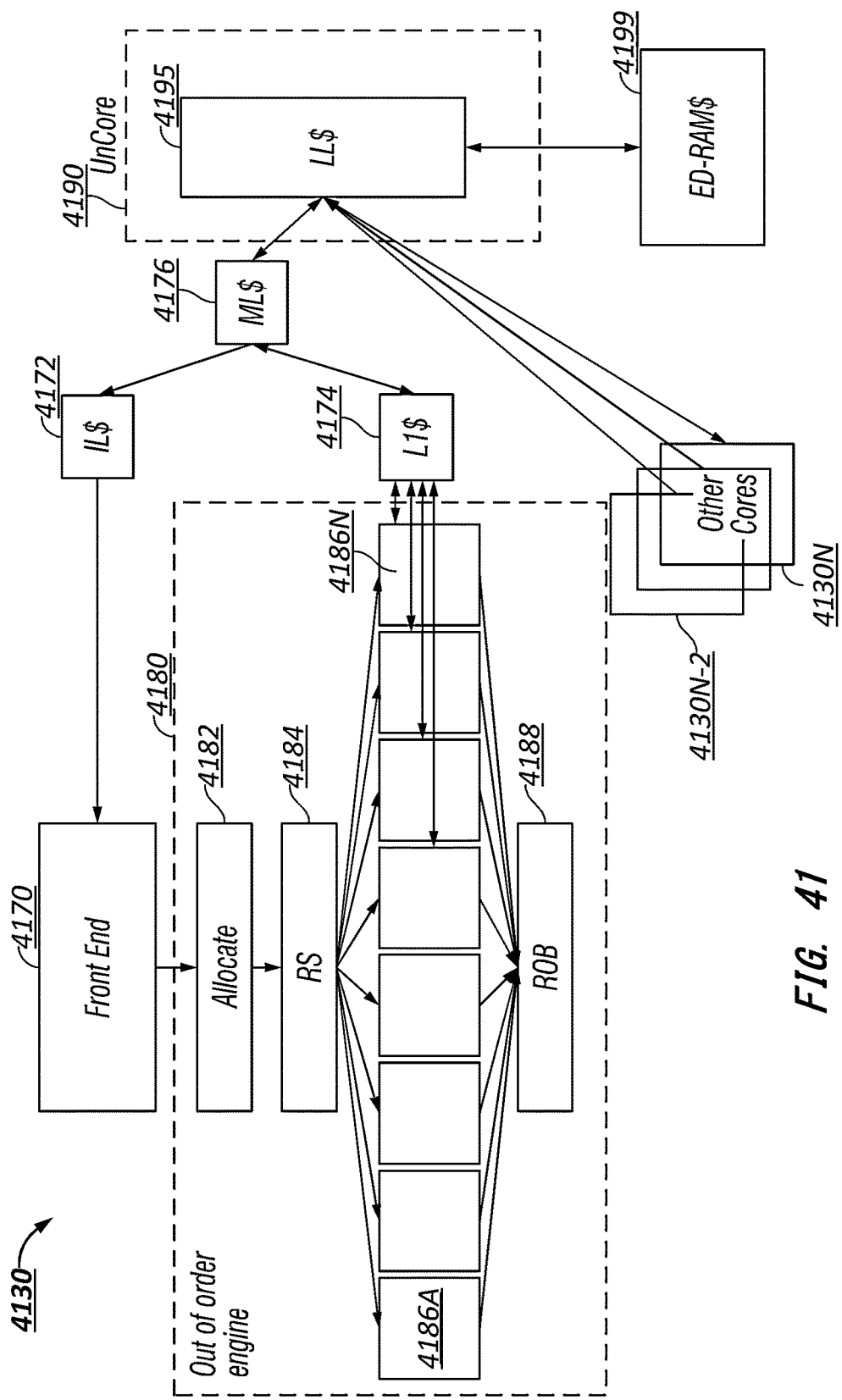
FIG. 41 illustrates an embodiment of a block diagram for a processor.

Referring now to FIG. 41, shown is a block diagram of a representative core; specifically, logical blocks of a back-end of a core, such as core 4030 from FIG. 40. In general, the structure shown in FIG. 41 includes an out-of-order processor that has a front end unit 4170 used to fetch incoming instructions, perform various processing (e.g. caching, decoding, branch predicting, etc.) and passing instructions/operations along to an out-of-order (OOO) engine 4180. OOO engine 4180 performs further processing on decoded instructions.

Specifically in the embodiment of FIG. 41, out-of-order engine 4180 includes an allocate unit 4182 to receive decoded instructions, which may be in the form of one or more micro-instructions or uops, from front end unit 4170, and allocate them to appropriate resources such as registers and so forth. Next, the instructions are provided to a reservation station 4184, which reserves resources and schedules them for execution on one of a plurality of execution units 4186A-4186N. Various types of execution units may be present, including, for example, arithmetic logic units (ALUs), load and store units, vector processing units (VPUs), floating point execution units, among others. Results from these different execution units are provided to a reorder buffer (ROB) 4188, which take unordered results and return them to correct program order.

Still referring to FIG. 41, note that both front end unit 4170 and out-of-order engine 4180 are coupled to different levels of a memory hierarchy. Specifically shown is an instruction level cache 4172, that in turn couples to a mid-level cache 4176, that in turn couples to a last level cache 4195. In one embodiment, last level cache 4195 is implemented in an on-chip (sometimes referred to as uncore) unit 4190. As an example, unit 4190 is similar to system agent 4010 of FIG. 40. As discussed above, uncore 4190 communicates with system memory 4199, which, in the illustrated embodiment, is implemented via ED RAM. Note also that the various execution units 4186 within out-of-order engine 4180 are in communication with a first level cache 4174 that also is in communication with mid-level cache 4176. Note also that additional cores 4130N-2- 4130N can couple to LLC 4195. Although shown at this high level in the embodiment of FIG. 41, understand that various alterations and additional components may be present.

Figure 42:
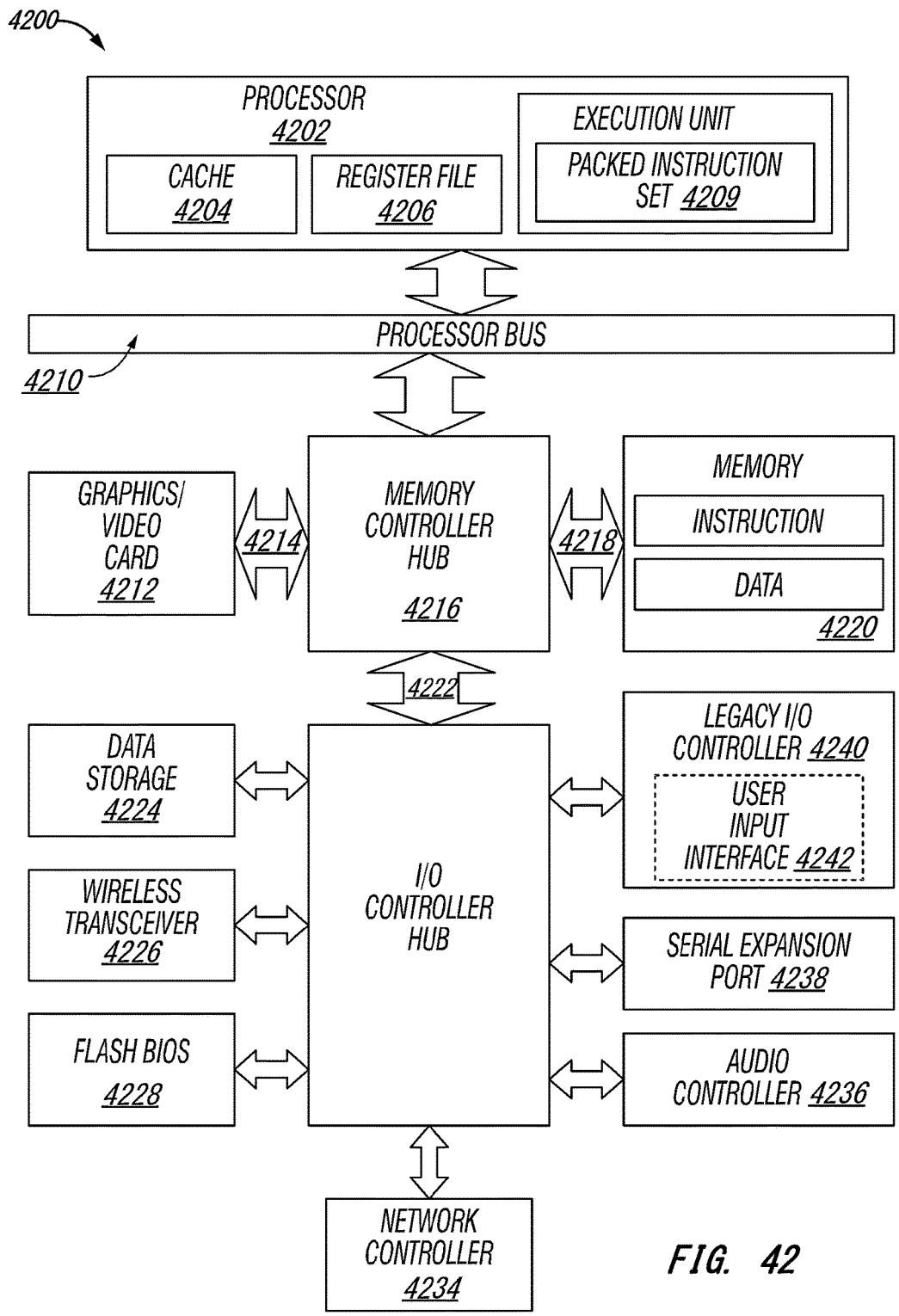
FIG. 42 illustrates another embodiment of a block diagram for a computing system including a processor.

Turning to FIG. 42, a block diagram of an exemplary computer system formed with a processor that includes execution units to execute an instruction, where one or more of the interconnects implement one or more features in accordance with one embodiment of the present invention is illustrated. System 4200 includes a component, such as a processor 4202 to employ execution units including logic to perform algorithms for process data, in accordance with the present invention, such as in the embodiment described herein. System 4200 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 4200 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 4202 includes one or more execution units 4208 to implement an algorithm that is to perform at least one instruction. One embodiment may be described in the context of a single processor desktop or server system, but alternative embodiments may be included in a multiprocessor system. System 4200 is an example of a 'hub' system architecture. The computer system 4200 includes a processor 4202 to process data signals. The processor 4202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 4202 is coupled to a processor bus 4210 that transmits data signals between the processor 4202 and other components in the system 4200. The elements of system 4200 (e.g. graphics accelerator 4212, memory controller hub 4216, memory 4220, I/O controller hub 4224, wireless transceiver 4226, Flash BIOS 4228, Network controller 4234, Audio controller 4236, Serial expansion port 4238, I/O controller 4240, etc.) perform their conventional functions that are well known to those familiar with the art.

In one embodiment, the processor 4202 includes a Level 1 (L1) internal cache memory 4204. Depending on the architecture, the processor 4202 may have a single internal cache or multiple levels of internal caches. Other embodiments include a combination of both internal and external caches depending on the particular implementation and needs. Register file 4206 is to store different types of data in various registers including integer registers, floating point registers, vector registers, banked registers, shadow registers, checkpoint registers, status registers, and instruction pointer register.

Execution unit 4208, including logic to perform integer and floating point operations, also resides in the processor 4202. The processor 4202, in one embodiment, includes a microcode (ucode) ROM to store microcode, which when executed, is to perform algorithms for certain macroinstructions or handle complex scenarios. Here, microcode is potentially updateable to handle logic bugs/fixes for processor 4202. For one embodiment, execution unit 4208 includes logic to handle a packed instruction set 4209. By including the packed instruction set 4209 in the instruction set of a general-purpose processor 4202, along with associated circuitry to execute the instructions, the operations used by many multimedia applications may be performed using packed data in a general-purpose processor 4202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 4208 may also be used in micro controllers, embedded processors, graphics devices, DSPs, and other types of logic circuits. System 4200 includes a memory 4220. Memory 4220 includes a dynamic random access memory (DRAM) device, a static random access memory (SRAM) device, flash memory device, or other memory device. Memory 4220 stores instructions and/or data represented by data signals that are to be executed by the processor 4202.

Note that any of the aforementioned features or aspects of the invention may be utilized on one or more interconnect illustrated in FIG. 42. For example, an on-die interconnect (ODI), which is not shown, for coupling internal units of processor 4202 implements one or more aspects of the invention described above. Or the invention is associated with a processor bus 4210 (e.g. other known high performance computing interconnect), a high bandwidth memory path 4218 to memory 4220, a point-to-point link to graphics accelerator 4212 (e.g. a Peripheral Component Interconnect express (PCIe) compliant fabric), a controller hub interconnect 4222, an I/O or other interconnect (e.g. USB, PCI, PCIe) for coupling the other illustrated components. Some examples of such components include the audio controller 4236, firmware hub (flash BIOS) 4228, wireless transceiver 4226, data storage 4224, legacy I/O controller 4210 containing user input and keyboard interfaces 4242, a serial expansion port 4238 such as Universal Serial Bus (USB), and a network controller 4234. The data storage device 4224 can comprise a hard disk drive, a floppy disk drive, a CD-ROM device, a flash memory device, or other mass storage device.

Figure 43:
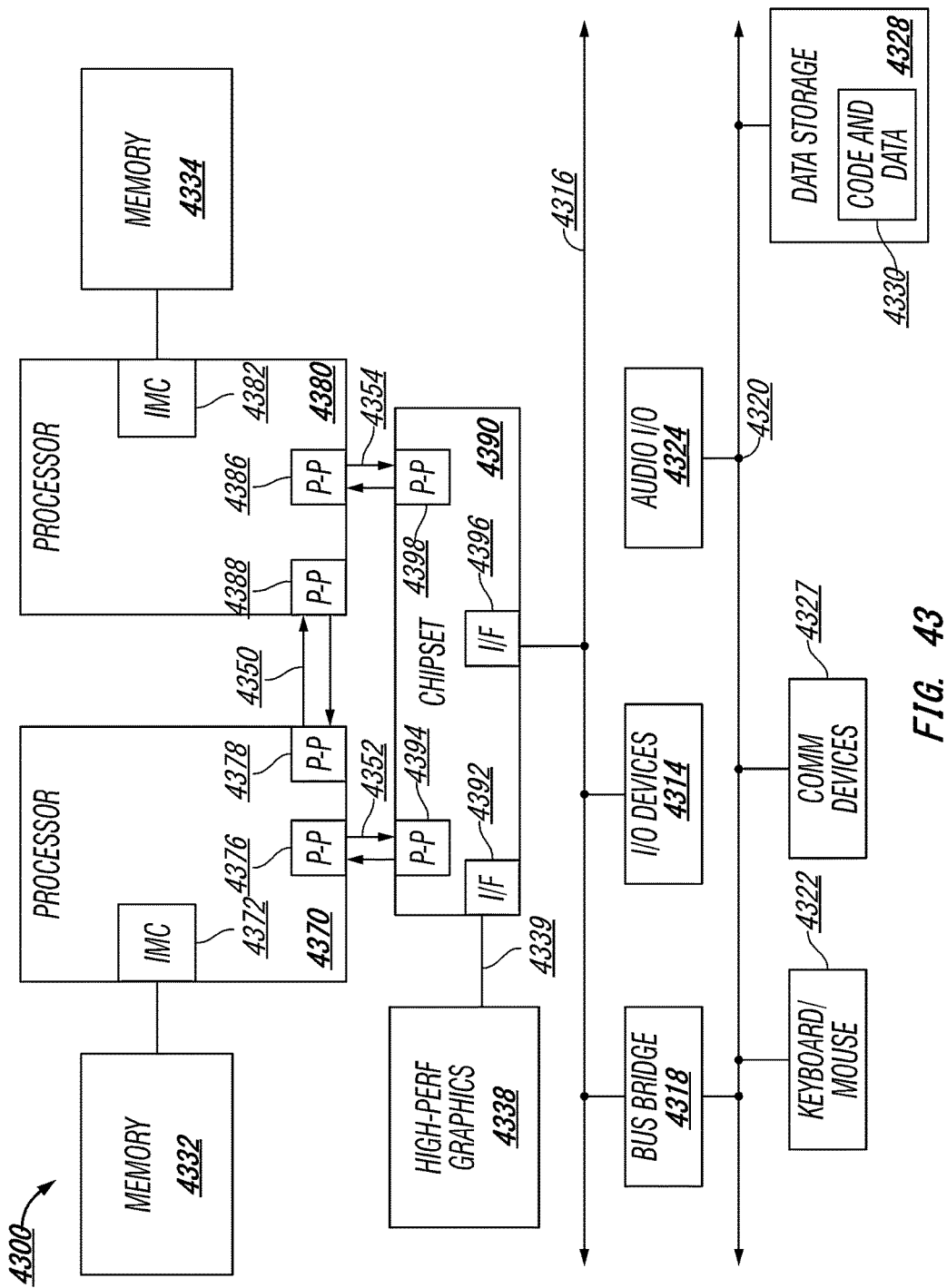
FIG. 43 illustrates an embodiment of a block for a computing system including multiple processor sockets.

Referring now to FIG. 43, shown is a block diagram of a second system 4300 in accordance with an embodiment of the present invention. As shown in FIG. 43, multiprocessor system 4300 is a point-to-point interconnect system, and includes a first processor 4370 and a second processor 4380 coupled via a point-to-point interconnect 4350. Each of processors 4370 and 4380 may be some version of a processor. In one embodiment, 4352 and 4354 are part of a serial, point-to-point coherent interconnect fabric, such as a high-performance architecture. As a result, the invention may be implemented within the QPI architecture.

While shown with only two processors 4370, 4380, it is to be understood that the scope of the present invention is not so limited. In other embodiments, one or more additional processors may be present in a given processor.

Processors 4370 and 4380 are shown including integrated memory controller units 4372 and 4382, respectively. Processor 4370 also includes as part of its bus controller units point-to-point (P-P) interfaces 4376 and 4378; similarly, second processor 4380 includes P-P interfaces 4386 and 4388. Processors 4370, 4380 may exchange information via a point-to-point (P-P) interface 4350 using P-P interface circuits 4378, 4388. As shown in FIG. 43, IMCs 4372 and 4382 couple the processors to respective memories, namely a memory 4332 and a memory 4334, which may be portions of main memory locally attached to the respective processors.

Processors 4370, 4380 each exchange information with a chipset 4390 via individual P-P interfaces 4352, 4354 using point to point interface circuits 4376, 4394, 4386, 4398. Chipset 4390 also exchanges information with a high-performance graphics circuit 4338 via an interface circuit 4392 along a high-performance graphics interconnect 4339.

A shared cache (not shown) may be included in either processor or outside of both processors; yet connected with the processors via P-P interconnect, such that either or both processors' local cache information may be stored in the shared cache if a processor is placed into a low power mode.

Chipset 4390 may be coupled to a first bus 4316 via an interface 4396. In one embodiment, first bus 4316 may be a Peripheral Component Interconnect (PCI) bus, or a bus such as a PCI Express bus or another third generation I/O interconnect bus, although the scope of the present invention is not so limited.

As shown in FIG. 43, various I/O devices 4314 are coupled to first bus 4316, along with a bus bridge 4318 which couples first bus 4316 to a second bus 4320. In one embodiment, second bus 4320 includes a low pin count (LPC) bus. Various devices are coupled to second bus 4320 including, for example, a keyboard and/or mouse 4322, communication devices 4327 and a storage unit 4328 such as a disk drive or other mass storage device which often includes instructions/code and data 4330, in one embodiment. Further, an audio I/O 4324 is shown coupled to second bus 4320. Note that other architectures are possible, where the included components and interconnect architectures vary. For example, instead of the point-to-point architecture of FIG. 43, a system may implement a multi-drop bus or other such architecture.

Figure 44:
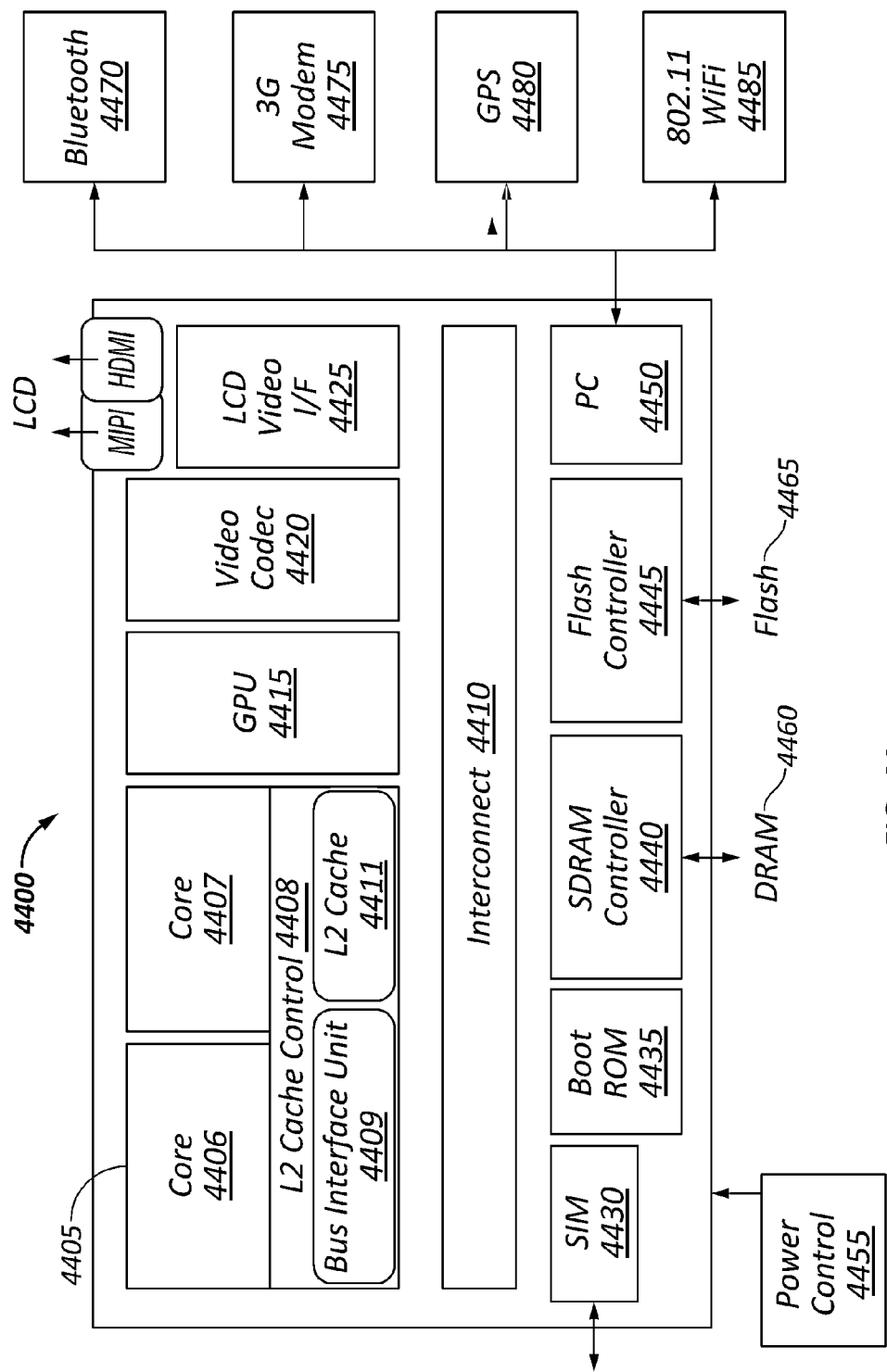
FIG. 44 illustrates another embodiment of a block diagram for a computing system.

Turning next to FIG. 44, an embodiment of a system on-chip (SOC) design in accordance with the inventions is depicted. As a specific illustrative example, SOC 4400 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 4400 includes 2 cores-4406 and 4407. Similar to the discussion above, cores 4406 and 4407 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 4406 and 4407 are coupled to cache control 4408 that is associated with bus interface unit 4409 and L2 cache 4411 to communicate with other parts of system 4400. Interconnect 4410 includes an on-chip interconnect, such as an IOSF, AMBA, or other interconnect discussed above, which potentially implements one or more aspects of described herein.

Interconnect 4410 provides communication channels to the other components, such as a Subscriber Identity Module (SIM) 4430 to interface with a SIM card, a boot rom 4435 to hold boot code for execution by cores 4406 and 4407 to initialize and boot SOC 4400, a SDRAM controller 4440 to interface with external memory (e.g. DRAM 4460), a flash controller 4445 to interface with non-volatile memory (e.g. Flash 4465), a peripheral control 4450 (e.g. Serial Peripheral Interface) to interface with peripherals, video codecs 4420 and Video interface 4425 to display and receive input (e.g. touch enabled input), GPU 4415 to perform graphics related computations, etc. Any of these interfaces may incorporate aspects of the invention described herein.

In addition, the system illustrates peripherals for communication, such as a Bluetooth module 4470, 3G modem 4475, GPS 4485, and WiFi 4485. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machineaccessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to adapt a serial data link, where adaptation of the link is to include receiving a pseudorandom binary sequence (PRBS) from a remote agent, analyzing the PRBS to identify characteristics of the data link, and generating metric data describing the characteristics.

In at least one example, the physical layer logic is further to send metric data as feedback to the remote agent.

In at least one example, receiving the PRBS includes receiving a version of a supersequence.

In at least one example, the metric data is based on a comparison of the received version of the supersequence and an expected version of the supersequence.

In at least one example, the supersequence is to include the PRBS.

In at least one example, the supersequence is to be scrambled using the PRBS.

In at least one example, the supersequence includes a loopback supersequence to be sent in a master-master loopback state.

In at least one example, the metric data is to be sent over a backchannel.

In at least one example, the backchannel includes a software-implemented backchannel.

In at least one example, the software-implemented backchannel utilizes a slow mode of an embedded clock for the data link.

In at least one example, control logic is to calibrate one or more attributes of the link based on the metric data.

In at least one example, physical layer logic is to notify the remote agent that adaptation of the data link is complete In at least one example, physical layer logic is to receive an acknowledgement of completion of the adaptation from the remote agent and exit adaptation based on the acknowledgement.

In at least one example, the PRBS is a 23 bit PRBS.

In at least one example, the PRBS is to be generated using a Fibonacci linear feedback shift register (LFSR).

In at least one example, the PRBS includes a control supersequence and at least a portion of the supersequence is scrambled using the PRBS.

In at least one example, the supersequence includes a repeating sequence including an electric idle exit ordered set (EIEOS), where the sequence is to be repeated according to a particular predefined frequency.

In at least one example, the sequence includes a defined number of training sequences following the EIEOS.

One or more embodiments may provide an apparatus, a system, a machine readable storage, a machine readable medium, and a method to adapt a serial data link, adaptation of the link is to include sending a pseudorandom binary sequence (PRBS) to a remote agent, where the remote agent is to use the PRBS to identify characteristics of the data link and develop metric data describing the characteristics.

One or more examples can further provide receiving the metric data from the remote agent.

One or more examples can further provide calibrating one or more attributes of the link based on the metric data.

One or more examples can further provide entering a loopback state and analyzing loopback data to be received during the loopback state.

In at least one example, the loopback state includes a master-master loopback state.

In at least one example, the loopback data includes a loopback supersequence scrambled using the PRBS.

In at least one example, the loopback data is to be analyzed to determine whether the loopback data matches a supersequence sent to the remote agent during the loopback state.

In at least one example, the metric data is based at least in part on the analysis of the loopback data.

One or more examples can further provide receiving a pseudorandom binary sequence (PRBS) from a remote agent, analyzing the PRBS to identify characteristics of the data link, generating metric data describing the characteristics, and using the metric data in adaptation of the data link.

One or more examples can further provide sending the metric data to the remote agent for use by the remote agent in adjusting characteristics of the data link.

One or more examples can further provide receiving a second instance of the PRBS from the remote agent following the adjusting, and analyzing the second instance of the PRBS to identify characteristics of the data link following the adjusting.

One or more examples can further provide adapting the data link based on the metric data.

One or more examples can further provide sending a notification to the remote agent that the data link has been adapted.

In at least one example, receiving the PRBS includes receiving a supersequence scrambled using the PRBS.

One or more embodiments may provide an apparatus, a system, a machine readable storage, a machine readable medium, and a method to transition between states in a link training state machine, where at least some state transitions are to be based on a respective timer and at least some state transitions are to be controlled.

In at least one example, at least some controlled state transitions are based on a handshake sequence.

In at least one example, the handshake sequence includes sending of a supersequence to another device and validating that the other device repeats the supersequence as an acknowledgement.

In at least one example, the physical layer logic is configured to support a testing mode, where each of a set the state transitions are to be based on respective timers and at least one of the set of state transitions is a controlled state transition when in a mode outside the testing mode.

In at least one example, at least one of the timers is to trigger transition during the testing mode at a value different than a value used in a mode outside of the testing mode.

One or more examples can further provide supporting single stepping at least some of the states in the state machine.

In at least one example, the single stepping is associated with a freeze on initialization abort.

One or more embodiments may provide an apparatus, a system, a machine readable storage, a machine readable medium, and a method to receive a data stream including flits, identify a mismatch corresponding to a control code received in a control window embedded in the data stream, and initiate a reset based on the mismatch.

In at least one example, the mismatch is based on a bit error.

One or more examples can further provide attempting to resolve the bit error and the mismatch is identified in response to a failure to resolve the bit error.

In at least one example, the control code is to be from a set including a reset request code, a low power entry request, a partial width entry request, and a partial width exit request.

In at least one example, the control window is to occur according to a defined interval.

One or more embodiments may provide an apparatus, a system, a machine readable storage, a machine readable medium, and a method to provide a synchronization counter and a layered stack including physical layer logic, link layer logic, and protocol layer logic, where the physical layer logic is to synchronize a reset of the synchronization counter to an external deterministic signal and synchronize entry into a link transmitting state with the deterministic signal.

In at least one example, the physical layer logic is further to initialize a data link using one or more supersequences.

In at least one example, entry into the link transmitting state is to coincide with a start of data sequence (SDS) sent to end initialization of the data link.

In at least one example, the SDS is to be sent according to the deterministic signal.

In at least one example, each supersequence includes a respective repeating sequence including an electric idle exit ordered set and a respective number of training sequences.

In at least one example, the SDS is to interrupt the supersequences.

In at least one example, the supersequences each include a respective repeating sequence including at least one electric idle exit ordered set (EIEOS) and a respective number of training sequences.

In at least one example, the EIEOS of a supersequence is to be sent so as to coincide with synchronization counter.

In at least one example, the physical layer logic is further to synchronize to a deterministic interval based on a received EIEOS.

In at least one example, synchronizing to a deterministic interval based on a received EIEOS includes identifying an end boundary of the received EIEOS.

In at least one example, the end boundary is to be used to synchronize entry into the link transmitting state.

In at least one example, the end boundary is to be used to synchronize exit from a partial width link transmitting state.

In at least one example, the physical layer logic is further to generate a particular supersequence and send the particular supersequence to be synchronized with the deterministic signal.

In at least one example, the physical layer logic is to specify a target latency to a remote agent, where the remote agent is to use the target latency to apply a delay to adjust actual latency to the target latency.

In at least one example, the target latency is to be communicated in a payload of a training sequence.

In at least one example, the deterministic signal includes a planetary alignment signal for a device.

In at least one example, the physical layer logic is further to synchronize a periodic control window embedded in a link layer data stream sent over a serial data link with the deterministic signal, where the control window is configured for the exchange of physical layer information during a link transmitting state.

In at least one example, the physical layer information includes information for use in initiating state transitions on the data link.

In at least one example, control windows are embedded according to a defined control interval and the control interval is based at least in part on the deterministic signal.

One or more examples can further provide sending the supersequences to a remote agent connected to the data link during initialization of the data link and at least one element of the supersequence is to be synchronized with the deterministic signal.

In at least one example, the element includes an EIEOS.

In at least one example, each supersequence includes a respective repeating sequence including at least EIEOS and a respective number of training sequences.

One or more examples can further provide sending a stream of link layer flits in the link transmitting state.

One or more examples can further provide synchronizing a periodic control window to be embedded in the stream with the deterministic signal, where the control window is configured for the exchange of physical layer information during the link transmitting state.

One or more examples can further provide sending delay information to a remote agent connected to the data link, where the delay corresponds to the deterministic signal.

One or more embodiments may provide an apparatus, a system, a machine readable storage, a machine readable medium, and a method to identify a target latency for a serial data link, receive, over the data link, a data sequence synchronized with a synchronization counter associated with the data link, and maintain the target latency using the data sequence.

In at least one example, the data sequence includes a supersequence to include a repeating sequence, where the sequence is to repeat at a defined frequency.

In at least one example, the sequence is to include an electric idle exit ordered set (EIEOS).

In at least one example, the sequence is to begin with the EIEOS followed by a predefined number of training sequences.

In at least one example, at least one of the training sequences includes data identifying the target latency.

In at least one example, at least a portion of the sequence is to be scrambled using a pseudorandom binary sequence (PRBS).

One or more examples can further provide determining an actual latency of the data link based on the receipt of the data sequence.

One or more examples can further provide determining a deviation by the actual latency from the target latency.

One or more examples can further provide causing the deviation to be corrected.

One or more embodiments may provide an apparatus, a system, a machine readable storage, a machine readable medium, and a method to determine whether width of flits to be sent over a serial data link including a number of lanes are a multiple of the number of lanes, and transmit the flits over the serial data link, where two flits are to be sent so as to overlap on the lanes when the width of the flits is not a multiple of the number of lanes.

In at least one example, overlapping includes sending one or more bits of a first of the two flits over a first portion of the number of lanes concurrently with the sending of one or more bits of a second of the two flits over a second portion of the number of lanes.

In at least one example, at least some bits of the flits are to be transmitted out of order.

In at least one example, flits do not overlap when the width of the flits is a multiple of the number of lanes.

In at least one example, the width of the flits include 192 bits.

In at least one example, the number of lanes includes 20 lanes in at least one link transmitting state.

One or more examples can further provide transitioning to a different new link width including a second number of lanes.

One or more examples can further provide determining whether the width of the flits are a multiple of the second number of lanes In at least one example, the transition is to be aligned with a non-overlapping flit boundary.

One or more embodiments may provide an apparatus, a system, a machine readable storage, a machine readable medium, and a method to provide physical layer logic to receive a bit stream including a set of flits over a serial data link, where respective portions of at least two of the set of flits are sent concurrently on lanes of the data link, and link layer logic to reconstruct the set of flits from the received bit stream.

In at least one example, a portion of the set of flits have overlapping boundaries.

In at least one example, overlapping boundaries includes sending one or more final bits of a first of the two flits over a first portion of the number of lanes concurrently with the sending of one or more beginning bits of a second of the two flits over a second portion of the number of lanes.

In at least one example, the width of the flits is not a multiple of the number of lanes of the data link.

In at least one example, the width of the flits include 192 bits and the number of lanes includes 20 lanes.

In at least one example, at least a portion of bits of the flits are transmitted out of order.

One or more examples can further provide a physical layer (PHY) configured to be coupled to a link, the link including a first number of lanes, where the PHY is to enter a loopback state, and where the PHY, when resident in the loopback state, is to inject specialized patterns on the link.

One or more examples can further provide a physical layer (PHY) configured to be coupled to a link, the link including a first number of lanes, where the PHY includes a synchronization (sync) counter, and where the PHY is to transmit an Electrically Idle Exit Order Set (EIEOS) aligned with the sync counter associated with a training sequence.

In at least one example, a sync counter value from the sync counter is not exchanged during each training sequence.

In at least one example, the EIEOS alignment with the sync counter is to act as a proxy for exchanging the sync counter value from the sync counter during each training sequence.

One or more examples can further provide a physical layer (PHY) configured to be coupled to a link, the PHY to include a PHY state machine to transition between a plurality of states, where the PHY state machine is capable of transitioning from a first state to a second state based on a handshake event and transitioning the PHY from a third state to a fourth state based on a primary timer event.

In at least one example, the PHY state machine is capable of transitioning the PHY from a fifth state to a sixth state based on a primary time event in combination with a secondary timer event.

One or more embodiments may provide an apparatus, a system, a machine readable storage, a machine readable medium, and a method to embed a periodic control window in a link layer data stream to be sent over a serial data link, where the control window is configured to provide physical layer information including information for use in initiating state transitions on the data link.

In at least one example, the data stream includes a series of flits.

In at least one example, the link layer data stream is sent during a link transmitting state of the data link.

One or more examples can further provide identifying a particular control window in the data stream and send reset data to a device connected to the data link during the particular control window, where the reset data is to communicate an attempt to enter a reset state from the link transmitting state.

One or more examples can further provide generating a supersequence associated with the reset state and send the supersequence to the device.

One or more examples can further provide identifying a particular control window in the data stream and send link width transition data to a device connected to the data link during the particular control window, where the link width transition data is to communicate an attempt to change the number of active lanes on the link.

In at least one example, the number of lanes are to be reduced from an original number to a new number, where reducing the number of active lanes is associated with entry into a partial width link transmitting state.

One or more examples can further provide identifying a subsequent control window in the data stream and send partial width state exit data to the device during the subsequent control window, where the partial width state exit data is to communicate an attempt to return the number of active lanes to the original number.

One or more examples can further provide identifying a particular control window in the data stream and send low power data to a device connected to the data link during the particular control window, where the low power data is to communicate an attempt to enter a low power state from the link transmitting state.

In at least one example, control windows are embedded according to a defined control interval and devices connected to the data link are to synchronize the state transition with an end of a corresponding control interval.

One or more embodiments may provide an apparatus, a system, a machine readable storage, a machine readable medium, and a method to receive a data stream where the data stream is to include alternating transmitting intervals and control intervals, where link layer flits are to be sent during the transmitting intervals and the control intervals are to provide opportunities to send physical layer control information, identify control data to be included in a particular one of the control intervals, the control data to indicate an attempted entry into a particular state from a first state, where the data stream is to be received in the first state, and facilitate transition into the particular state.

In at least one example, the particular state includes a reset state.

In at least one example, facilitating transition into the particular state includes sending an acknowledgement of the attempted entry into the particular state.

In at least one example, the acknowledgement is sent within the control interval.

In at least one example, the data stream is sent over a serial data link including a plurality of active lanes and the particular state includes a partial width state, where at least a subset of lanes included in the plurality of active lanes are to become idle in the partial width state.

One or more examples can further provide identifying subsequent data included in a subsequent one of the control intervals, the subsequent data indicating an attempt to exit the partial width state and reactivate the idle lanes.

In at least one example, the particular state includes a low power transmitting state.

In at least one example, the data stream is received over a serial data link including a plurality of active lanes and the particular state includes a partial width state, where at least a subset of lanes included in the plurality of active lanes are to become idle in the partial width state.

In at least one example, the particular state includes a reset state.

In at least one example, the physical layer control information describes an error of the data link.

One or more embodiments may provide an apparatus, a system, a machine readable storage, a machine readable medium, and a method to embed a clock signal in data to be communicated from a first device over a serial data link including a plurality of lanes, and transition from a first link transmitting state that is to use a first number of the plurality of lanes to a second link transmitting state that is to use a second number of the plurality of lanes.

In at least one example, the second number of lanes is greater than the first number of lanes.

In at least one example, transitioning from the first link transmitting state to the second link transmitting state includes sending a partial width state exit supersequence including one or more instances of a sequence including an electrical ordered set (EOS) and a plurality of instances of a training sequence.

In at least one example, transitioning from the first link transmitting state to the second link transmitting state further includes sending an initial EOS preceding the partial width state exit supersequence.

In at least one example, null flits are to be sent on active lanes during the sending of the initial EOS.

In at least one example, the training sequence includes an unscrambled fast training sequence (FTS).

In at least one example, transitioning from the first link transmitting state to the second link transmitting state further includes using the partial width state exit supersequence to initialize at least a portion of idle lanes included in the plurality of lanes.

In at least one example, transitioning from the first link transmitting state to the second link transmitting state further includes sending a start of data sequence (SDS) following initialization of the portion of the idle lanes.

In at least one example, transitioning from the first link transmitting state to the second link transmitting state further includes sending a partial FTS (FTSp) following the sending of the SDS.

In at least one example, transitioning from the first link transmitting state to the second link transmitting state further includes receiving an acknowledgement of the transition, where the acknowledgement includes the partial width state exit supersequence.

In at least one example, transitioning from the first link transmitting state to the second link transmitting state includes sending an in-band signal over the data link to the second device.

In at least one example, the first number of lanes is greater than the second number of lanes.

In at least one example, the data includes a datastream including alternating transmitting intervals and control intervals, and the signal is sent within a particular control interval and indicates the transition from the first link transmitting state to the second link transmitting state.

In at least one example, the transition from the first link transmitting state to the second link transmitting state is to be synchronized with end of a particular transmitting interval immediately following the particular control interval.

In at least one example, the transition is based on a request of a power control unit.

One or more embodiments may provide an apparatus, a system, a machine readable storage, a machine readable medium, and a method to receive a data stream where the data stream is to include alternating transmitting intervals and control intervals, where the control intervals are to provide opportunities to send physical layer control information, and the data stream is to be sent over a serial data link that is to include active lanes and inactive lanes, identify control data included in a particular one of the control intervals, where the data is to indicate an attempt to activate at least a portion of the inactive lanes of the link, and facilitate activation of the portion of the inactive lanes.

In at least one example, the data stream is received while the data link is in a partial width state and the control data is to indicate an attempt to exit the partial width state.

In at least one example, facilitating activation of the portion of the inactive lanes is to include receiving a supersequence that is to indicate the attempt to activate the portion of the inactive lanes.

In at least one example, the supersequence is to include one or more instances of a sequence including an electric idle exit ordered set (EIEOS) and a plurality of instances of a training sequence.

In at least one example, facilitating activation of the portion of the inactive lanes includes sending at least one initial EIEOS to immediately precede the supersequence.

In at least one example, null flits are to be sent on the active lanes during the sending of the initial EIEOS.

In at least one example, the training sequence includes an unscrambled fast training sequence (FTS).

In at least one example, facilitating activation of the portion of the inactive lanes further includes using the supersequence to initialize the portion of the inactive lanes.

In at least one example, facilitating activation of the portion of the inactive lanes further includes receiving a start of data sequence (SDS) following initialization of the portion of the inactive lanes.

In at least one example, facilitating activation of the portion of the inactive lanes further includes receiving a partial FTS (FTSp) following the SDS.

In at least one example, facilitating activation of the portion of the inactive lanes further includes acknowledging the attempt by echoing the supersequence.

One or more embodiments may provide an apparatus, a system, a machine readable storage, a machine readable medium, and a method to receive a data stream where the data stream is to include alternating transmitting intervals and control intervals, where link layer flits are to be sent during the transmitting intervals and the control intervals are to provide opportunities to send physical layer control information, identify control data that indicates an attempted entry into a low power state from a link transmitting state, where the data stream is to be received in the link transmitting state, and transition into the low power state.

In at least one example, the control data includes a predefined code.

In at least one example, transitioning into the low power state includes echoing the predefined code in a subsequent control interval.

In at least one example, transitioning into the low power state includes receiving a supersequence indicating the transition to the low power state.

In at least one example, transitioning into the low power state further includes echoing the supersequence.

In at least one example, the supersequence includes one or more instances of a sequence including an electrical ordered set (EOS) followed by a predetermined number of instances of a training sequence.

In at least one example, the EOS includes an electrical idle electrical ordered set (EIEOS).

One or more embodiments may provide an apparatus, a system, a machine readable storage, a machine readable medium, and a method to identify a particular instance of a periodic control interval to be embedded in a data stream on a serial data link during a link transmitting state, send state transition data during the particular instance of the control interval to a device, where the state transition data is to indicate an attempt to enter a low power state, and transition into the low power state.

One or more examples can further provide receiving an acknowledgement from the device, the acknowledgement including the state transition data.

In at least one example, the acknowledgement is to coincide with a next periodic control interval.

In at least one example, transitioning into the low power state includes sending a supersequence to the device indicating the transition to the low power state.

In at least one example, transitioning into the low power state further includes receiving a repeated instance of the supersequence from the device.

In at least one example, the supersequence includes one or more instances of a sequence including an electrical ordered set (EOS) followed by a predetermined number of instances of a training sequence.

In at least one example, the EOS includes an electric idle exit ordered set (EIEOS).

In at least one example, transition into the low power state is based on a request of a power control unit.

One or more examples can further provide initiating a transition from the low power state to the link transmitting state.

One or more embodiments may provide an apparatus, a system, a machine readable storage, a machine readable medium, and a method to identify transaction data, generate a flit to include three or more slots and a floating field to be used as an extension of any one of two or more of the slots, and send the flit to transmit the flit.

In at least one example, I/O logic comprises a layered stack comprising physical layer logic, link layer logic, and protocol layer logic In at least one example, the three or more slots consist of three defined slots.

In at least one example, the flit comprises 192 bits.

In at least one example, the first of the three slots comprises 72 bits, the second of the three slots comprises 70 bits, and third slot comprises 18 bits In at least one example, the first slot and second slot each include a respective 50 bit payload field.

In at least one example, the floating field is to extend the payload field of either the first slot or the second slot by eleven bits.

In at least one example, the third slot is adapted to be encoded with one or more of acknowledgements and credit returns.

In at least one example, the flit further comprises a 16-bit cyclic redundancy check (CRC) field.

In at least one example, the flit further comprises an 11-bit transaction identifier (TID) field.

In at least one example, each slot is to include a header of a distinct message.

In at least one example, each message is associated with a respective transaction within a particular virtual network.

In at least one example, the flit further comprises a virtual network identifier to identify the particular virtual network.

In at least one example, wherein message headers associated with transactions in different virtual networks are to be included in distinct flits.

One or more embodiments may provide an apparatus, a system, a machine readable storage, a machine readable medium, and a method to receive a flit, wherein the flit is to include three or more slots to be included in the flit and a floating field to be used as an extension of any one of two or more of the slots, and process each slot to identify one or more headers relating to one or more transactions.

In at least one example, the one or more headers comprise three or more headers.

In at least one example, each of the headers corresponds to a respective message associated with a different, respective transaction.

In at least one example, each of the transactions is included in a particular virtual network.

In at least one example, it can be identified which of the first and second slots the floating field is to extend.

In at least one example, the third slot is adapted to be encoded with one or more of acknowledgements and credit returns.

In at least one example, the flit can be sent from a first device to a second device over the data link. The first second devices can include microprocessors, graphics accelerators, and other devices.

One or more examples can further provide a layered protocol stack including at least a link layer and a physical layer, the layered protocol stack configured to be coupled to a serial, differential link, wherein the layered protocol stack is further configured to transmit a 192-bt flit over the serial, differential link.

In at least one example, the 192-bit flit includes a 16 bit CRC

One or more examples can further provide a layered protocol stack including at least a link layer and a physical layer, the layered protocol stack configured to be coupled to a serial, differential link, wherein the layered protocol stack is further configured to transmit a flit over the serial, differential link, the flit to include an 11-bit transaction identifier field.

One or more examples can further provide a layered protocol stack including at least a link layer and a physical layer, the layered protocol stack configured to be coupled to a serial, differential link, wherein the layered protocol stack is further configured to assemble a header flit including a plurality of slots.

In at least one example, the plurality of payload slots include 3 slots.

In at least one example, the first and second slots of the 3 slots are equal in size and the third slot of the 3 slots is smaller than the first slot.

In at least one example, special control flits may consume all 3 slots.

In at least one example, the flit includes a 16 bit CRC.

One or more embodiments may provide an apparatus, a system, a machine readable storage, a machine readable medium, and a method to identify transaction data, generate a flit from the transaction data, wherein the flit is to include two or more slots, a payload, and a cyclic redundancy check (CRC) field to be encoded with a 16-bit CRC value generated based on the payload, and send the flit to the device over the serial data link.

In at least one example, the I/O logic comprises a layered stack comprising physical layer logic, link layer logic, and protocol layer logic In at least one example, the two or more slots consist of three defined slots.

In at least one example, the flit comprises 192 bits.

In at least one example, the first of the three slots comprises 72 bits, the second of the three slots comprises 70 bits, and third slot comprises 18 bits In at least one example, the third slot is adapted to be encoded with one or more of acknowledgements and credit returns.

In at least one example, the flit payload comprises 176 bits.

In at least one example, the CRC value is generated using an XOR tree and the XOR tree is to embody a generator polynomial. The polynomial can comprise $g(x)=(x16+x15+x13+x12+x10+x9+x8+x7+x6+x4+x3+x1+1)$. The CRC value can be a rolling CRC value.

In at least one example, the data link comprises at least 8 lanes in a first state and the flit comprises 192 bits.

In at least one example, the first state comprises a partial width transmitting state and a full width transmitting state comprises a 20 lane link.

One or more embodiments may provide an apparatus, a system, a machine readable storage, a machine readable medium, and a method to receive a flit, wherein the flit is to include two or more slots, a payload, and a cyclic redundancy check (CRC) field encoded with a 16-bit CRC value generated based on the payload, determine a comparison CRC value from the payload, and compare the comparison CRC value to the CRC value included in the flit.

In at least one example, one or more errors can be detected on a data link based on the comparison.

In at least one example, the flit comprises 192 bits, a first of the slots comprises 72 bits, a second of the slots comprises 70 bits, and a third of the slots comprises 18 bits.

In at least one example, the CRC value can be derived using an XOR tree that embodies a generator polynomial. The generator polynomial can comprises $g(x)=(x16+x15+x13+x12+x10+x9+x8+x7+x6+x4+x3+x1+1)$.

In at least one example, the generator polynomial is the same used to generate the CRC value included in the flit.

In at least one example, the CRC value comprises a rolling CRC value.

In at least one example, the flit can be sent between a first and second device. The first and second devices can be microprocessors, graphical accelerators, or other devices.

One or more examples can further provide a layered protocol stack including at least a link layer and a physical layer, the layered protocol stack configured to be coupled to a serial, differential link, wherein the layered protocol stack is further configured to calculate a rolling CRC for a flit to be transmitted on the link, the rolling CRC to be based on at least two polynomial equations.

In at least one example, the second polynomial of the two is to determine if all of 1-7 bit errors are detect, per lane burst protection, and errors of burst length 16 or less are detected.

One or more examples can further provide a layered protocol stack including at least a link layer and a physical layer, the layered protocol stack configured to be coupled to a serial, differential link, wherein the layered protocol stack is further configured to assemble a header flit including a plurality of slots.

In at least one example, the plurality of payload slots include 3 slots.

In at least one example, the first and second slots of the 3 slots are equal in size and the third slot of the 3 slots is smaller than the first slot.

One or more examples can further provide a physical layer (PHY) configured to be coupled to a serial, differential link, the PHY to periodically issue a blocking link state (BLS), the BLS request to cause an agent to enter a BLS to hold off link layer flit transmission for a duration, wherein the PHY is to utilize the serial, differential link during the duration for PHY associated tasks.

In at least one example, the PHY is to utilize the serial, differential link during the duration for PHY associated tasks comprises sending one or more messages of a priority message list including a no-op, reset, in-band reset, entry into low power state, entry into partial width state, entry into other PHY state, etc.

One or more examples can further provide a physical layer (PHY) configured to be coupled to a link, the link including a first number of lanes, wherein the PHY is to transmit flits over the first number of lanes in a full width transmitting link state, and wherein the PHY is to transmit flits over a second number of lanes, which is less than the first number of lanes, in a partial-width transmitting link state.

In at least one example, the PHY is to utilize a blocking link state to enter the partial-width transmitting link state from the blocking link state.

In at least one example, the flits have the same size when transmitting over the first number of lanes and the second number of lanes.

In at least one example, the PHY utilizes an embedded clock for transmitting over the first number of lanes and over the second number of lanes.

In at least one example, the PHY utilizes an embedded clock for transmitting over the first number of lanes and a forwarded clock for transmitting over the second number of lanes.

One or more embodiments may provide an apparatus including a physical layer (PHY) configured to be coupled to a serial, differential link that is to include a number of lanes, the PHY to include a transmitter and a receiver to be coupled to each lane of the number of lanes. The transmitter coupled to each lane can be configured to embed a clock with data to be transmitted over the lane, and the PHY can periodically issue a blocking link state (BLS) request to cause an agent to enter a BLS to hold off link layer flit transmission for a duration. The PHY can utilize the serial, differential link during the duration for a PHY associated task selected from a group including an in-band reset, an entry into low power state, and an entry into partial width state.

One or more embodiments may provide an apparatus, a system, a machine readable storage, a machine readable medium, and a method to receive a training sequence, where at least a portion of the training sequence is to be scrambled through use of a pseudo random bit sequence (PRBS) and at least a header of the training sequence is to be unscrambled, and perform adaptation of a link based at least in part on the scrambled portion of the training sequence. An apparatus can include physical layer logic to receive the training sequence and perform the adaptation of the link.

One or more embodiments may provide an apparatus, a system, a machine readable storage, a machine readable medium, and a method to generate a header flit that is to comprise at least three slots, where the header flit is to include at least 192 bits, a transaction identifier of at least 11 bits, a cyclical redundancy check field of at least 16 bits, and a floating field to expand any one of two or more of the three slots. An apparatus can include link layer logic to generate the header flit.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising
a physical layer (PHY) configured to be coupled to a serial differential link that is to include a number of lanes, the PHY to include a transmitter and a receiver to be coupled to each lane of the number of lanes, wherein the transmitter to be coupled to each lane is configured to embed a clock with link layer data to be transmitted over at least a particular one of the lanes, and wherein the PHY is to periodically issue a blocking link state (BLS) request to cause a control window of a defined length to interrupt transmission of a stream of link layer flits on the particular lane, transition to transmission of one or more physical layer-associated control messages on the particular lane during the control window, and resume transmission of the link layer flits on the particular lane following the control window, wherein the physical layer-associated control messages cause one of an in-band reset, an entry into low power state, and an entry into a partial width state.

* * * * *

UNITED STATES PATENT AND TRADEMARK OFFICE
CERTIFICATE OF CORRECTION

PATENT NO. : 9,626,321 B2
APPLICATION NO. : 14/060191
DATED : April 18, 2017
INVENTOR(S) : Robert J. Safranek et al.

Page 1 of 1

It is certified that error appears in the above-identified patent and that said Letters Patent is hereby corrected as shown below:

On the Title Page

Column 2, under Related U.S. Application Data, Line 61, delete "2013." and insert -- 2012 --, therefor.

On page 2, Column 1, under Abstract, Line 10, after "state", insert -- . --.

In the Drawings

On sheet 13 of 41, in FIG. 15, Line 4, delete "8.9.10,11" and insert -- 8,9,10,11 --, therefor.

On sheet 14 of 41, in FIG. 16, Line 4, delete "8.9.10,11" and insert -- 8,9,10,11 --, therefor.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*